United States Patent
Rempell

(12) 
(10) Patent No.: US 6,546,397 B1
(45) Date of Patent: Apr. 8, 2003

(54) BROWSER BASED WEB SITE GENERATION TOOL AND RUN TIME ENGINE

(76) Inventor: Steven H. Rempell, 38 Washington St., Novato, CA (US) 94947

(*) Notice: Subject to any disclaimer, the term of this patent is extended or adjusted under 35 U.S.C. 154(b) by 0 days.

(21) Appl. No.: 09/454,061

(22) Filed: Dec. 2, 1999

(51) Int. Cl.$^7$ .......................... G06F 17/00; G06T 13/00
(52) U.S. Cl. ................. 707/102; 707/104.1; 707/501.1; 345/700; 345/473
(58) Field of Search ................................. 707/102, 103, 707/104, 501, 513, 517, 530, 104.1, 501.1; 345/333, 967, 326, 339, 348, 352, 700, 473

(56) References Cited

U.S. PATENT DOCUMENTS

| | | | | |
|---|---|---|---|---|
| 5,428,731 A | * | 6/1995 | Powers, III | 707/501 |
| 5,842,020 A | * | 11/1998 | Faustini | 395/701 |
| 5,870,767 A | * | 2/1999 | Kraft, IV | 707/501 |
| 6,035,119 A | * | 3/2000 | Massena et al. | 717/100 |
| 6,081,263 A | * | 6/2000 | LeGall et al. | 345/327 |
| 6,083,276 A | * | 7/2000 | Davidson et al. | 717/1 |
| 6,148,311 A | * | 11/2000 | Wishnie et al. | 707/513 |
| 6,191,786 B1 | * | 2/2001 | Eyzaguirre et al. | 345/853 |

OTHER PUBLICATIONS

Piero Fraternali, "Tools and Approaches for Developing Data–Intensive Web Applications: A Survey", ACM Sep. 1999, pp. 226–263.*

Balusubramanian et al A Large–Scale Hypermedia Application using Document Management and Web Technologies, ACM 1997, pp. 134–145.*

* cited by examiner

Primary Examiner—Safet Metjahic
Assistant Examiner—Uyen Le
(74) Attorney, Agent, or Firm—Coudert Brothers LLP

(57) ABSTRACT

A method and apparatus for designing and building a web page. The apparatus includes a browser based build engine including build tools and a user interface. The build tools are operable to construct a single run time file and an associated database that describe, and when executed, produce the web page. The user interface includes a build frame and a panel. The build frame is operable to receive user input and present a WYSIWIG representation of the web page. The panel includes one or more menus for controlling the form of content to be placed on the web page.

39 Claims, 68 Drawing Sheets

BUILD TOOL COMPONENTS

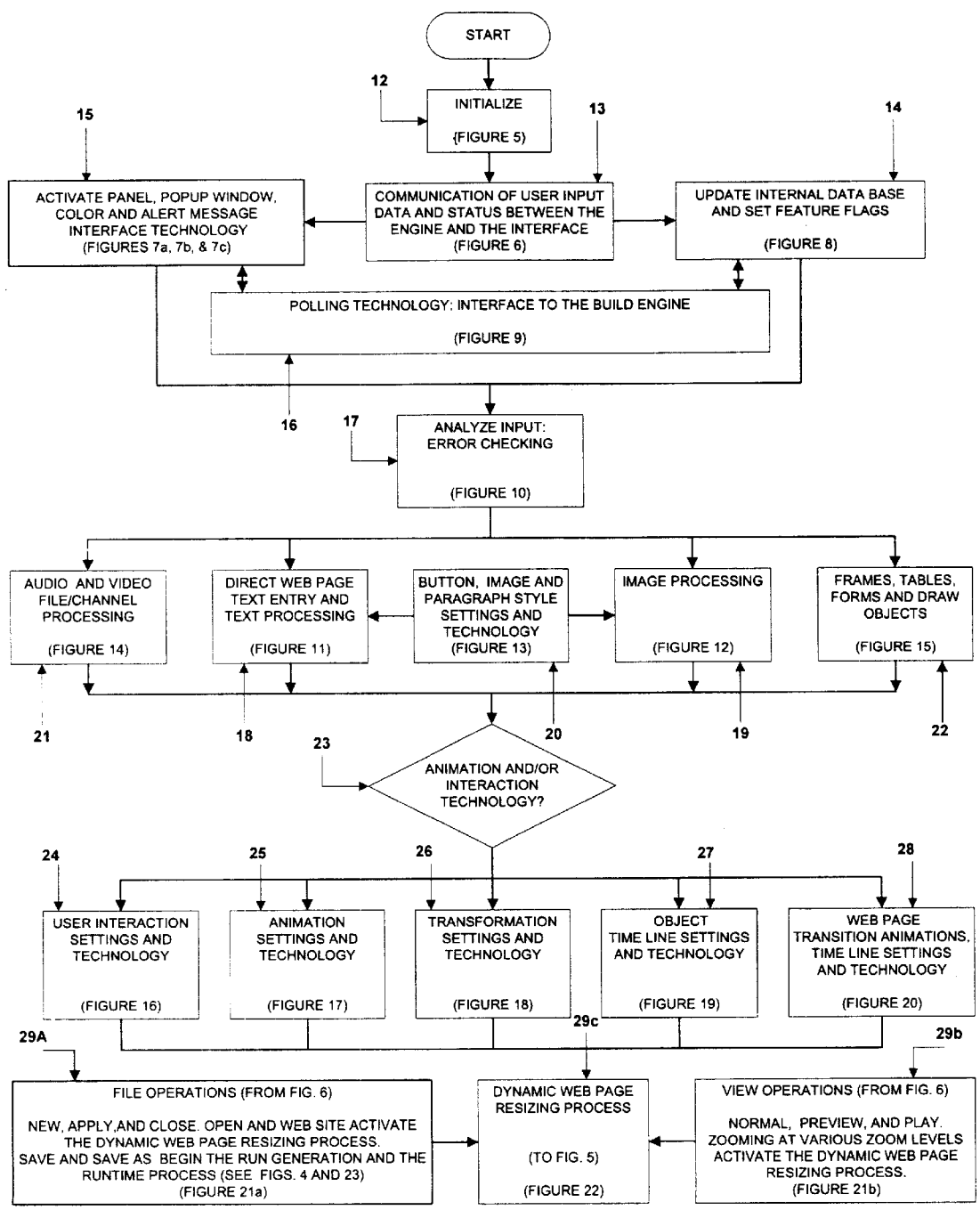
Fig. 3b   THE BUILD TOOL & BUILD PROCESS

RUN GENERATION AND RUNTIME COMPONENTS

RUN GENERATION & THE RUNTIME PROCESS

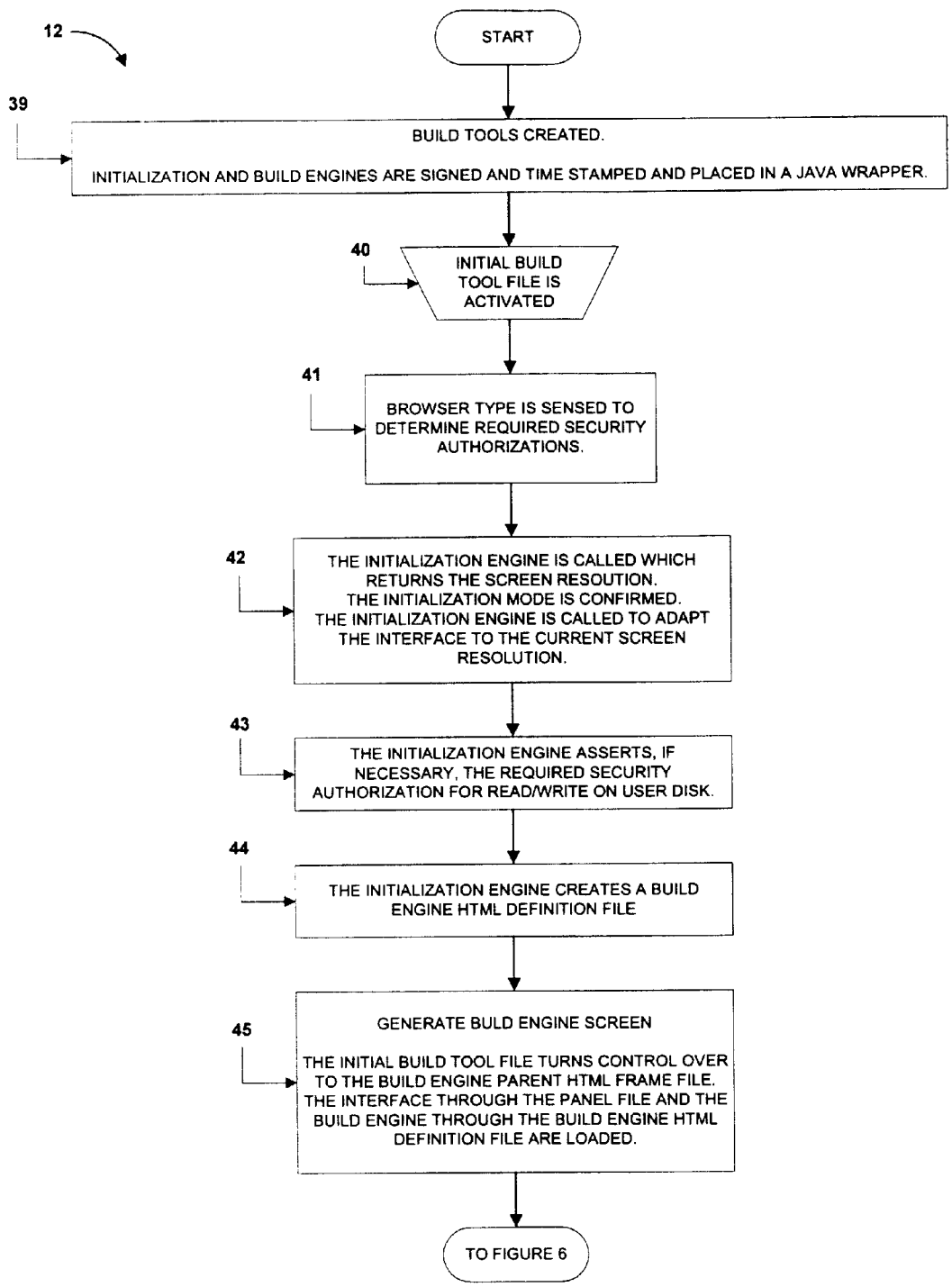
Fig. 5  INITIALIZATION

COMMUNICATION OF USER INPUT DATA AND STATUS BETWEEN THE ENGINE AND THE INTERFACE.

POPUP WINDOW AND PANEL INTERFACE AND COLOR TECHNOLOGY

IMPLEMENTATION OF PANEL INTERFACE OBJECTS

IMPLEMENTATION OF TABBED POPUP WINDOWS

UPDATE INTERNAL DATA BASE AND SET FEATURE FLAGS

Fig. 9    POLLING METHODS

ANALYZE INPUT: ERROR CHECKING

DIRECT WEB PAGE DATA ENTRY AND TEXT PROCESSING

Fig. 12  IMAGE PROCESSING

BUTTON, IMAGE AND PARAGRAPH STYLE SETTINGS AND TECHNOLOGY

VIDEO AND AUDIO FILE/CHANNEL PROCESSING

FRAMES, TABLES, FORMS AND DRAW OBJECTS

USER INTERACTION SETTINGS AND TECHNOLOGY

ANIMATION SETTINGS AND TECHNOLOGY

TRANSFORMATION SETTINGS AND TECHNOLOGY

OBJECT TIME LINES AND TECHNOLOGY

WEB PAGE TRANSITION ANIMATIONS, TIME LINE SETTINGS AND TECHNOLOGY

FILE OPERATIONS

VIEW OPERATIONS

DYNAMIC WEB PAGE RESIZING PROCESS

**EXTERNAL DATA BASE CREATION:
SECURITY AND OPTIMIZATION TECHNIQUES**

CREATE CUSTOMIZED AND OPTIMIZED RUNTIME ENGINE

CREATE THE HTML SHELL FILE

CREATE THE CAB/JAR FILES

WEB PAGE SIZE GENERATION TECHNOLOGY

READ DATA BASE AND GENERATE NECESSARY OBJECTS.

WEB PAGE GENERATION WITH SCALING TECHNOLOGY

THE MULTILEVEL WEB PAGE AND OBJECT THREAD TECHNOLOGY

WEB PAGE TRANSITION ANIMATION

Fig. 33  OBJECT TIME LINE TECHNOLOGY

CHILD TIME LINES FOR TEXT BUTTON AND IMAGE OBJECTS

COMPLETE WEB PAGE AND OBJECT THREAD LOOP

RESPOND TO USER INTERACTIONS

BROWSER BASED WEB SITE GENERATION TOOL AND RUN TIME ENGINE

FIELD OF THE INVENTION

The present application is directed to computing systems, and more particularly to methods and apparatus for building a web site using a browser-based build engine.

BACKGROUND

Conventional web site construction tools operate on traditional operating system platforms and generate as output HTML (hyper text mark-up language) and Script Code (e.g., JavaScript). A browser draws a web page associated with the web site by interpreting the HTML and JavaScript Code. However, conventional mark-up and scripting languages include numerous inherent limitations. Conventional mark-up and scripting languages have not been designed for serious multimedia applications. They have almost no file handling ability and very little computational power. In addition, they are remarkably slow and inefficient.

As such it is virtually impossible to write a web publishing application in HTML and JavaScript. All conventional implementations must, and do, utilize a full-featured programming language, such as C++ or Visual Basic. Since the current popular browsers do not support these languages, by necessity, conventional web publishing applications run on platforms other than the World Wide Web (WWW) and its browsers. Therefore, at best, a conventional web publishing application can offer only a crude preview capability of what a real web page will look like.

Although C++ and Visual Basic are very capable languages, the conventional web publishing applications written in these languages are still necessarily limited by the limitations inherent in their form of output, which as described above is typically HTML and scripting code. As such, a conventional web publishing application written in one of these languages suffers from the severe performance problems inherent in these languages.

For example, HTML and JavaScript are incapable of reformatting text and scaling buttons or images dynamically. In addition, most conventional web publishing applications design a web page layout to fit into a 640 pixel wide screen. This means that the ability for higher resolution screens to display more data horizontally is lost. Since capability is wasted on the horizontal plane, unnecessary vertical scrolling may be required. Further, on higher output resolution devices (screens), unsightly extra white space or background may be prevalent.

SUMMARY

In one aspect the invention includes a Browser Based build engine that is written entirely in a web based full featured programming language (e.g., JAVA). A Browser Based Interface (the "Interface") between the web designer and the build engine is included. The browser-based interface can be written in the World Wide Web's (WWW) Hypertext Markup Language (HTML) and its Extensions (Dynamic HTML, JavaScript and Cascading Style Sheets). The Interface includes a unique set of communication techniques. One technique allows for effective two-way communications between a JAVA engine and JavaScript. Another technique allows for communications between a JAVA applet object inside a JavaScript window, with the JAVA engine, which permits the implementation of advanced intelligent interface objects, such as a "slider" or a "dial".

In one aspect the invention includes a screen resolution sensing mechanism that causes a build engine (i.e. build tools) to adopt its interface to the web designer's screen resolution.

In one aspect, the invention includes a multi-dimensional array structured database, that, in addition to storing the numeric and string data found in conventional databases, also stores multi-dimensional arrays of various multimedia objects. They include colors, fonts, images, audio clips, video clips, text areas, URLs and thread objects. The invention includes a run time generation procedure that creates a compressed web site specific customized run time engine program file, with its associated database and a build engine generated HTML shell file.

The invention can include web page scaling technology, so that when the web site/web page is accessed on the WWW, the web pages and all the objects within them can be scaled to the user's screen resolution and to the then current browser window size.

In one aspect, the invention includes a proprietary multi-level program animation model (threads) that responds to multiple user interactions and time sensitive operations simultaneously.

In one aspect, the invention includes a mechanism for the dynamic resizing of the build engine's web page size during various editing operations.

In one aspect, the invention includes techniques for creating browser based interface objects that visually and behaviorally are identical to those of the MS Window's standard.

Aspects of the invention can include one or more of the following features. A browser based build engine is provided that includes a browser based interface. The entire web site build process is WYSIWYG (what you see is what you get), with the web designer working directly on and with the final web page. The data produced by the build engine is processed and ultimately placed into a multi-dimensional array structured database, and stored in an external file. A run time generation procedure creates a compressed program customized run time engine file, with an associated database and a build engine generated HTML Shell File.

When the web site/web page is accessed on the WWW, web page scaling technology can be accessed to generate web pages that are scaled to the user's screen resolution. A technique is provided so that an applet's size (height and width) can be set in real time under the control of either the interface or the build engine. At the same time a multi-level program animation model (threads) is activated for user interactions and time sensitive operations.

The browser based interface technologies create a set of interface objects with a look and feel that is identical to that of MS Windows, yet includes technologies that equal or occasionally surpass those of high end word processors, desk top publishers, and image processing software programs, particularly in the areas of interaction, animation, and timeline technologies. The run time engine includes multimedia capabilities often rivaling the digital processing capabilities seen on television and in the movies.

Because of the implementation of a variety of performance and file reduction techniques, the entire run time environment can range from as low as 12K, and no larger than 50K. This depends upon the features selected by the web designer. Although the compressed image, audio, and/or video files must also be downloaded, with a reasonable web site design, web pages should load quickly. The initial run time environment is no larger than 25K, thus the initial web page should generally load in less than 2 seconds, and subsequent web pages in less than 1 second with a 56K modem, even with numerous image files.

The present invention provides a real time, dynamic linkage between JAVA and HTML including two-way communications, in real time, between JAVA and JavaScript.

BRIEF DESCRIPTION OF THE DRAWINGS

The foregoing aspects and many of the attendant advantages of the invention will become more readily appreciated through the following drawings and their associated screen shots, referred to throughout the detailed description, wherein:

FIG. 3b is a process flow diagram showing a build process in accordance with one implementation of the present invention.

FIG. 5 is a flow chart, with its attendant screen shot shown in FIG. 37, that depicts a detailed view of a build time initialization procedure in accordance with one implementation of the present invention.

DETAILED DESCRIPTION

Figure 1:
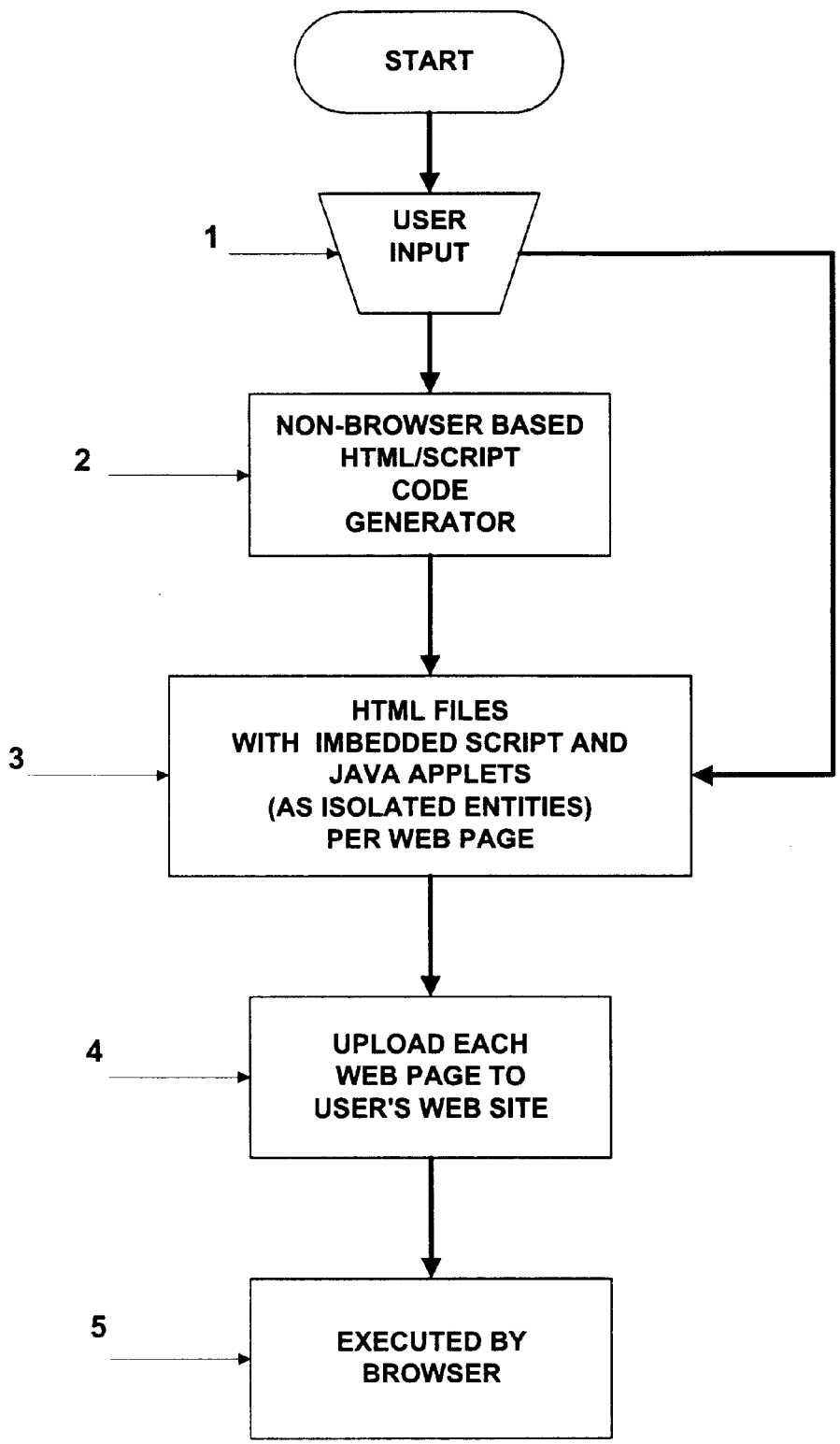
FIG. 1 is a flow chart depicting a prior art conceptual overview of how a user and a web browser interface.

Referring to FIG. 1, in a prior art process for creating and displaying a web site, the user either directly writes HTML and Script Code providing user input at 1 or operates a related prior art product at 2, which generates the HTML and Script Code at 3. A separate file, with its attendant HTML and Script Code is uploaded for each separate web page in the web site at 4, which is then interpreted by a browser when accessed at 5.

Figure 2:
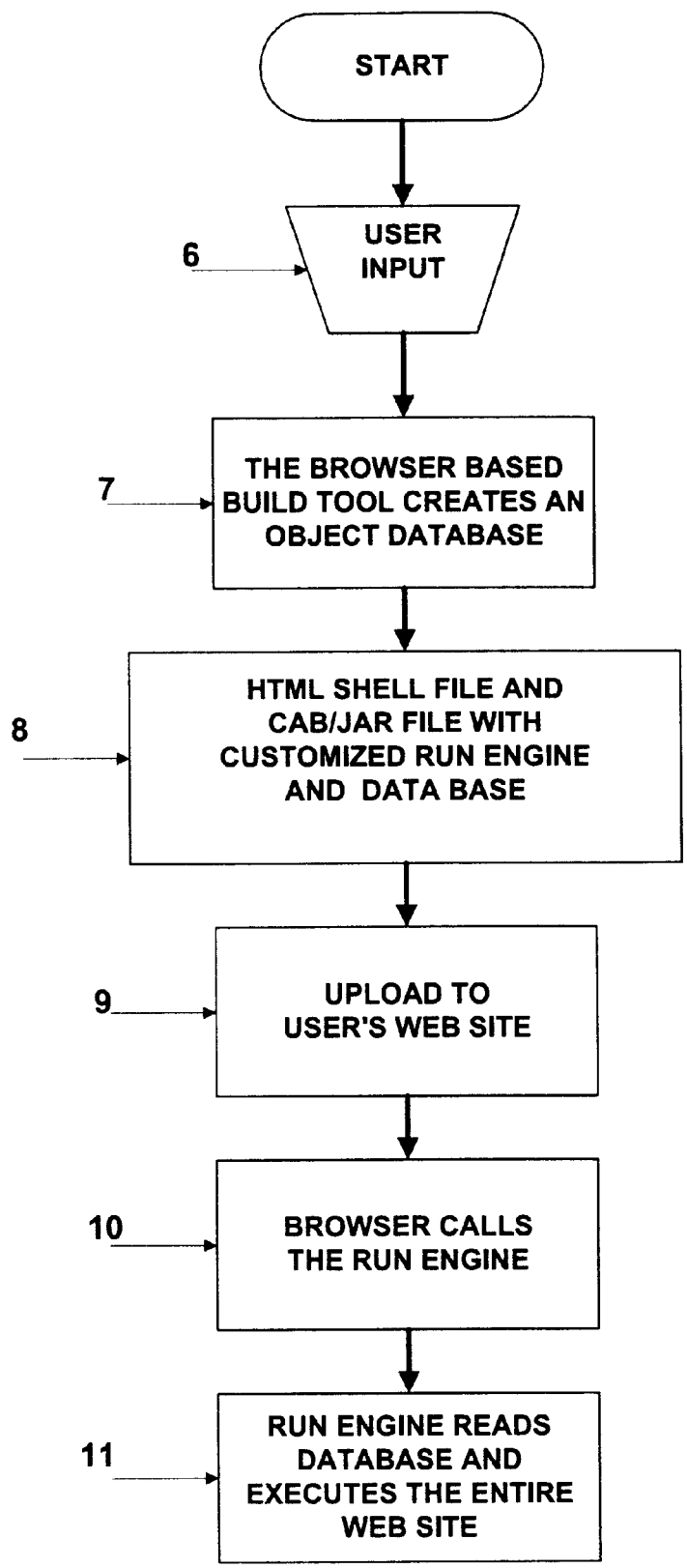
FIG. 2 is flow chart depicting a conceptual overview of how a user interfaces with a web browser when implementing the present invention to construct a web site.

FIG. 2 shows a process for creating and displaying a web site in accordance with one aspect of the invention in which, a user operates a build tool at 6, working directly with one or more of the final web pages in a full WYSIWYG mode. The build tool accepts the user input and creates a multi-dimensional embedded multimedia object database at 7. A run time generation process is then invoked to create the necessary run time files at 8 (including HTML shell, CAB/JAR files and a customized runtime engine) which are then loaded to a user's web site at 9. The web page(s), when viewed by a web surfer, are activated by the browser calling the customized run time engine at 10. The run time engine then begins to read the database and down load image, audio and video files, while simultaneously drawing the first web page for viewing or user interaction at 11.

Build Tool and Process

Figure 3A:
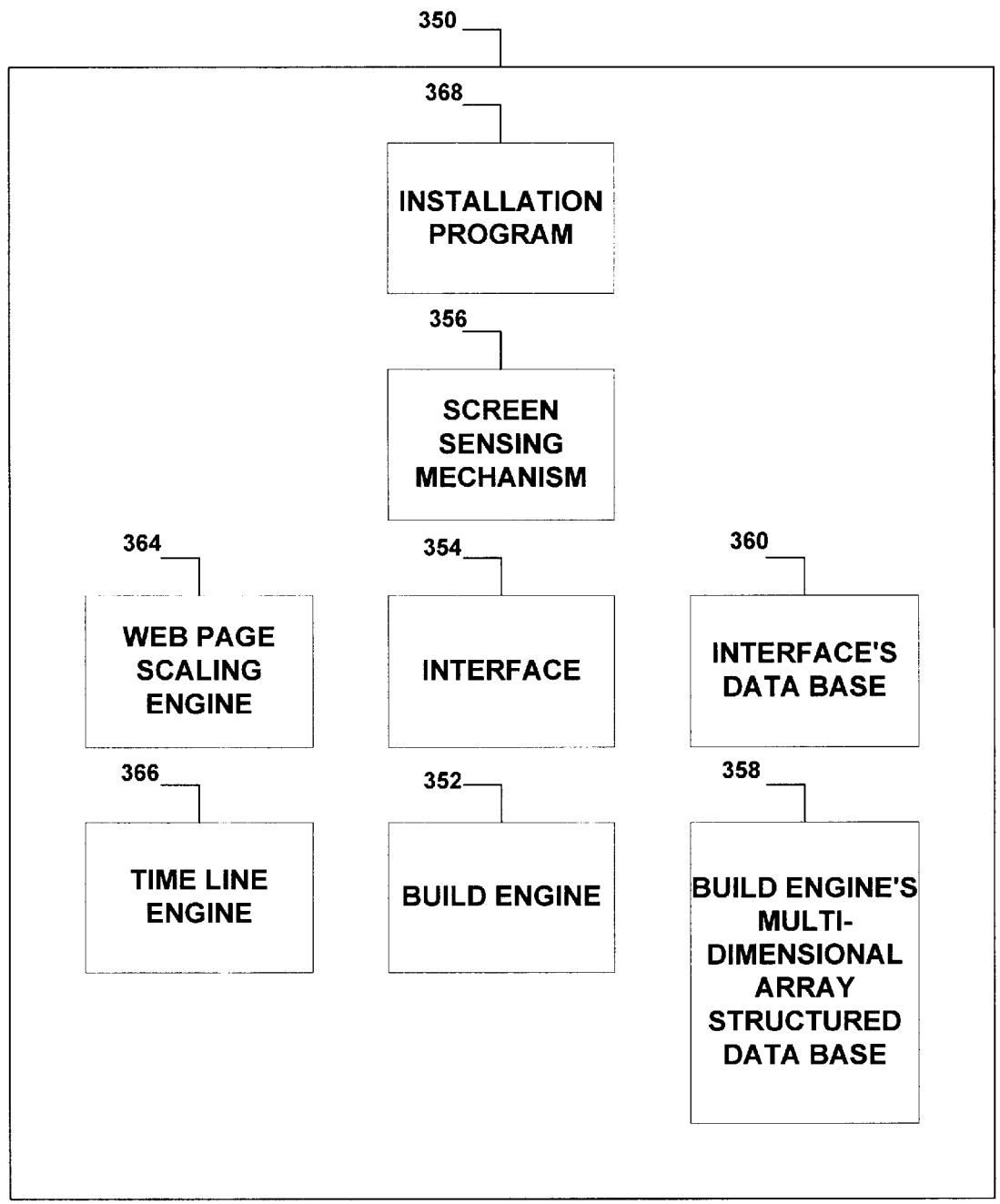
FIG. 3a is a schematic diagram showing the main components of a build tool in accordance with one implementation of the present invention.

FIG. 3a shows a build tool 350 at the detailed component level. The build tool includes a build engine 352, interface 354, screen sensing mechanism 356, multi-dimensional array structured database 358, interface's database 360, web page scaling engine 364, time line engine 366 and installation Program 368. The operation and use of each of these components is described in greater detail below.

FIG. 3b is a flow of the build process executed by the build tool to create a web page/web site. Referring to FIGS. 3a and 3b, the process begins with an initialization (12) and continues through to a point where a web site has been defined and stored in the build engine's internal database (29).

The build tool 350 includes plural individual tools that are created and initialized at (12). The processes for creating and initializing build tools are described in greater detail below in association with FIG. 5. After the build tools are created and initialized at 12, the build tool 350 interacts with the user, receiving user commands (actions), for example, to build a web site. The build tool 350 processes user responses and communicates the same and status information to both the build engine 352 and interface 354 at 13. The processes for interacting with the user are described in greater detail below in association with FIG. 6.

In one implementation, the interface includes a panel (and its objects, including a menu bar, menus and sub-menus, tool bars, status fields, interactive fields and interactive pull down lists), pop-up windows (called "dialog boxes" in MS Windows), color and alert message interface technologies, built with HTML, Dynamic HTML (DHTML), JavaScript, and Cascading Style Sheets (CSS). Interface 354 responds to the user input and may display a pop-up window, update the interface objects, or display alert messages, as shown at 15. The operation of the interface 354 is described in greater detail below in association with FIG. 7a, FIG. 7b and FIG. 7c.

As the build engine 352 receives data and status information, it updates an internal database (part of multi-dimensional array structured database 358) and sets feature flags at 14. The processes for updating the internal database and setting flags are described in greater detail below in association with FIG. 8. To enable effective two-way communication between the interface and the build engine, polling technology is included as shown at 16. The details of the polling process are described in greater detail below in association with FIG. 9.

Whenever user input is received, the build tool 350 analyzes the input including error checking at 17. In one implementation, the input is analyzed and then processed by object type (class). The process for analyzing input to determine type is described in greater detail below in association with FIG. 10. In one implementation, the number of different object processing technology classes are four, and include direct text entry (18), image processing (19), video or audio files and links (21) and frames, tables, forms and draw objects (22). The build tool 350 processes the user input based on class. The processes invoked for direct text entry are described in greater detail below in association with FIG. 11. The processes invoked for image processing is described in greater detail below in association with FIG. 12. The processes invoked by the text button, paragraph, and image style technologies are described in greater detail below in association with FIG. 13. The processes invoked for processing audio and video files and channels are described in greater detail below in association with FIG. 14. The processes invoked for processing frames, tables, forms and draw objects are described in greater detail below in association with FIG. 15. When an image, text button or paragraph object is to be inserted in the web page, the current style that is selected in the panel defines the initial settings used when creating the object in the web page. As such, button, image and paragraph style setting and technology will be invoked at 20 depending on the user input. The processes invoked by the paragraph style setting and technology is described in greater detail below in association with FIG. 13.

After the input is processed as described above, a check is made to determine if one or more animation or transformation (interaction) techniques are to be invoked at 23. The run time engine provided in accordance with the teachings of the present invention support various user interactions, including support for numerous animation and transformation techniques, and both web page and object time lines. Depending on the user selections, one or more technologies may be invoked. In the implementation shown, the build tool 350 is configured to check to determine if the input data is related to plural technologies including: user interaction technology (24), animation technology (25), transformation technology (26), object time line technology (27) and web page transition animation technology (28). The processes invoked for user interaction technology are described in greater detail below in association with FIG. 16. The processes invoked for animation technologies are described in greater detail below in association with FIG. 17. The processes invoked for transformation technologies are described in greater detail below in association with FIG. 18. The processes invoked for object timeline technologies are described in greater detail below in association with FIG. 19. The processes invoked for web page transition animation technologies are described in greater detail below in association with FIG. 20.

After the build tool 350 has processed the user input, one or more file operations can be invoked at 29*a*. In one implementation, the file operations are "save", "save as", "new", "close", "open", "apply" and "web site". If "open" or "web site" are selected, the build tool 350 initiates the dynamic web page resizing process at 29*c* (See FIG. 22). If "save" or "save as" are selected, the build tool 350 initiates a run generation process (See FIG. 4 and FIG. 24). File operations "close", "open", and "new" can also initiate the run generation process, based on the state of the build process and user action.

Figure 4A:
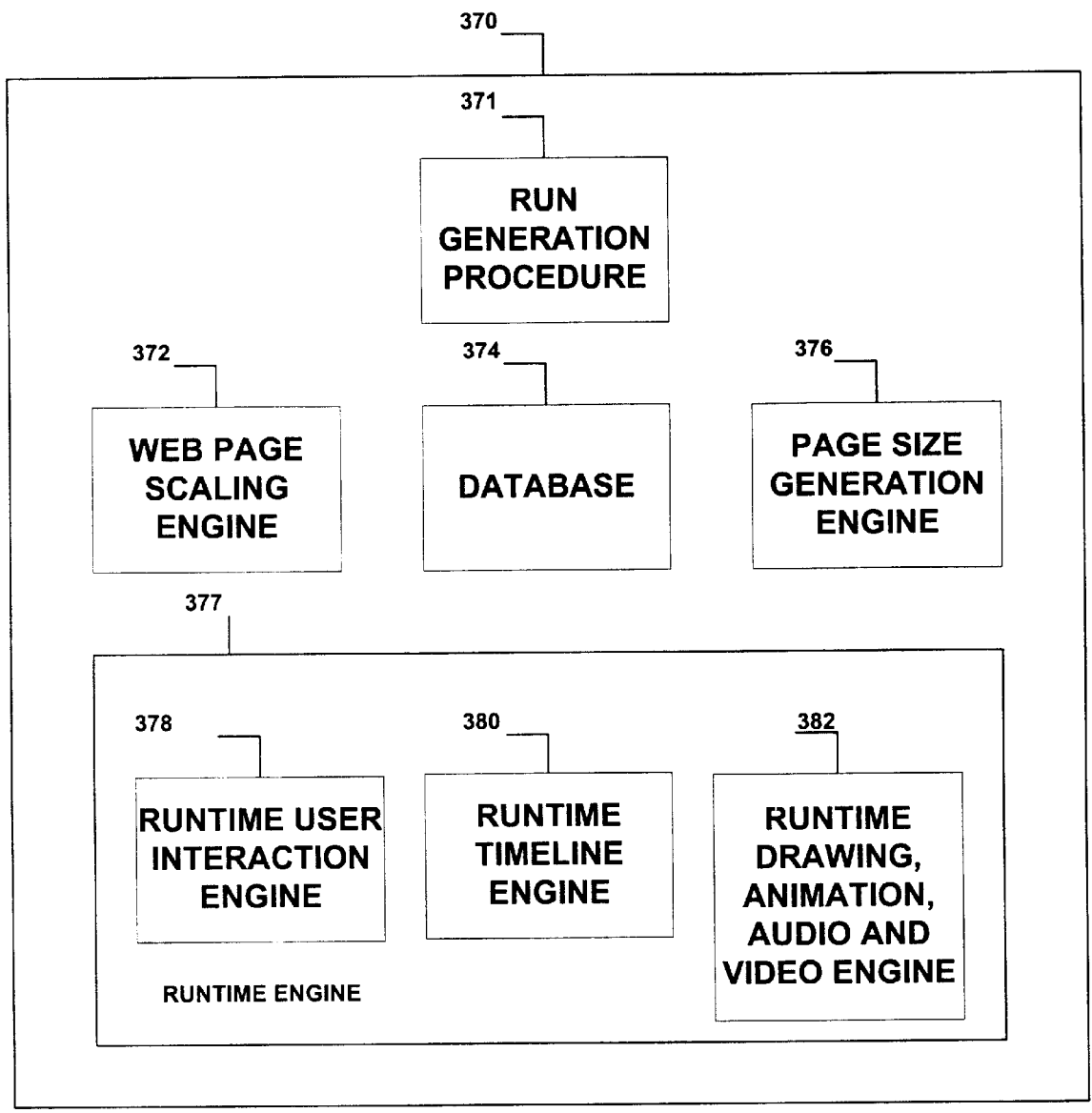
FIG. 4a is schematic diagram showing the main components of a run generation tool in accordance with one implementation of the present invention.

At any time during the processing of user input, one or more view operations can be invoked at 29*b*. In one implementation, the view operations supported are "normal", "preview", "play", and "zoom" (at various zoom percentages). If any of the "zoom" levels are selected, the build tool initiates the dynamic web page resizing process at 29*c* (See FIG. 22). If the "preview" or "play" view operations are selected they will initiate the run time process (See FIGS. 28 through 36). FIG. 4*a* shows a run generation and runtime tool 370 at the detailed component level. The run generation and runtime tool 370 includes a run generation procedure 371, web scaling engine 372, a database 374 and a (web) page size generation engine 376 and run time engine 377 including a runtime user interaction engine 378, a runtime timeline engine 380 and a runtime drawing, animation, audio, and video engine 382. In one implementation, run time engine 377 includes plural engines, each of which may in themselves include plural engines.

Figure 4B:
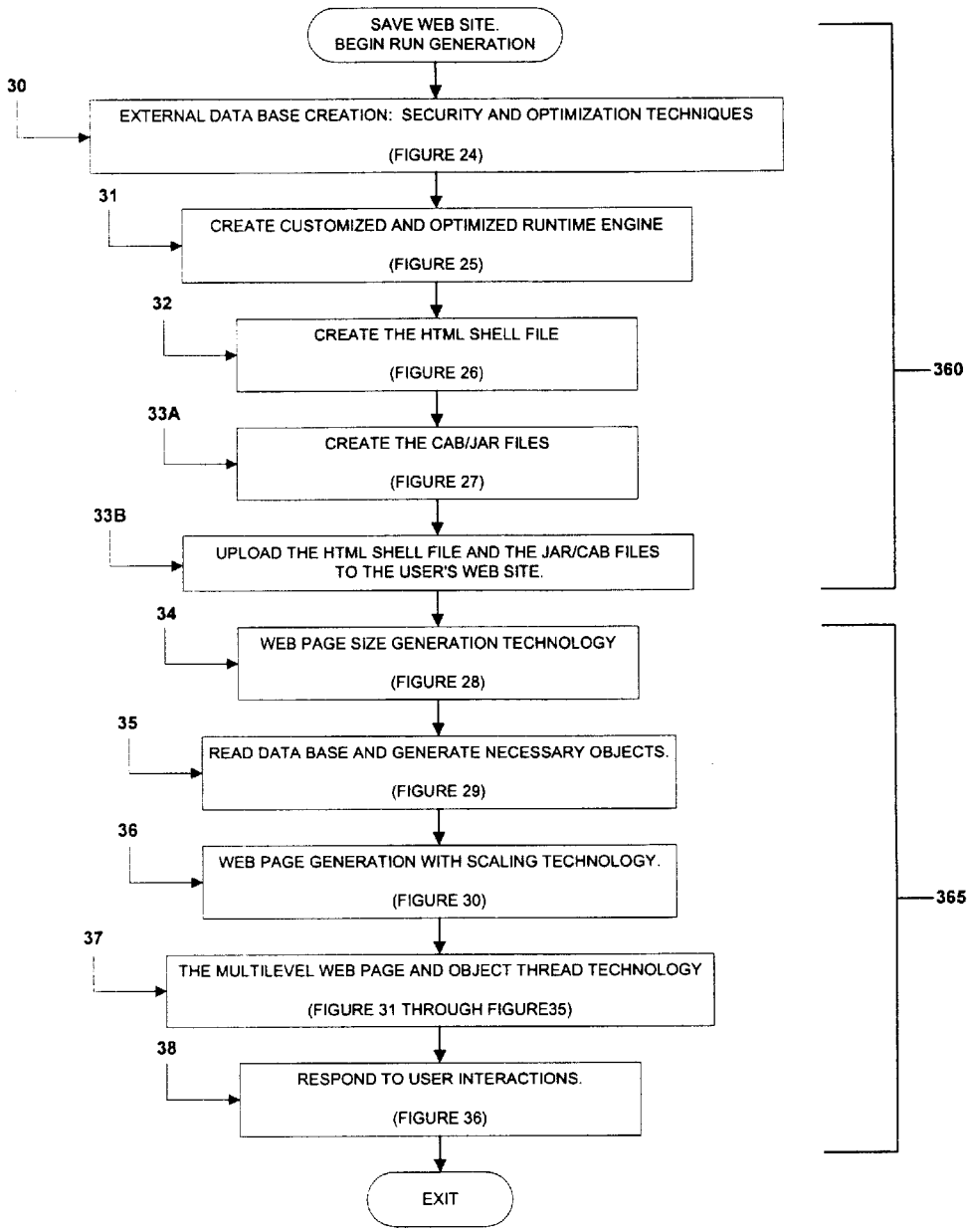
FIG. 4b is process flow diagram showing a run time process in accordance with one implementation of the present invention.

FIG. 4*b* shows the run processes including methods for creating the run time files, including the external database, the web site specific customized run time engine, the HTML shell file, and the compressed CAB/JAR file. The run processes also include methods for scaling each web page to the web surfer's then current screen resolution and web browser window size. After a web page has been scaled, a run time engine executes a multi-level thread technology, which presents to the viewer web pages that can operate under time lines that may include animated transitions. Associated with the web page time lines can be object time lines that may define entrance, main and exit animations, transformations, and synchronized time lines for child objects. Each object can have multiple object states, responsive to various user interactions, which can result in numerous types of visual and audio responses and actions.

Referring now to FIGS. 4*a* and 4*b*, a run generation process 360 begins by invoking the run generation procedure 377. The run generation procedure 371 begins by creating the external database (part of database 374) at 30. The external database may include references to image, video and audio files, and video and audio channels. The process for creating the external database is described in greater detail below in association with FIG. 24. A customized and optimized run time engine (run time engine 377) is created at 31. The customized and optimized run time engine (run time engine 377) generates the web pages for the web site and is activated from the user's server. The process for creating the run time engine 377 is described in greater detail below in association with FIG. 25. The HTML shell file is created at 32, and then the CAB and JAR files are created at 33*a*. The HTML shell file includes JavaScript Code to activate and interrogate the page size generation engine 376, and to activate the entire runtime engine. The CAB and JAR files both include the runtime engine and database in compressed executable form. The CAB file(s) will be activated by the HTML shell file if it senses the browser as being Microsoft Explorer, otherwise it will activate the JAR file(s). The processes for creating the HTML shell file and the CAB and JAR files are described in greater detail below in association with FIG. 26 and FIG. 27, respectively. The run generation process portion of the run processes is completed as the HTML shell file and the CAB and JAR files are uploaded to the user's web site at 33*b*.

After the upload, the run time process 365 portion begins with the run time engine 377 invoking a web page size generation technology (engine) 376 at 34. The web page size generation technology can be used to determine the screen resolution and the current browser window size. The process for invoking and initializing the web page size generation technology is described in greater detail below in association with FIG. 28. The external database is read and the necessary objects generated at 35 from their stored external references. These objects include image, audio, and video objects. The processes for generating the necessary objects are described in greater detail below in association with FIG. 29. A web page generation and scaling technology (web page scaling engine 372) is then invoked at 36. The web page scaling engine 372 can be used to reformat and scale objects that had been placed in a web page during the build process. The processes employed by the web page generation and scaling technology are described in greater detail below in association with FIG. 30. The run time engine then, as necessary, executes a multilevel web page and object thread technology at 37 while the runtime user interaction portion 378 of run time engine 371 responds to user interactions at 38. The processes invoked by the multilevel web page and object thread technology are described in greater detail below in association with FIGS. 31–35. The processes invoked by the run time engine to respond to user interactions are described in greater detail below in association with FIG. 36.

Detailed Build Processes

Referring now to FIGS. 3*a* and 5 through FIG. 22 the build tool 350 and its associated build process are described.

Referring first to FIGS. 3a and 5, initialization methods are shown. At 39 the build tools are created as part of the execution of the installation program 368. They can include:

1: Initial build tool HTML/JavaScript file (IBTF)
2: An initialization engine (IE).
3: A build engine.
4: The build engine parent HTML frame file. (PFF).
5: A "Control Panel and Status Line" HTML/JavaScript File ("panel") for;
   Controlling the JavaScript database.
   Calling and initializing all pop-up windows.
   Reading all pop-up window values, and updating a JavaScript database
   Calling the build engine and passing all necessary data and status information.
   Polling the build engine for two-way JAVA/JavaScript communication.
      Displaying and updating the status of its interface objects.
      Issuing alert messages.
   Processing direct user interactions with the panel's interface objects.
6: Numerous HTML/JavaScript files, one for each pop-up window.
7: JAVA applets, embedded in HTML/JavaScript pop-up window files.
8: A build engine HTML definition file that is created and modified dynamically.

The initialization and build engines can be placed in a JAVA wrapper so that JavaScript code may receive and process return values from JAVA methods. The initialization and build engines are also created in a "Signed" CAB file, and assigned the necessary security rights, so that the engines can assert the necessary permissions, if permitted by a given browser's security manager, when read or write operations are required. In one implementation, an installation program is run prior to the first use of the build tools. After installing all of the files, the installation program can install the necessary class libraries required by the run generation process in which the customized and optimized run time engine is created (See FIG. 25). The installation program can also set the necessary environmental variables and installation options.

At 40 the web surfer points a browser at (i.e. calls) an initial build tool HTML/JavaScript file (IBTF). At 41 the IBTF identifies the current browser type and version number. Presently, each browser has different security manager implementations. In one implementation, the invention supports the following three categories:

1: With appropriate signing and time stamping, and with appropriate assertions of permissions, the browser will permit local read/write operations.
2: With appropriate signing and time stamping, and with appropriate assertions of permissions, the browser will permit local read operations, but write is only legal if sent to a server.
3: Local read/write operations are illegal, but are permitted on the server. The IBTF can include a flag that can be set to indicate which security implementation is supported, so that all subsequent read/write operations will comply with the current browser's security manager.

At 42, the IBTF causes the browser to execute the IE so as to sense the screen resolution and for adapting the interface to the user's screen resolution. In one implementation, after entering a delay loop and waiting for the IE to report it is fully loaded and initialized, the IBTF calls two IE methods, which return the width and height of the current screen and browser window. The IBTF then checks for the presence and value of a "mode cookie", to determine whether this is an initialization process, a web site open command process, or a dynamic web page resizing process. If the mode cookie is set to initialize, or it doesn't exist, the IBTF calls the IE to generate the build engine's HTML definition file. At 43 the IE then asserts the required security permission and at 44 creates a build engine HTML definition file and writes this file to the local disk (as appropriate). At 45 the IBTF then turns control over to the PFF for activating the "paner" and build engine and displaying the build engine user interface screen.

Figure 37:
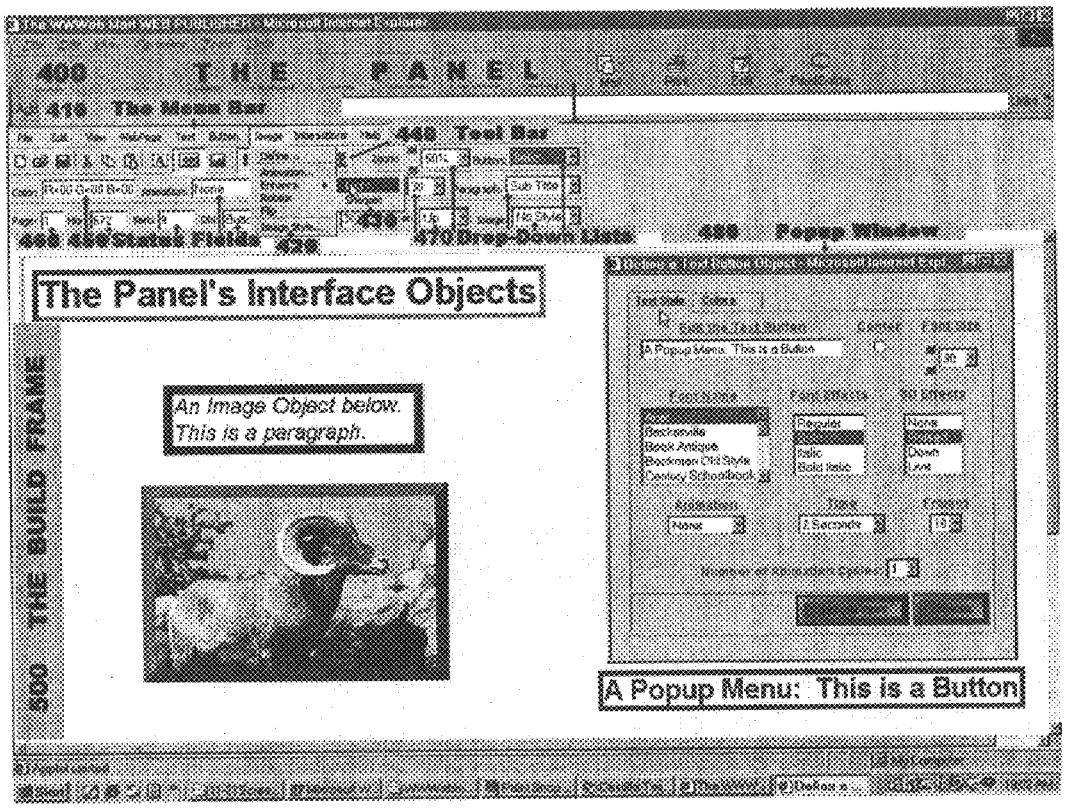
FIGS. 37–63 are screen shots of the user interface presented by the build process in accordance with one implementation of the present invention.

The build engine user interface screen includes a "panel" portion and a build engine portion, each of which are loaded into their respective frames, after which the web site page(s) build process can begin. Screen shot FIG. 37 shows a representation of the user interface presented by the build tool. The user interface includes a panel 400 and build frame 500. Panel 400 includes a menu bar 410, menus 420 and sub-menus 430, tool bars 440, status fields 450, interactive fields 460, interactive pull down lists 470 and operational pop-up windows 480. The menu bar 410 can be used for selecting a menu command that will cause a menu to be drawn. The menu (one or menus 420) can be used to select a feature command that could cause an operational pop-up window to be drawn, a direct user input technique or object manipulation technique to be activated, or a sub-menu 430 to be drawn. A sub-menu (one of sub-menu 430) can cause the same type of events as that of a menu. The tool bars 440 include various icons that are shortcuts to feature commands that are also available through the menu bar and its menus. In addition, the tool bar 440 can be used to show the current state of a feature. Status fields 450 show the current value of a certain setting. Interactive fields 460 also show the current value of a setting, but can also be directly changed by the user by typing into the field, with the result immediately processed by the build engine 352 and displayed in the build frame 500. Interactive pull-down lists 470 also show the current value of a setting, but, if selected with a mouse click, will drop down a selection list, which may have an elevator attached. The user can click on an item in the selection list, which will become the current setting with the result immediately processed by the build engine 352 and displayed in the build frame. Operational pop-up windows 480 can have tabs assigned if the number of choices within the pop-up window is large. One or more settings can be changed through a pop-up window, with the results immediately processed by the build engine 352 and displayed in the build frame 500. These interface techniques are described in greater detail below in the build process.

Figure 6:
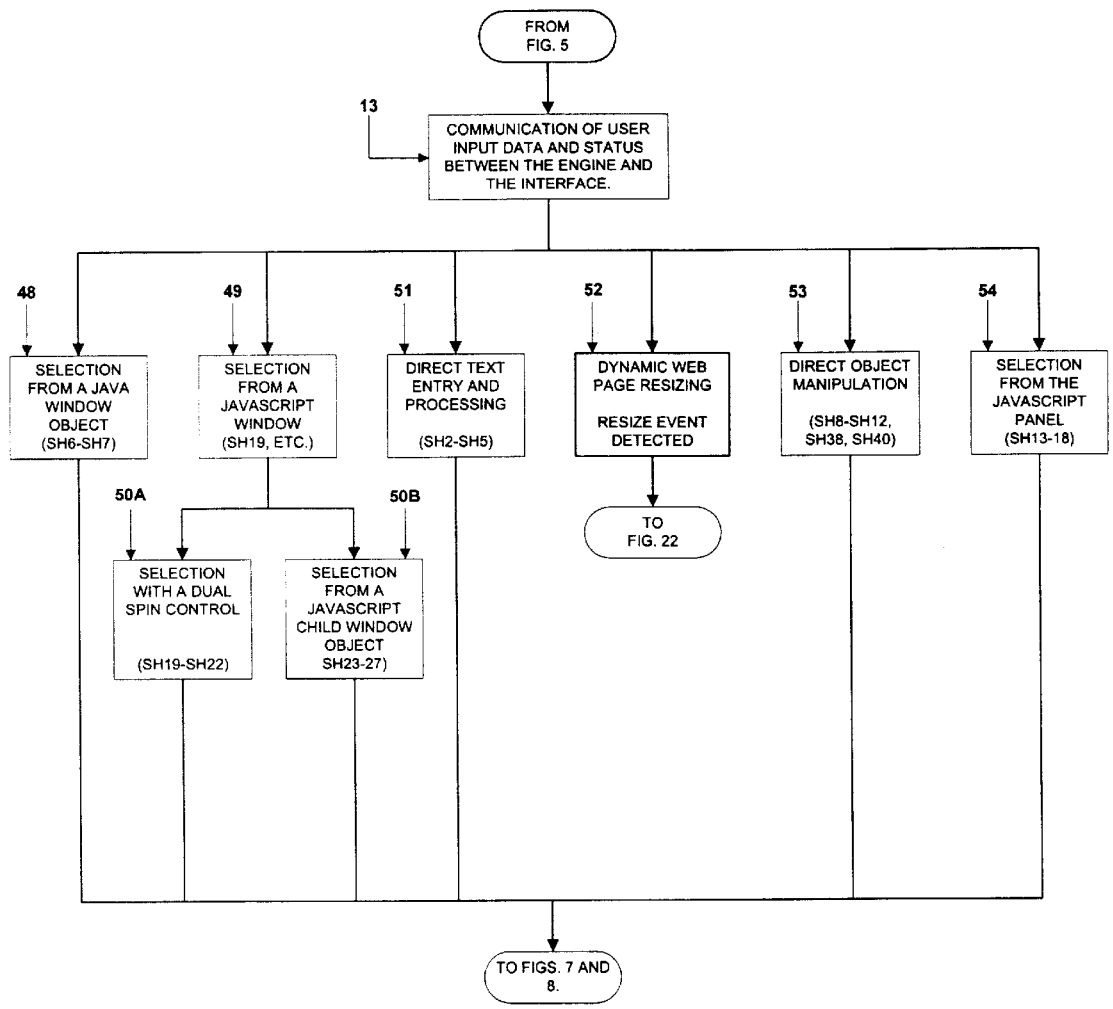
FIG. 6 is a flow chart, with its attendant screenshots shown in FIGS. 38–48, that depicts a detailed view of the build time supported user input techniques and techniques for communication of data and status between the build engine and the interface in accordance with one implementation of the present invention.

The build frame 500 is used to present the actual web page as constructed by a user. The user can directly enter text, import images, video and audio for display/playback and create animations and transformations that can be viewed in the build frame. FIG. 6, with its attendant screen shots FIG. 38 through 48, shows the user input techniques supported in one implementation of the invention. In one implementation, the user inputs supported include: selection from a JAVA window object (48); selection from a JavaScript window (49) including selection with dual spin control (50a) or selection from a JavaScript child window object (50b); direct text entry (51); page resizing (52); direct object manipulation (53); and, selection from a JavaScript panel (54).

In the implementation shown, of the six user input techniques sensed at 13, the code for supporting selections from a JavaScript pop-up window at 49 and selections from the "panel" at 54 were implemented entirely in HTML/JavaScript Code, while support for direct text entry at 51 and direct web page object manipulation at 53 were implemented entirely in JAVA (or any other browser-based full featured programming language). In one implementation, code for supporting selections from a JAVA Window object at 48 and dynamic web page resizing at 52 are implemented using both HTML/JavaScript and JAVA. Those of ordinary skill will recognize that, JAVA could have been used more extensively to implement the methods described at 48, 49 and 54. However, in order to achieve the most intuitive and MS Windows like interface, and because effective two-way communication between JavaScript and JAVA had been achieved (See FIG. 9), the languages proposed appear to best support the particular user input technique.

Figure 23:
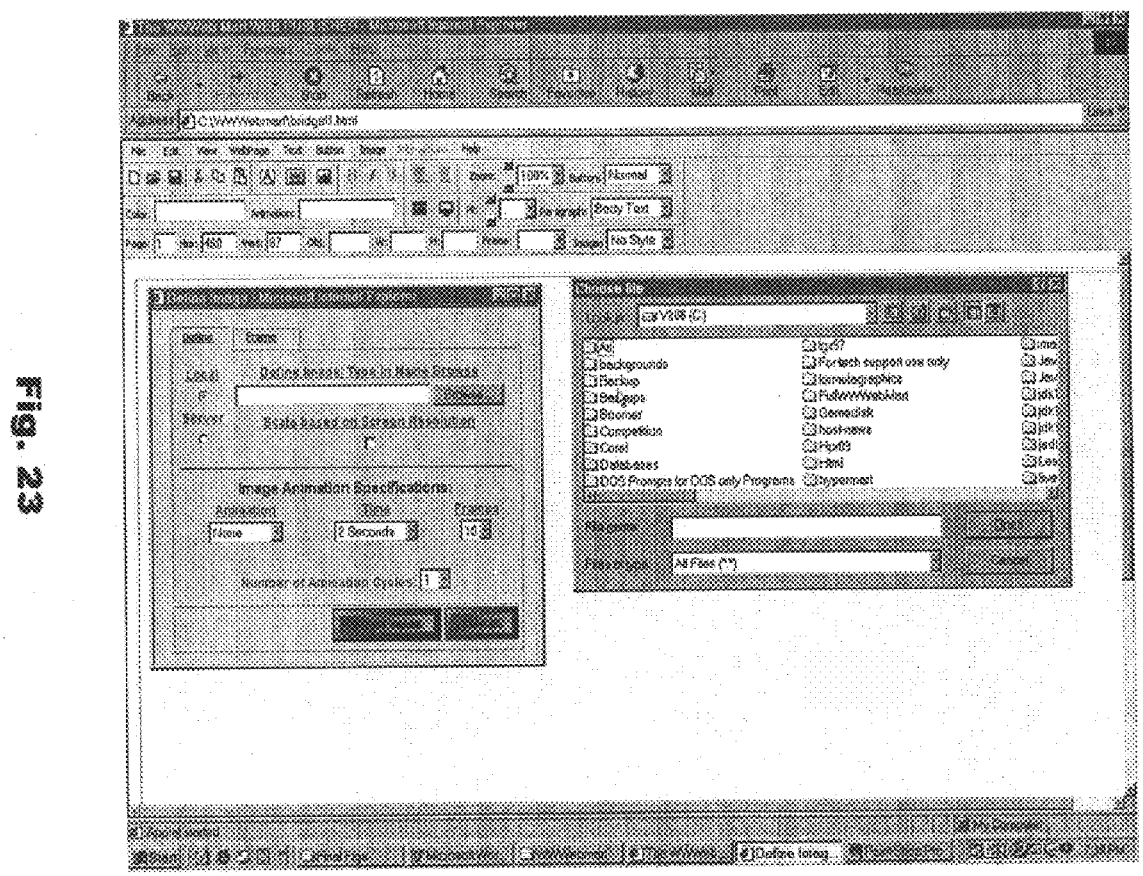
FIG. 23 is a screen shot showing a file selection window operation in accordance with one implementation of the present invention.

For example, FIG. 23 shows an actual file selection window 2300, implemented by the invention. This type of file selection window is available in JavaScript/HTML, but not supported by JAVA for applets. File selection window 2300 greatly enhances the interface for the user, as the image, sound clip, or video clip names need not be memorized. File selection window 2300 further eliminates possible operator error when typing in a pathname or filename. The present invention utilized the strengths of JavaScript/HTML with the power of JAVA to create a unique browser based interface solution. In one implementation, the HTML form element "INPUT type=file" was embedded in a JavaScript pop-up window to create the file selection window. The file selection window returns a string value of the image (or other file type) pathname to the pop-up window. The pop-up window's JavaScript then could be used to call a JavaScript function in the panel (panel 400) which:

1: Reads the pathname value in the pop-up window.
2: Creates a string version of a valid URL by adding the correct URL protocol to the string.
3: Updates the panel's database (interface's database 360).
4: Calls a JAVA method in the build engine, which casts the string value of the URL into a URL object, creates an image object which is then drawn on the screen, and updates its internal database.

User inputs that are a selection from a JAVA window object (48) permit the implementation of a vast array of intelligent user input interface objects, from sliders to dials, which are extremely intuitive and significantly enhance the user's ergonomic experience. In one implementation, user input interface objects are supported as follows. When a selection from a JAVA window is detected, a pop-up window (applet) is presented (associated with the feature being manipulated, e.g., color, volume) and an engine method is called to begin two-way communication (for passing as arguments any necessary status information). The engine begins polling a JAVA abstract object waiting for a static variable's value to change. The pop-up applet processes the value as defined by a user interaction event, and updates the static variable in that same JAVA abstract object with the new value. Upon detecting a change in the polled static variable, the engine calls the necessary methods to process that new value. These methods include can include a brightness filter that is applied to the image bitmap utilizing techniques very similar to that of that employed by the "fade in" and "fade out" animations, described in association with FIG. 33

User inputs for a selection from a JavaScript pop-up window (49) can be made in a manner identical to that of making a selection from a dialog box under MS Windows, including the use of tabbed JavaScript pop-up windows. In one implementation when a selection from a JavaScript pop-up window is detected, the panel's (panel 400) JavaScript opens a pop-up window. The pop-up window's initial values are set from a JavaScript database defined in the panel or by the panel calling the engine for the current values and then setting the initial values. In a tabbed JavaScript window, clicking on a tab will call the pop-up window's JavaScript in order to change the state and appearance of the tabbed JavaScript window in the expected way. The pop-up window's JavaScript calls the panel's JavaScript when a completion event occurs. The panel's JavaScript reads or the pop-up window's JavaScript writes the pop-up window's field values, causing the panel's database to be updated, and the panel then calls the appropriate build engine 352 method, passing as arguments the necessary data and status conditions. Initializing the pop-up window's values and updating the panel's database upon completion can alternatively be implemented by JavaScript functions executed within the pop-up window's HTML file.

Figure 42:
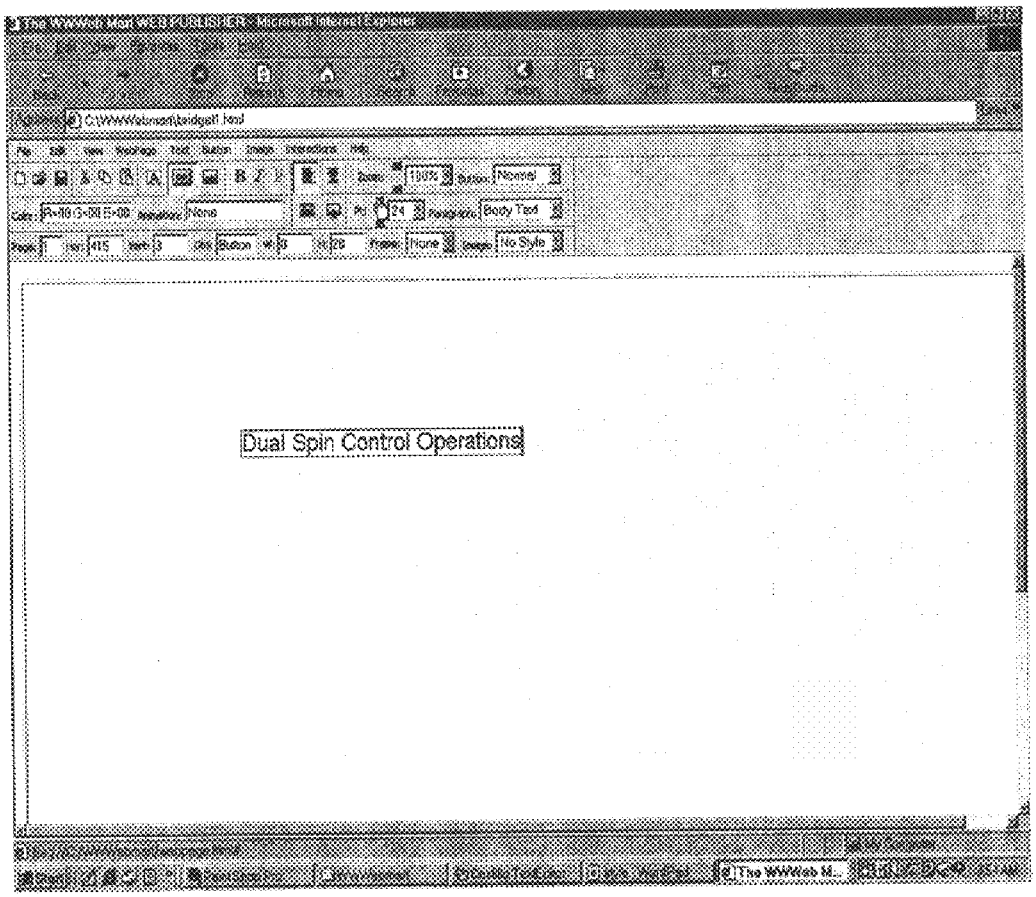
Figure 43:
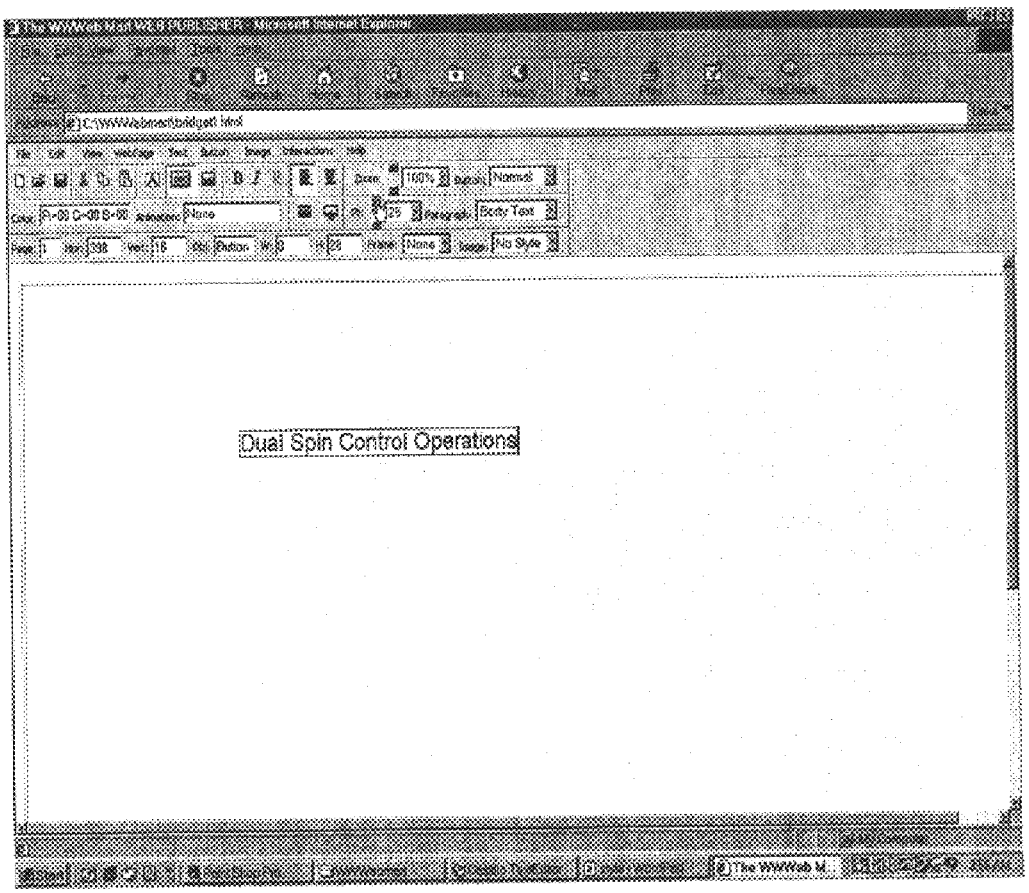
Figure 44:
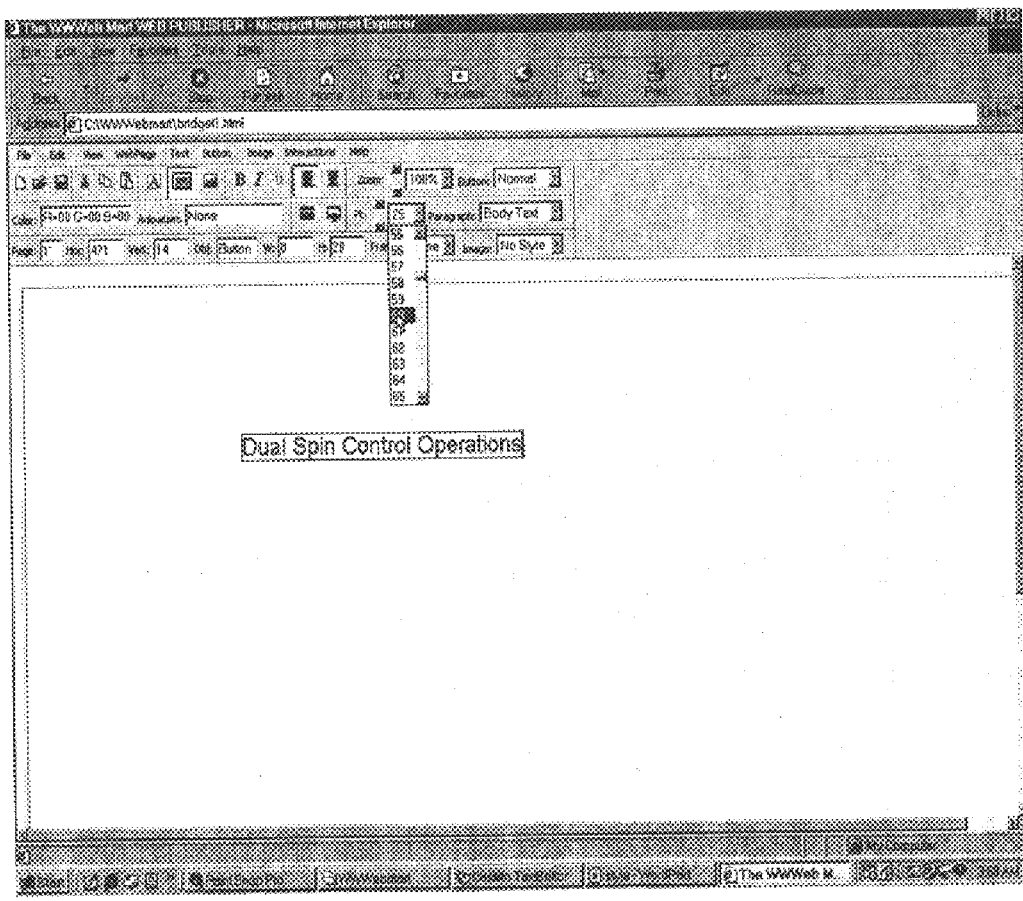
Figure 45:
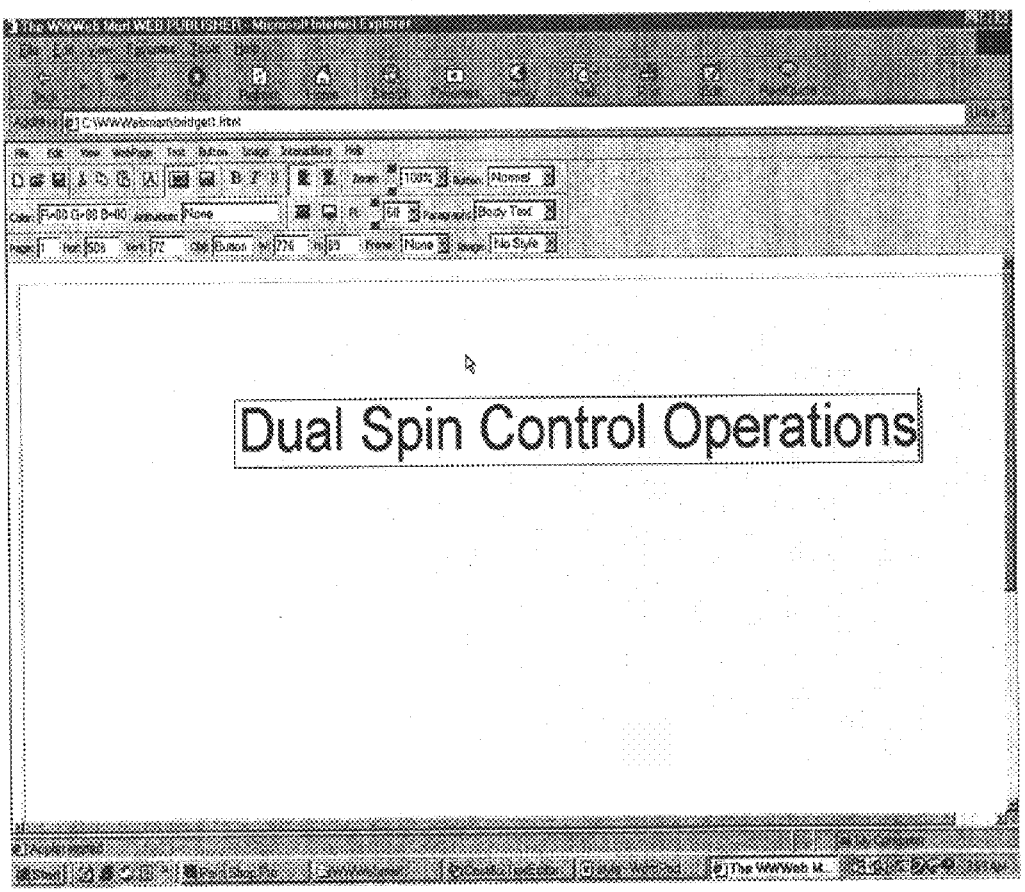

In addition, there are interface extensions that can extend beyond the usual MS Windows implementations. One is support for a selection from a dual spin control at 50A. Screen shots FIGS. 42–45 show a visualization of an implementation of this interface technique. Screen shot FIG. 42 shows the mouse placed over an upper spin control. Screen shot FIG. 43 shows the result after the user clicked once on the upper spin control. Notice that the value has been incremented by 1, and the text button object is now at a larger point size. Screen shot FIG. 44 shows a combo box list selected by the mouse with the user about to select a significantly larger point size. Screen shot FIG. 45 shows the result of that selection, including the effect on the text button object.

In one implementation, dual spin controls are supported as follows. Each spin control has three visual states, so that when the user places the mouse over the control it appears to light up, and when the mouse button is depressed (pressed down), the spin control is modified to give the appearance of being pressed. JavaScript methods are called in the panel (panel 400) to:

1: process each mouse click event over either spin control,
2: range check as necessary,
3: update the value in the HTML frame object residing in the pop-up window,
4: update the JavaScript (panel 400) database,
5: call the build engine 352, if necessary, passing the necessary value and status.

If the mouse is clicked on a combo box, the selection window opens in the usual way. If a mouse click in that window is detected, another JavaScript method in the panel 400 is called to update the JavaScript database, and call the build engine 352, if necessary, passing the necessary value and status as function call arguments.

Figure 46:
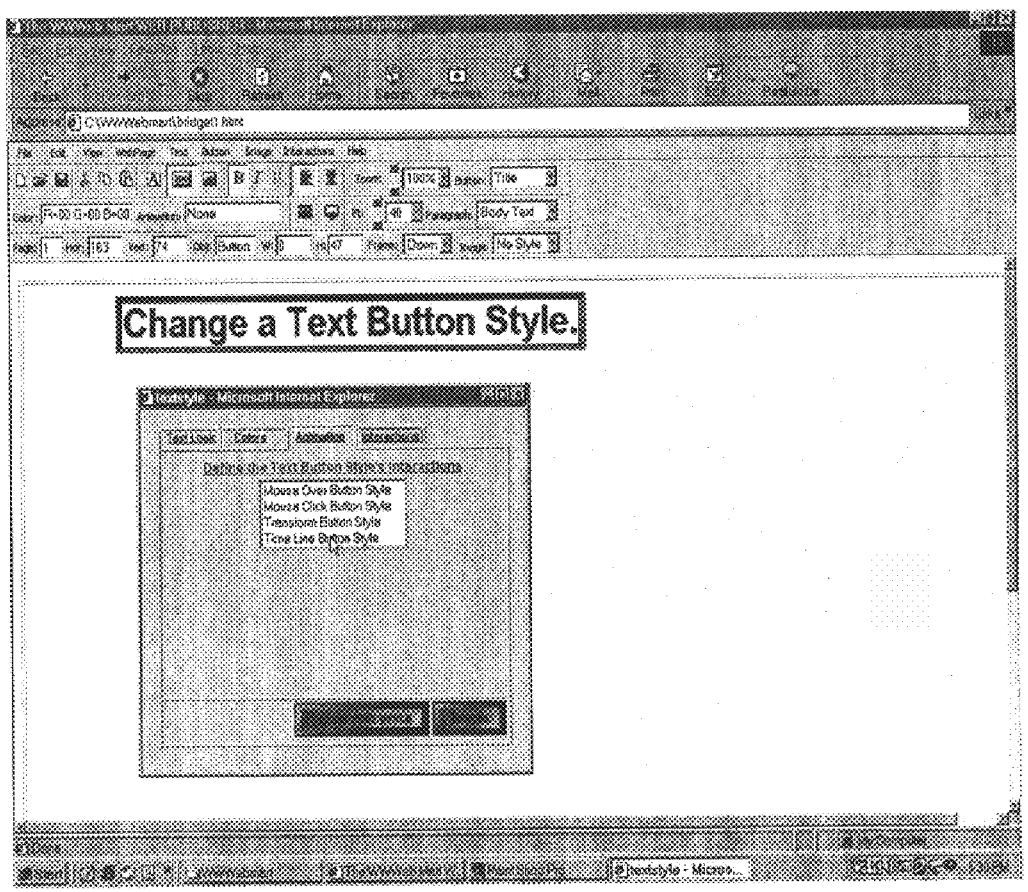
Figure 47:
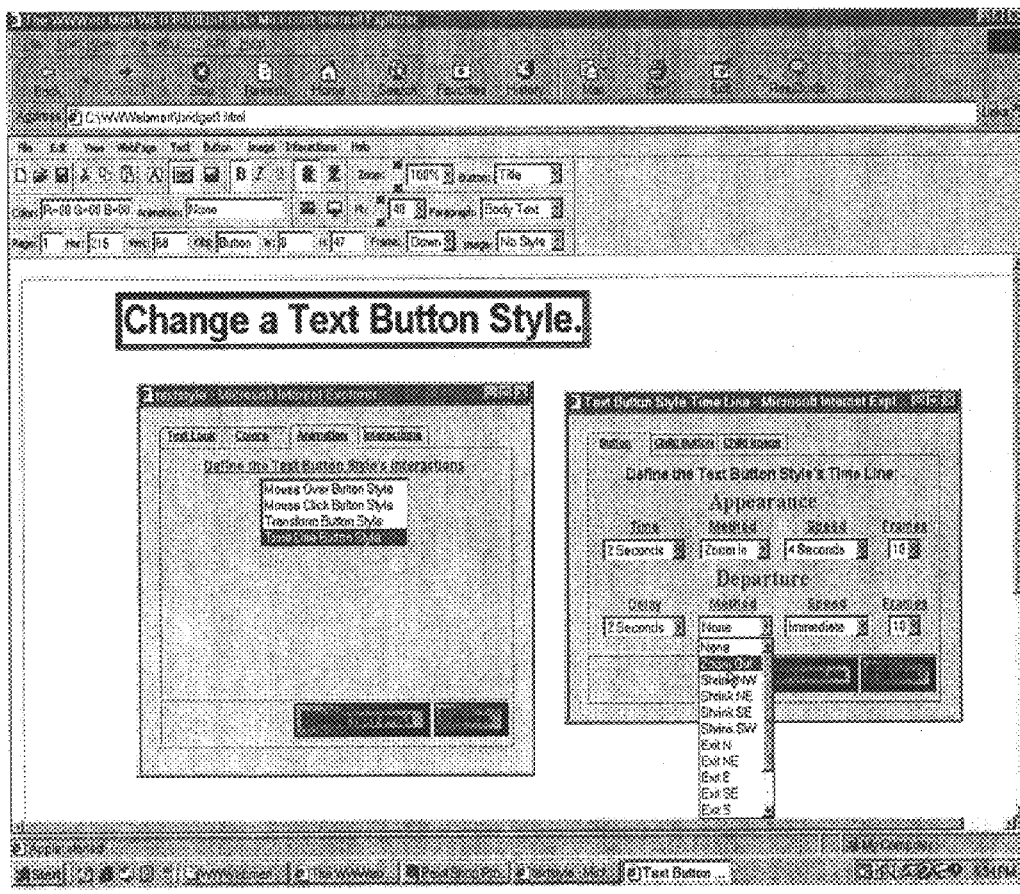

Another interface extension is selection from a JavaScript child window at 50B. This technique helps simplify the number of choices given to the user in a complex pop-up window operation. A selection from a JavaScript child window can be supported as follows. The panel's (panel 400) JavaScript opens the pop-up window. The pop-up window and its child pop-up windows' initial values are set from the JavaScript database defined in the panel 400. The pop-up window's JavaScript opens the child pop-up window and sets its initial values. The child pop-up window's JavaScript calls the pop-up window's JavaScript when a completion event occurs. The pop-up window's JavaScript reads the child pop-up window's values, sets those values to its own internally defined variables, and calls the panel's JavaScript. The panel's JavaScript reads the pop-up window's values (which include the settings for its own fields as well as those of its child windows), updates its database, and calls the appropriate build engine 352 method, passing as arguments the necessary data and status conditions. Screen shots FIGS. 46–47 show a visualization of an implementation of a JavaScript child window. Screen shot FIG. 46 show a change text button style pop-up window. Screen shot FIG. 47 shows the result after the user selected the "Define the Mouse Down Text Button Style" child pop-up window.

Direct text entry is supported at any arbitrary cursor location. In one implementation, "text areas" are utilized in an unconventional way, in order to support full text entry, text editing, text button and paragraph styles, and reformat. Direct text entry can be defined at any arbitrary cursor location, and then text can be dragged to any other arbitrary location.

Figure 38:
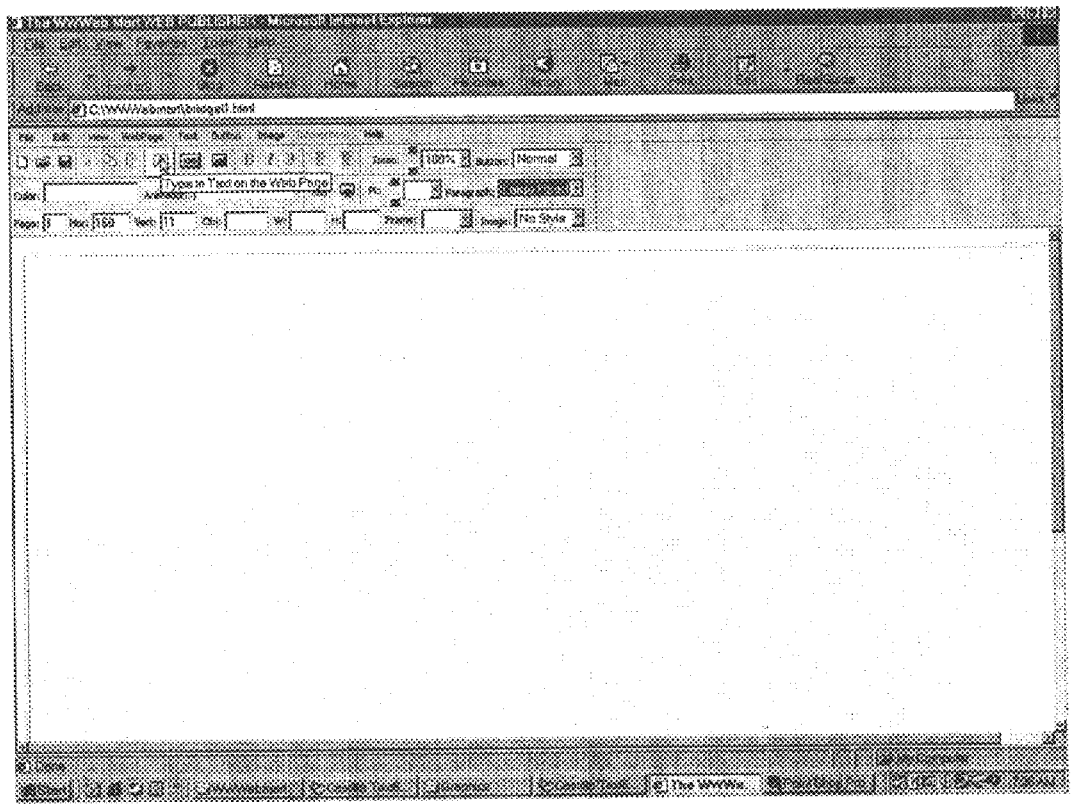
Figure 39:
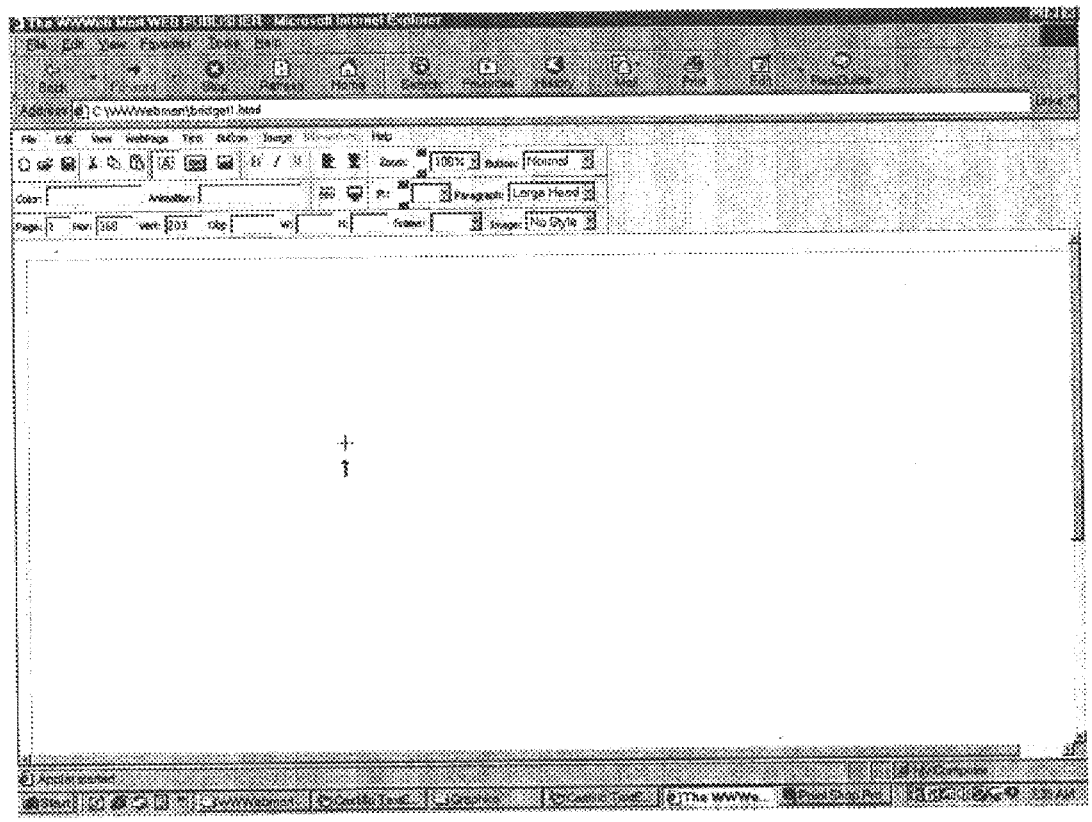
Figure 40:
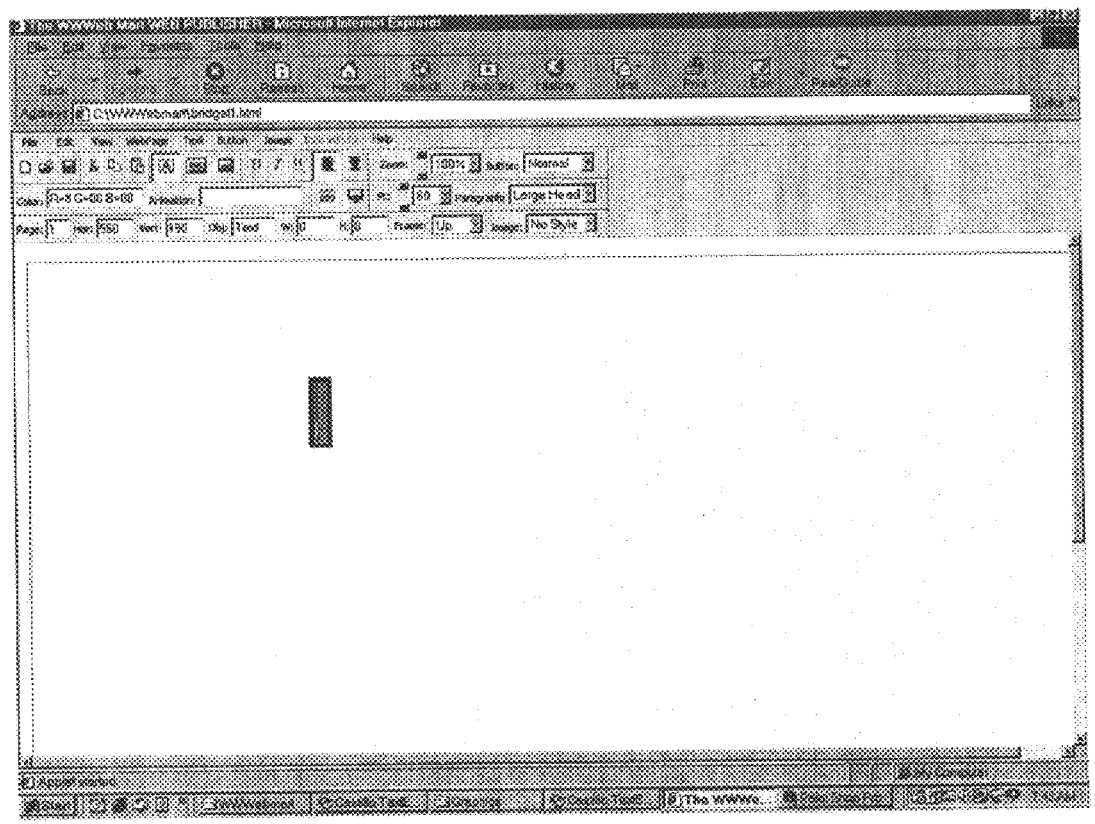
Figure 41:
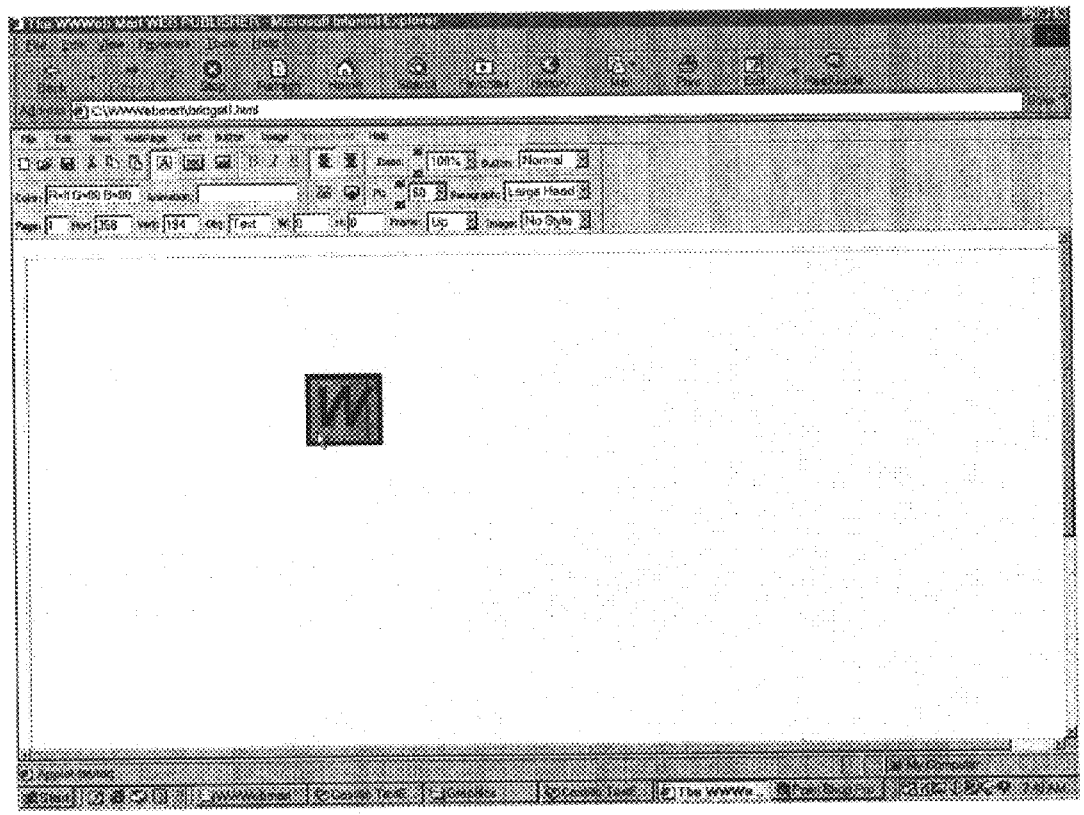

Text areas are objects that are utilized by JAVA primarily as an interface object for the implementation of a form and are generally "added" to the screen at the initialization time of a JAVA applet. Text areas are decidedly not WYSIWYG. The present invention creates text areas dynamically. Screen shots FIG. 38 through FIG. 41 show a visualization for an implementation of this technique. Screen shot FIG. 38 shows the user selecting a text object from the create text icon object from a tool bar of the panel (panel 400). When the text icon object is selected, the cursor shape is changed to indicate the selection while the text icon object is in the select state. Screen Shot FIG. 39 shows that the cursor has changed shape and that the user has placed the cursor at an arbitrary location on the web page. Screen shot FIG. 40 shows the result after the user has clicked the mouse. A text insertion point and a selection rectangle are drawn at the arbitrary web page location. Screen shot FIG. 41 shows the result after the user has pressed the letter "W" on the keyboard. As can be seen in screen shot FIG. 41, a draw method associated with the build process immediately hides the text area. However, text editor methods associated with the build process continue to utilize the text area as a hidden, dynamically resizing frame, whose size is subject to text button or paragraph style settings, by the amount of text, by the text's orientation (vertical or horizontal) and by the text's font style(s) and font size(s). As the build engine 352 detects a relevant mouse event or keyboard event, the build engine 352 updates the necessary variables that are defined as return values in specified build engine methods. Polling technology (see FIG. 9) retrieves the relevant values and calls the necessary JavaScript method for processing. In one implementation, these same techniques (text area techniques) are used in the scaling technology (See FIG. 30). Since the direct text entry and editing processes bypass completely the interface and the JavaScript code, the polling technology (See FIG. 9) is used to pass the text string values back to the JavaScript database, in order for the interface's pop-up windows to be correctly initialized for subsequent text operations.

Figure 9:
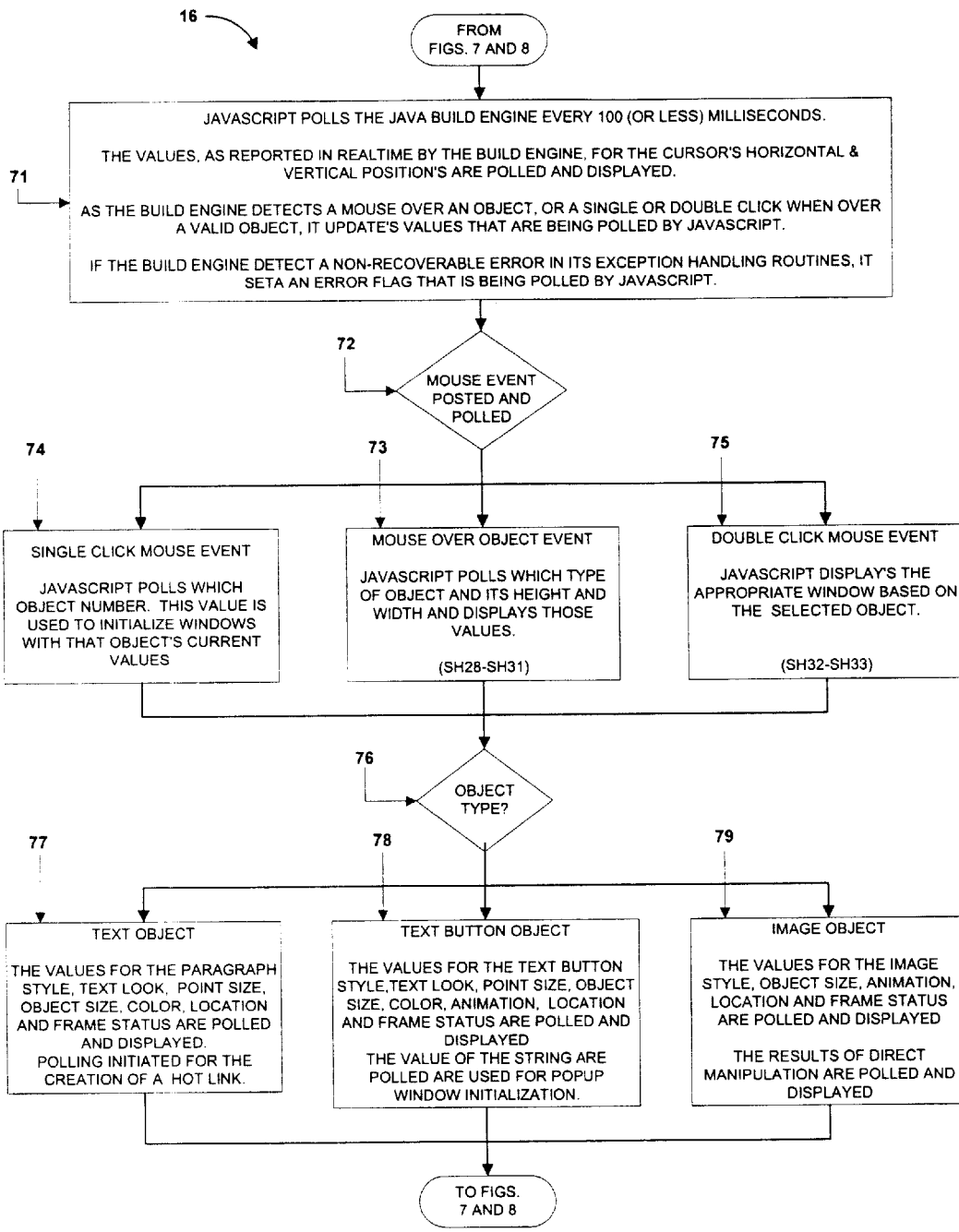
FIG. 9 is a flow chart, with its attendant screenshot shown in FIG. 37, that shows a detailed view of the build time polling methods used to facilitate communication from the JAVA build engine to the interface.

Direct text processing at 51 begins with the build engine 352 detecting a "Mouse Drag" or a "Mouse Double Click" event. In one implementation of the present invention, if a mouse drag event is detected, the entire initial anchor word (assuming the "mouse down" event placed the text insertion point within a word) is selected as well as the entire closing anchor word. If a double click event occurs over a word, the entire word is selected. If a double click event is detected over a special hot zone (for example, just to the left of a paragraph line), then an integral number of words are selected. Appropriate four-dimensional variables are set, and a draw system is called. The draw system paints the selected line segment in the marked text background and text color. The build engine 352 then sets a return flag to be read by the polling technology (FIG. 9). A panel JavaScript poller (FIG. 9) detects this flag and redraws the panel's "Text" menu object showing the choices available when text is selected. In one implementation, the "Text" menu includes choices of "Text Style", "Hot Link", "Preferences", and "Format". The states for the tool bar icon objects of "Bold", "Italic" and "Underline" are set appropriately as is the setting for the point size interactive drop-down list. The panel's JavaScript then calls an appropriate build engine method that resets the flag. If the panel's JavaScript detects the user selecting the "Text Style", "Hot Link", "Preferences" or "Format" choices, it creates the appropriate pop-up window. Upon detecting a user completion event, the panel's JavaScript reads the data settings in the pop-up window, closes that pop-up window, and sends this data to an appropriate build engine method for processing (See FIG. 11). Dynamic web page resizing at 52 is invoked when the build engine 352 detects a user initiated web page resize event. This could be caused by the "Open" or "Web Site" commands from the "File" menu, or from a "Zoom" command from the "View" menu. This technology is explained in detail below in association with FIG. 22.

Direct object manipulation at 53 includes dragging of any object, resizing of non-text objects, rotation and other image manipulation functions, as required. The processing for direct object manipulation begins by analyzing the type of object selected and the state of the object, as set by the interface based on a user's panel selection. The build engine 352 then changes the mouse cursor's appearance, and the type of selection rectangle, including which attachment points, if any, should be drawn and activated. (See FIG. 10 for the mouse event processing technology and FIG. 12 for image processing technology). In one implementation, the same direct object manipulation polling technology is used as described above with regard to direct text entry.

If a selection of an interactive field, interactive drop-down list object, or a toll bar icon object from the JavaScript panel is detected at 54, then the following steps can be invoked, depending on the selection. The point size of a paragraph, a marked text range inside a paragraph or text button object can be changed. The state of an object's 3D frame can be changed. In one implementation, three states for an object frame are supported. The 3D frame can be drawn as a "raised" 3D object, as a "depressed" 3D object, or as a "raised" 3D object that turns into a "depressed" 3D object if a mouse down event is detected over the object to which the 3D frame is assigned. An object's style can be changed. The current web page can be changed. Finally, any other operation that has been defined by a tool bar icon object in the panel can be invoked. This includes the "file" menu choices of new, open and save, the "edit" menu choices of cut, copy and paste, inserting a text, button or image object onto the web page, applying or removing the bold, italic, and underline text attributes for a text or button object, centering or uncentering any web page object, setting the animation for a button or image object, changing the zoom level of the web page, or previewing the web site.

As each new user input is received and processed in accordance with the steps shown in FIG. 6, at all times the internal databases of the JavaScript panel and the build engine 352 are maintained completely in synchronization.

Synchronization is maintained so that: all status information displayed by the panel is current and correct; all data and status information passed to the build engine 352 from the interface are consistent with the build engine's state at any given time; the values in all pop-up windows are correctly initialized. In order to meet these requirements, all of the variables in the JavaScript panel database are explicitly "typed", to be compliant with the strict variable typing methodology generally imposed in all full featured programming languages such as Java. As JavaScript does not explicitly type anything, where using JavaScript herein, all string, Boolean, and integer variables are typed. Full two-way real time communication support between the JavaScript/HTML interface and the JAVA build engine 352 is provided as described below in association with FIG. 9.

Figure 7A:
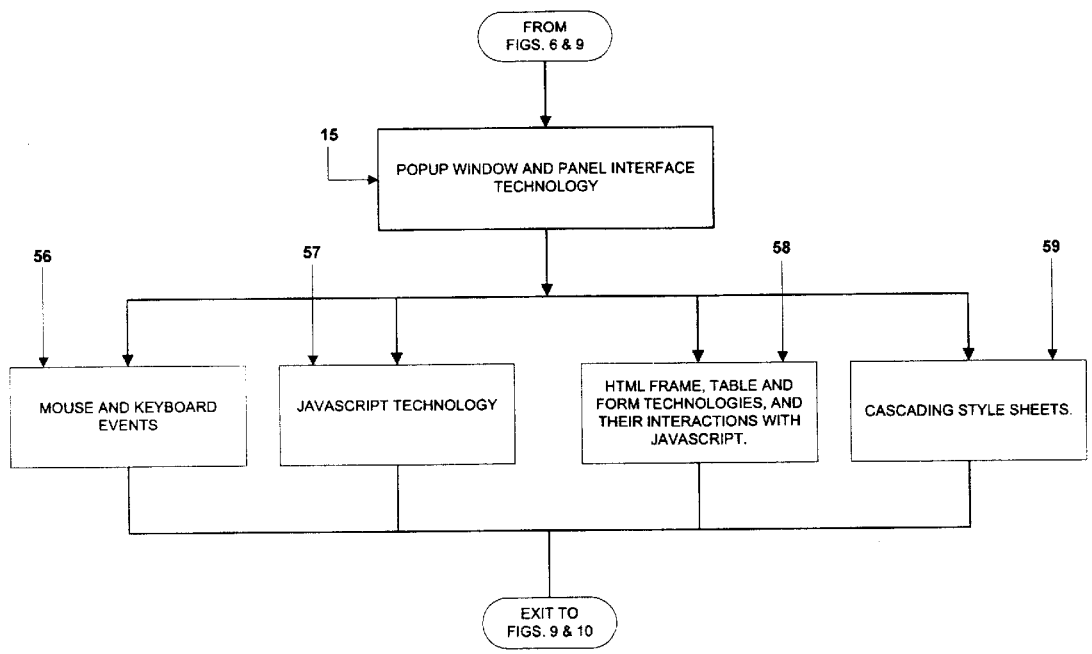
FIG. 7a is a flow chart that shows an overview of the build time techniques for implementation of pop-up windows (usually called "dialog boxes" in MS Windows), the panel interface, and interface for color selection.

FIG. 7a shows four tools utilized for an implementation of the pop-up window and panel interface technology (15 of FIG. 3). The panel and pop-up windows make extensive use of JavaScript mouse events, including onMouseDown, onMouseUp, onMouseOver, onMouseOut, onClick and onchange methods (56). The pop-up windows make extensive use of the JavaScript onLoad and onUnLoad methods. In one implementation, when a pop-up window is loaded by the panel, the panel goes into a wait loop, set for 5 times a second using the JavaScript setTimeout method, interrogating in each loop whether the pop-up window's status flag has been set. Meanwhile the pop-up window, when loaded by the browser, executes the onLoad method in order to set a flag in the panel informing the panel that the pop-up window is now loaded. Upon detecting the load event completion, the panel then proceeds to initialize the fields in the pop-up window. The panel will always close a pop-up window after detecting its completion event. However, if the user has closed the pop-up window in a non-standard way, the pop-up window executes the onUnLoad JavaScript method, which sets a flag in the panel notifying it that the pop-up window has been closed.

The JavaScript code in the panel and in all pop-up windows make extensive use of JavaScript method onKeyDown for the following operations:

1: When the focus is on the icon representing completion ("OK" is used in many MS Windows applications) causing the enter key to initiate a pop-up window/panel completion event.

2: When the focus is on the icon representing cancellation ("cancel" is used in many MS Windows applications) causing the Esc key to initiate a pop-up window/panel cancellation event.

3: When the focus is on any pop-up window or panel object, such as a data entry field, a check box, a radio button, a drop-down and scrollable list, a scrollable list, an icon, or a DHTML tab object (discussed below), the navigation keys are captured by the onKeyDown method, a JavaScript function is called, and the appropriate change is made. For all pop-up window and panel objects, when the Tab key or the combination of the Tab key with the Shift key are detected, the onFocus JavaScript method is employed and the focus moves to the appropriate pop-up window object. If the pop-up window or panel object is a data entry field, drop-down list or a scrollable list, all cursor key operations are detected and the insertion point is adjusted accordingly. If the pop-up window or panel object is a check box, radio button a icon, or a DHTML tab object, and a cursor key (up, down, left, right, home and end keys, with or without the Ctrl or Shift keys) is detected, the onFocus JavaScript method is employed and the focus moves to the appropriate pop-up window object.

One methodology for this feature requires that all keyboard events be monitored, at all times. When the scan code for the enter key is detected, the appropriate JavaScript function is called to close a pop-up window and to call the appropriate JavaScript function for processing of the relevant data (updated in the window) and communicating, as necessary, with the build engine 352. In another implementation, rather than the panel going into a wait loop awaiting notification from the pop-up window for data initialization purposes the pop-up window, when loaded, executes the onLoad JavaScript method, and reads the required data values directly from the panel's database, utilizing the JavaScript "opener.fieldname.value" technique. Similarly, the pop-up window, when detecting its completion event, updates the panel's database with the revised values from its own fields and then calls the appropriate JavaScript function in the panel for further processing. Both implementations, and any combinations, assure that the pop-up windows are correctly initialized, the panel's database is correctly updated, and the data is successfully sent to the build engine 352 for processing.

Figure 48:
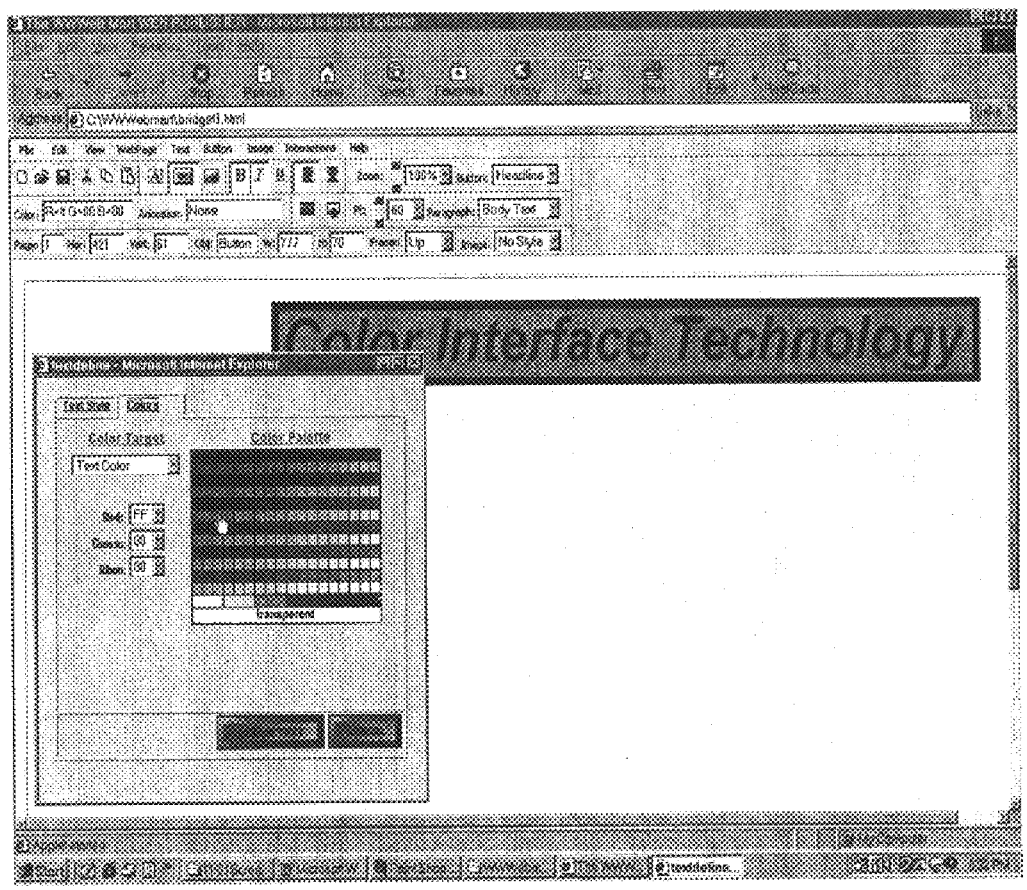

Extensive use of JavaScript technology is employed to enhance the user interface and for communication between the various HTML frames and/or files, within a given HTML frame or file, between an HTML frame and the JAVA engine, and as a bridge between two different JAVA applets (57). Extensive use is made of JavaScript arrays to store the values of all page and object attributes, to initialize the correct values in all pop-up windows, and to pass data and status to the engine. Various JavaScript techniques are employed to "type" all variables (JavaScript does not explicitly type anything as described above) as a prerequisite for passing values to the build engine 352. Variables that should be typed as strings, integers and Booleans are typed through the use of "Eval" and "New" JavaScript functions. The choice of color, found in most pop-up windows to define one or more color elements, can be implemented utilizing several innovative JavaScript techniques. They include:

1: Defining a complex image map through a JavaScript function utilizing arrays. Screen shot FIG. 48 shows a visualization of an image map. A JavaScript computational loop utilizing arrays can be used to define each individual rectangle in this color palette with its appropriate RGB value and a function call to the appropriate JavaScript method.

2: Limiting the color choices from the image map to only those colors that are designated as safe colors. Safe Colors are the subset of all colors that are browser independent, assuring a consistent color look across all browsers.

3: Supporting a dual color selection technology. The user can be presented with a color palette and can click on a particular color in the color palette. Image map technology can call a JavaScript function, which converts that choice into a RGB numeric definition. This definition updates the RGB values shown in screen shot FIG. 48, as well as passing those values, though an appropriate function call, to a build engine JAVA method. The build engine 352 will then draw the actual color immediately on the web page. Alternatively, the user can select a value from Red, Green or Blue selection lists, which can be implemented using an HTML drop-down list form object. The value selected is then processed by an appropriate JavaScript function call to a build engine method, which converts the RGB to a JAVA compliant value, and then draws the actual color on the web page.

4: Supporting True Transparency. For appropriate color elements, such as the background for a text button object, the user can choose, either from the color palette by clicking on a "transparency" rectangle, as described above, or by selecting "TIR" from a Red, Green or Blue selection list. This choice is then processed by an appropriate JavaScript function call to a build engine method, that in turn sets a particular flag for the draw system (of the Build Tool) to not draw a background color for that object.

Innovative techniques are used to enable JavaScript to dynamically create HTML code based on real time conditions. Cookies can be used for data communication between HTML frames and HTML files, some of which were created in real time. Many unique combinations of HTML elements, including frames, forms, and tables, enhanced by JavaScript code, are utilized to create a extensions beyond that of the MS Windows interface (58). For example, a dual combo box/spin control for both small and large numeric incremental jumps can be implemented by a combination of form and table elements, mouse events, and JavaScript methods.

Extensive use of Cascading Style Sheets (CSS) was employed to create a consistent look for all pop-up windows, and for precision placement of various HTML elements (59).

Figure 7B:
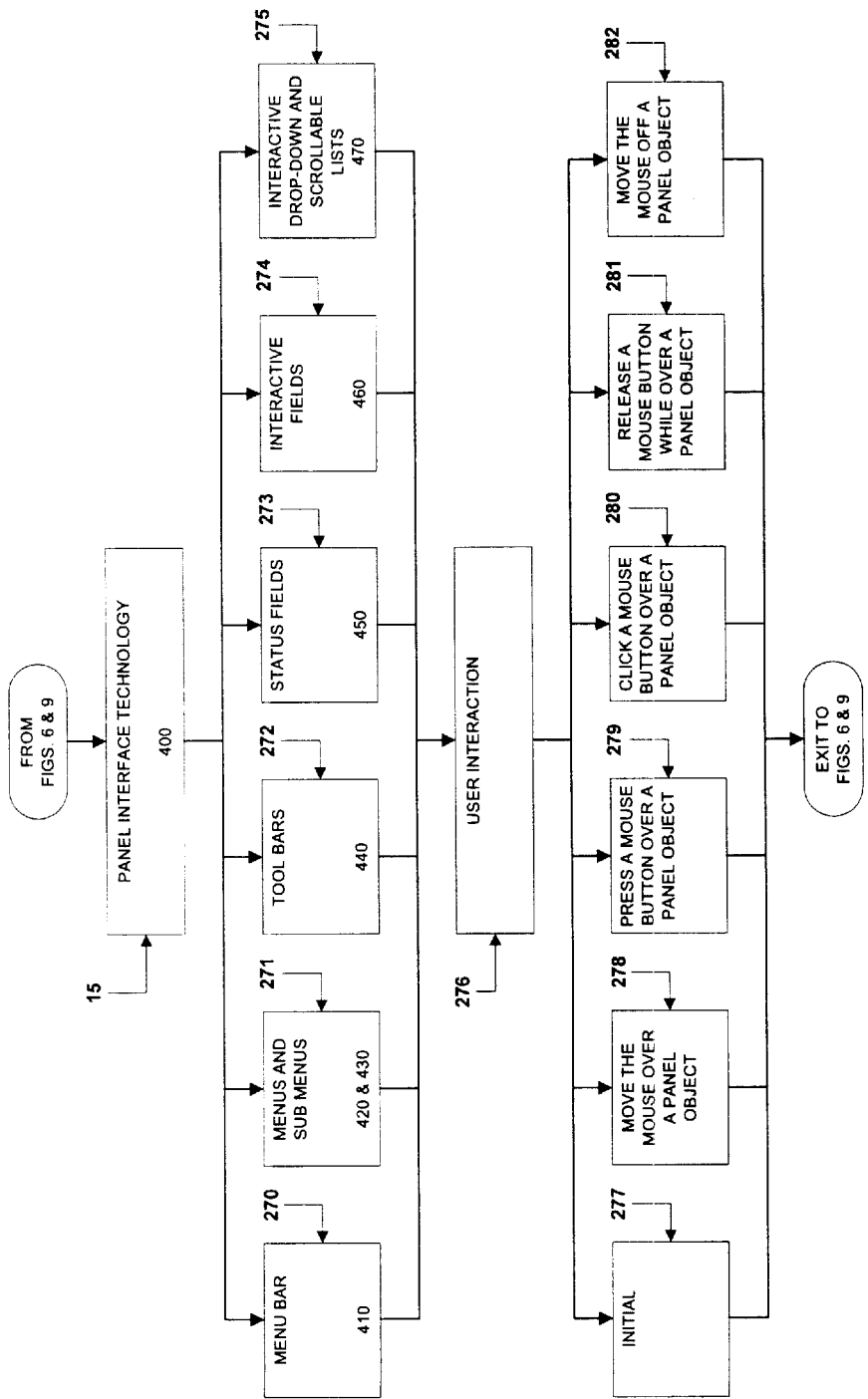
FIG. 7b is a flow chart, with its attendant screenshots shown in FIGS. 37–38, that shows a detailed view of the build time techniques for implementation of panel interface objects, including the menu bar, menus and sub-menus, the tool bars, status fields, interactive fields, and interactive pull down lists, in accordance with one implementation of the present invention.

FIG. 7b shows a detailed view of the build-time techniques for implementation of panel interface objects, including the menu bar, menus and sub-menus, the tool bars, status fields, interactive fields, and interactive pull down lists, in accordance with one implementation of the present invention (15 of FIG. 3). These techniques create panel interface objects that have the same look and feel of those which are implemented under the various MicroSoft Windows Operating Systems. In one implementation of the present invention, the status fields, interactive fields, and interactive drop-down lists are defined as HTML form objects (text boxes and lists) embedded within DHTML objects. The menu bar, menus and sub-menus, and the tool bars can be defined as pure DHTML objects. However, Cascading Style Sheets can be used for all panel interface objects; although more extensively with DHTML objects as will be described below. In an alternative implementation of the present invention, the status fields and interactive drop-down lists are defined as pure DHTML objects.

In one implementation of the present invention the menu bar at 270 is defined as sets of DHTML objects, each set corresponding to a menu command. Each set consists of four DHTML objects with absolute screen positioning, one defining the DHTML object in the Mouse Over state at 278, the second for the Mouse Down state at 279, the third for the Active state, and the fourth for the Inactive state. Each state has a different CSS style assigned, which defines the visual appearance of that state. When the build tool is initialized at FIG. 5, the appropriate menu commands are initialized as active or inactive at 277. If the menu command is defined to be inactive, that DHTML inactive object is assigned by a JavaScript function to the "visible" style attribute, while the other three DHTML objects are assigned the "hidden" style attribute. Screen shot FIG. 38 shows a visualization of the "Interactions" menu command in the inactive state. In the inactive state all user interactions are ignored. If the menu command is defined to be active, that DHTML active object is assigned by a JavaScript function to the "visible" style attribute, while the other three DHTML objects are assigned the "hidden" style attribute. While in the active state, the JavaScript functions for "onMouseDown", "onMouseUp", "onMouseOver" and "onMouseOut" are implemented. If a Mouse Down user interaction event is detected over an active menu DHTML object at 279, a menu command specific JavaScript function is called. This function sets the DHTML object for the Mouse Down state to the "visible" style attribute, calls a generalized JavaScript function to reset the visibility states all the other appropriate DHTML objects, set certain status variables, and set the DHTML object which defines the menu associated with that menu command to the "visible" style attribute. Screen shot FIG. 37 shows a visualization of the "Image" menu command after having received a mouse down event, with its associated menu 420 having been set to the "visible" style attribute. If a mouse up user interaction event is detected over an active menu DHTML object at 281, a generalized JavaScript function is called in which the DHTML object defining the mouse over state is passed as a function call argument. This function sets the DHTML object defining the mouse over state to the "hidden" style attribute thus resulting in the appearance as shown for the image menu command in screen shot FIG. 37, even when the mouse has been moved off the menu object. If a mouse over user interaction event is detected over an active menu DHTML object at 278, a generalized JavaScript function is called in which three DHTML objects are passed as function call arguments as well as a menu command name. These DHTML objects are the ones defining the mouse over state, the mouse down state, and the associated menu. This JavaScript function first tests to see if a menu has been activated by a previous mouse down event and is still visible. If so, a generalized "reset visiblity states" function is called, then both the mouse down and associated menu objects are set to visible. Finally the same menu specific function is called as with the mouse down event. If no menu is visible, then the object associated with mouse over state is set to visible. If a mouse off user interaction event is detected over an active menu DHTML object at 281, a generalized JavaScript function is called in which the mouse over DHTML object and the menu command name are sent as arguments. Logic tests are made to determine which menu command object has been left, as well as whether any menus are currently visible. Depending upon the results, the mouse over DHTML object may be set to hidden.

In one implementation of the present invention the menus and sub-menus at 271 are defined as a set of DHTML objects, one for each menu choice, nested inside an DHTML object that defines the entire menu. Each menu object is given absolute positioning, while the menu items are given absolute positioning relative the menu objects origin. Both the entire menu and each choice are assigned CSS styles to define their visual appearances. For each menu choice the JavaScript functions for "onClick", "onMouseOver" and "onMouseOut" are implemented. If a mouse click event is detected at 280 and no sub-menu is defined, a feature specific JavaScript function is called. First the menu bar and the menus are set to their appropriate visibility states. Then setting their visibility attribute style to "visible" activates the appropriate tool bar icon DHTML objects. Finally the feature specific JavaScript code is executed as discussed herewithin, which may cause a pop-up window to be displayed, the Panel's database to be updated, and/or the build engine 352 to be called. If a mouse over event is detected at 278 and no, sub-menu is defined, a generalized JavaScript function is called in which the menu choice object is passed as an argument. This function first calls a generalized JavaScript function to close any pop-up windows, then set a status variable and finally executes DHTML commands to set the correct text and background colors for the object. If a mouse off event is detected at 282 and no sub-menu is defined for a menu choice either immediately above or below, a generalized JavaScript function is called in which the menu choice object is passed as an argument. A status variable is set and DHTML commands are executed to set the correct text and background colors for the object. If a sub-menu is defined for a menu choice object, then the same sub-menu specific JavaScript function are called for both mouse click or mouse over events. This function performs the same steps as that of the generalized function that was called for a mouse over event, as well as setting the sub-menu object and its menu choice objects to the visible state. Screen shot FIG. 37 shows a visualization of the menu bar's "Image" command having been activated, the drawing of its associated menu 420, the selection of the "Enhance" menu choice, and the drawing of the "Enhance" sub-menu 430. In the event that the cursor is moved to an adjacent menu choice under the "Image" menu, such as "Animation . . . " or "Rotate", then a specific JavaScript function is called which, in addition to the functions executed by the generalized JavaScript mouse over function, also hides the "Enhance" sub-menu.

In one implementation of the present invention, the tool bars at 272 are defined as a DHTML objects, and a set of DHTML objects are defined for a tool icon. The tool is given absolute positioning and is assigned a CSS style in order to define is visual appearance. Each tool icon is assigned a set of three DHTML objects all with absolute screen positioning. The first DHTML object defines the mouse over state at 278, the second for the mouse down state at 279, and the third for the active state. Each state has a different CSS style assigned, which defines the visual appearance of that state. For each tool icon active state object the JavaScript functions for "onClick", "onMouseDown", "onMouseUp", "onMouseOver" and "onMouseOut" are implemented. GIF images are defined for the tool bar DHTML objects, and may be always visible. The inactive "grayed out" representations for each toll icon can be drawn on this image. When the build tool is initialized at FIG. 5, the appropriate tool icon objects are defined as active or inactive at 277. The inactive state for an tool icon is represented when all three of its associated objects are assigned the visibility style of "hidden". Screen shot FIG. 38 shows a visualization for several inactive tool icons including the icon commands for bold, italic, underline, left and centered. All user interaction events are ignored in the inactive state. If the tool icon, based on the state of the build engine and based on the polling technology described below, is set to an active state, then the tool icon's active state object is set to the visibility style of "visible". If a mouse click event is then detected at 280, a feature specific JavaScript function is called in a manner identical to that for a mouse click event over a menu choice object as described above. If mouse down or mouse up events are detected at 279 or 281, then respective generalized JavaScript functions are called, in which the DHTML object defining the mouse down state is passed as a function call argument. If a mouse down event was detected, then the generalized function sets the tool icon's mouse down object to the "visible" state. If a mouse up event was detected, then the generalized function sets the tool icon's mouse down object to the "hidden" state. If mouse over or mouse out events are detected at 278 or 282, then respective generalized JavaScript functions are called, in which the DHTML object defining the mouse over state is passed as a function call argument. If a mouse over event was detected, then the generalized function sets the tool icon's mouse over object to the "visible" state. If a mouse off event was detected, then the generalized function sets the tool icon's mouse over object to the "hidden" state. Screen shot FIG. 37 shows a visualization of the button tool icon with both its associated the mouse down and active objects set to "visible". Screen shot FIG. 38 shows a visualization of the text tool icon with both its associated the mouse over and active objects set to "visible".

In one implementation of the present invention, the status fields at 273 and the interactive fields at 274 are defined as HTML text boxes. In an alternative implementation status fields are defined as DHTML objects. For both of these panel interface object types, under certain conditions, the panel draws status information into these panel interface objects. This information can result from user input as discussed in FIG. 6, or through the polling and two-way communication technology between the interface and the build engine 352 as discussed below. In one implementation of the present invention the status fields are:

1: The color of the selected web page object, in which the red, green and blue settings are shown.
2: The animation state of the selected button or image object.
3: The zoom level for the current web page.
4: The point size for the selected text or button object.
5: The horizontal position, in pixels, of the mouse cursor.
6: The vertical position, in pixels, of the mouse cursor.
7: The type of web page object (text, button, image, table, form object, draw object, etc.,) if selected. The type of object that the mouse is over, if no object is selected.
8: The width, in pixels, of web page object (text, button, image, table, form object, draw object, etc.,) if selected. The width of the object that the mouse is over, if no object is selected.
9: The height, in pixels, of web page object (text, button, image, table, form object, draw object, etc.,) if selected. The height of the object that the mouse is over, if no object is selected.

Screen shot FIG. 38 shows a visualization of the status fields in one implementation of the invention 450. In an alternate implementation using DHTML objects, the status fields will appear two-dimensional rather than the three-dimensional look currently shown.

There is one interactive field defined in one implementation of the present invention. Screen shot FIG. 37 at 460 shows a visualization of the page number interactive field. In addition to the current web page being displayed, either as a number in one implementation or as a user defined name in an alternative implementation, the user can place the cursor into this field and enter the desired page to go to. A click at 280 or Enter Key event will execute this function.

In one implementation of the present invention, the interactive drop-down lists at 275 are defined as HTML form lists. In an alternative implementation, status fields are defined as DHTML objects. For both of these panel interface object types, under certain conditions, the panel draws status information into these panel interface objects. The interactive drop-down lists behave in a manner very similar to that of interactive fields, except that when selected, a selection list drops down for selection. Depending upon the number of entries in the list, an elevator object may be drawn. The operations of selecting the interactive pull down list, the selecting of a list item, or the operation of the elevator is identical to that of comparable MS Windows objects. In one implementation of the present invention the interactive pull down list are:

1: Zoom. This interface object has dual spin controls as described above and is always selectable except when in a preview mode. It shows the current zoom level.

2: Button Style. This interface object is always selectable except when in preview. It shows the button style of the currently selected button, if any. Changing the button style will change the style of the currently selected button, and/or define the style of the next button to be created.

3: Point Size. This interface object has dual spin controls as described above and is selectable when a text or button object is selected. It shows the point size of the currently selected text or button object, if any. Changing the point size will change the point size of the currently selected text or button object.

4: Paragraph Style. This interface object is always selectable except when in preview. It shows the paragraph style of the currently selected paragraph, if any. Changing the paragraph style will change the style of the currently selected paragraph, and/or define the style of the next paragraph to be created.

5: Frame State: The state of the 3D frame (none, raised, pressed or live) of the currently selected text, button, or image object.

6: Image Style. This interface object is always selectable except when in preview. It shows the image style of the currently selected image, if any. Changing the image style will change the style of the currently selected image, and/or define the style of the next image to be created.

Screen shot FIG. 37 shows a visualization of interactive drop-down lists 470. In an alternate implementation using DHTML objects, the interactive drop-down lists will appear two-dimensional rather than the three dimensional look currently shown.

Tool bar icon objects, status fields, interactive fields, and interactive pull down lists all show feedback of the current build engine state. The technology utilized by one implementation of the invention is described below.

Figure 7C:
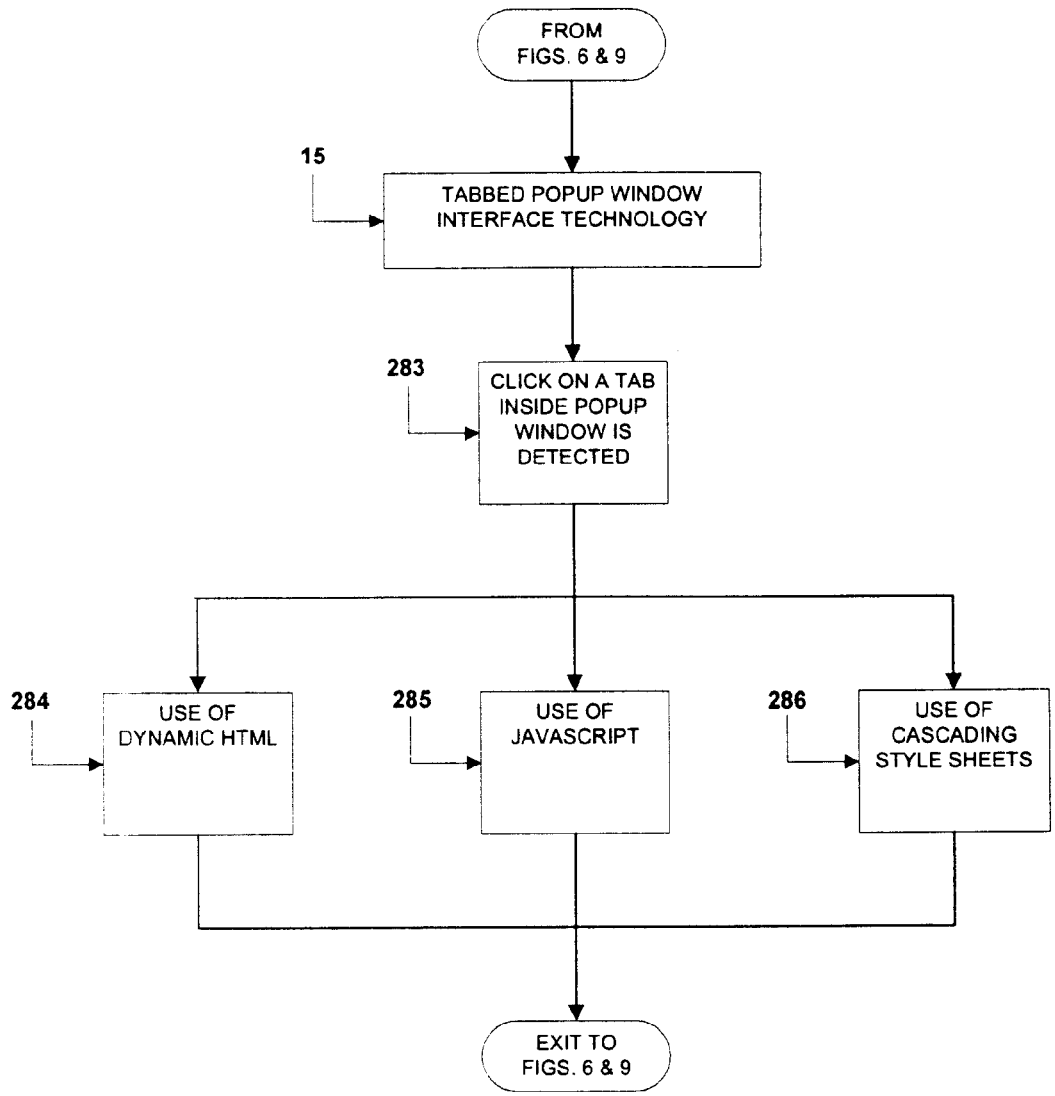
FIG. 7c is a flow chart, with its attendant screenshots shown in FIG. 37 and FIG. 63, that shows a detailed view of the build time techniques for implementation of tabbed pop-up windows (also called "dialog boxes" in MS Windows).
Figure 63:
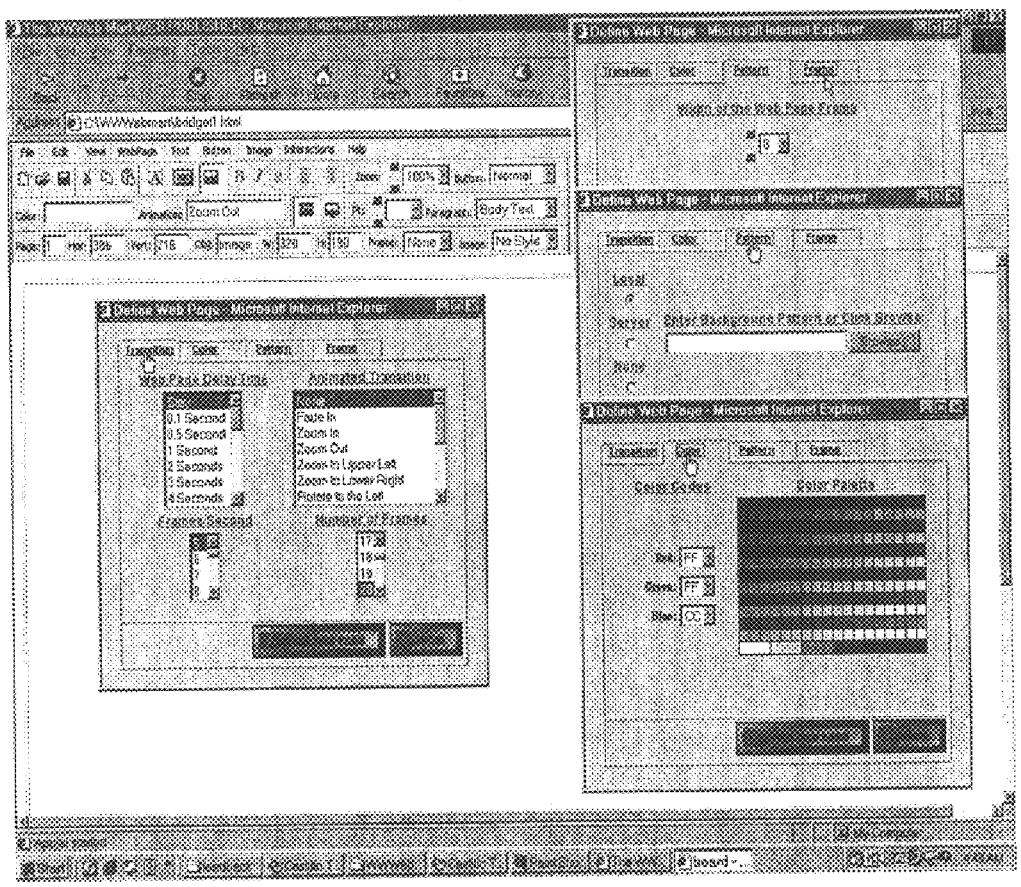

FIG. 7c shows a detailed view of the of the build time techniques for implementation of tabbed pop-up windows (15 of FIG. 3). These techniques create a pop-up window interface that visually and behaviorally is identical to that which is implemented as dialog boxes under the various MicroSoft Windows Operating Systems. Pop-up windows can be non-tabbed as described in FIG. 7a, or can have from two to as many as 10 or more tabs, depending upon the complexity of the choices available to the user for a given feature. In one implementation of the present invention each tab at 283 is defined as a DHTML object at 284. The tab is given absolute positioning and is assigned a CSS style at 286 in order to define is visual appearance. When a click is detected through the JavaScript "onClick" function, a tab specific JavaScript function at 285 is called within the pop-up window's HTML file. This function sets the display style attribute for the DHTML objects that define the settings for all the non-selected tabs to the display style attribute of "none". The DHTML objects that define the GIF image of the non-selected tab file representations are also set to the display style attribute of "none". The display style attribute for the DHTML objects that define the settings of the currently selected tab and the GIF image that depicts the selected tab file representation is set to the display style attribute of "". If there is to be a change of the focus of the selected field within the now to be visible tab specific choices, the focus attribute for that object is executed. Screen shot FIG. 37 shows a visualization of a tabbed pop-up window, and screen shot FIG. 63 shows a collage of four views of a tabbed pop-up window with four tabs. Notice that each state of the tabbed pop-up window has a different tab file representation, showing the selected tab as being in the forefront.

The interface technology of the invention, in addition to its utilization as part of a web-based web site generation tool, can be used to provide a general purpose interface for all web-based applications that want a MS Windows compliant interface.

Figure 8:
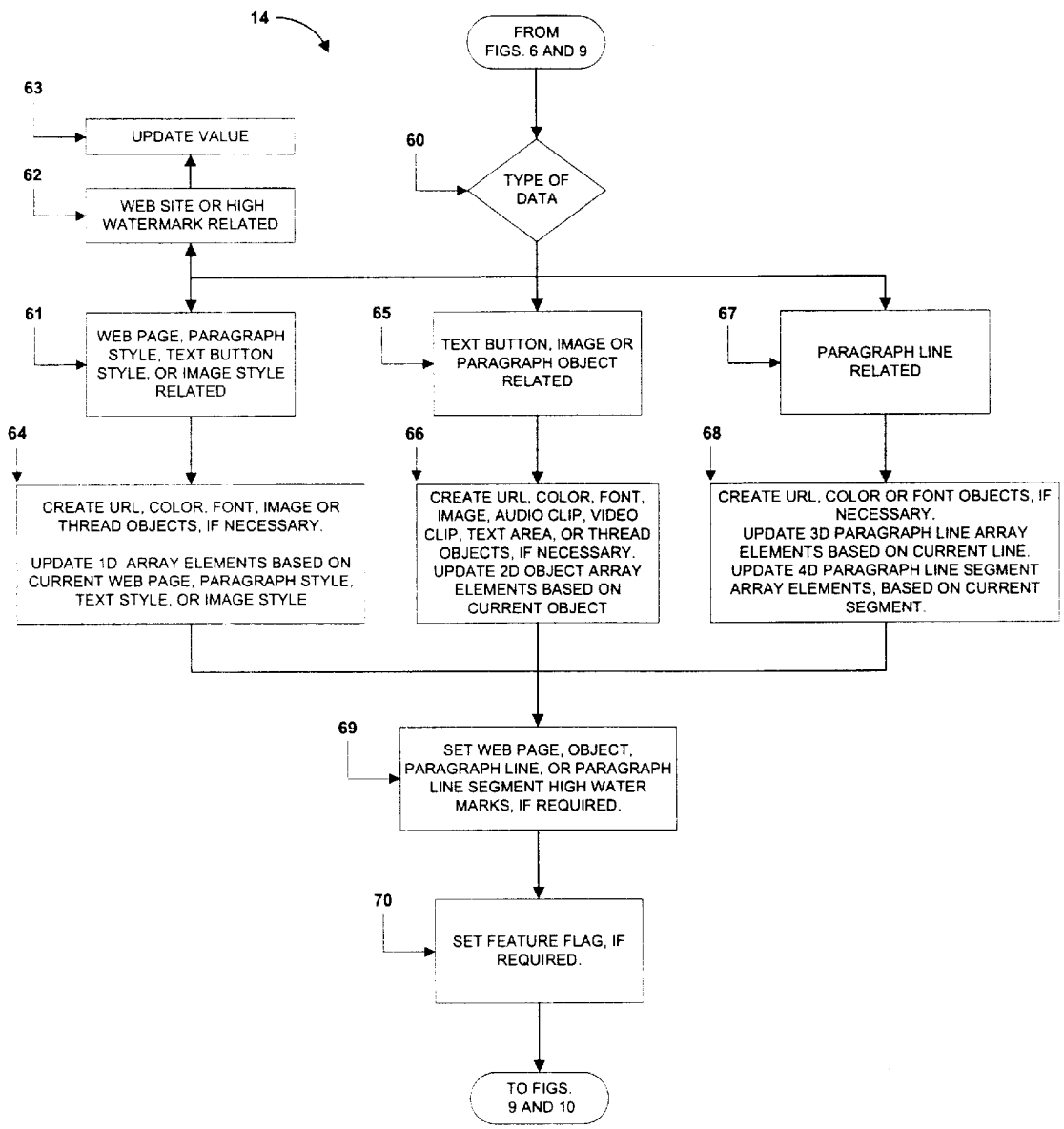
FIG. 8 is a flow chart that shows a detailed view of the build time techniques for updating the internal databases and the setting of feature flags for run time optimization purposes.

A process for updating the internal database of the build engine 352 is shown schematically in FIG. 8. The database is compact and efficient in order to meet the performance requirements for the run time process. The database handles a wide selection of data objects, including multi media objects such as colors, fonts, images, sound clips, URLs, threads, and video. The database supports a multi level animation, transformation, and time line model (discussed in greater detail below). The database complies with the differing rules imposed by the various popular browser security managers.

The process begins by determining the type of data to be updated at 60. Data that defines generic web site settings (See FIG. 21a), screen resolution values (See FIG. 21a and FIG. 24), and the web page high watermark setting (See FIG. 24) can be stored in a header record as boolean and integer variables and URL and color objects at 62 and 63. Data that defines web page, paragraph, text button, and image style and text button, image and paragraph high watermark settings can be stored in one-dimensional arrays as boolean, integer and string variables and URL, font, image or thread objects at 61 and 64. The URL, color, font, image and thread objects can also be created as required at 64.

Data that defines text button, image, paragraph, or other parent objects and paragraph line high watermark settings can be stored in two-dimensional arrays (by web page and by object number) as boolean, integer, string, floating point variables and URLs at 65 and 66. Again, the URL, color, font, image, audio clip, video clip, text area and thread objects can also be created as required at 66. Data that defines a paragraph line and paragraph line segment high watermarks can be stored in three-dimensional arrays (by web page, by paragraph number, and by line number) as Boolean, integer or string variables at 67 and 68. Again, the URL, color or font objects can be created as required at 68. Data that defines a paragraph line segment can be stored into four-dimensional arrays (by web page, by paragraph number, by line number and by line number segment) as Boolean, integer or string variables or URL, color and font objects at 67 and 68. As a data field is added, changed or deleted, a determination is made at 69 on whether a value for a given high watermark needs to be changed. If so, it is updated. As a specific method in the build engine is called, a determination is made at 70 on whether a feature flag needs to be set. For example, if a particular JAVA method is called, which requires an instance of a certain JAVA Class to be executed by the run time engine, then that JAVA Class is flagged, as well as any supporting methods, variables and/or object definitions. The use of these flags is described in greater detail below in association with FIG. 25 and FIG. 27 to create a compact and efficient customized run time environment.

In one implementation, the header record, the style record, the web page record, and the object records, are carefully defined in a specific order, written in that order, and explicitly cast by object type when read by the run time engine. Exception handling can be implemented to recover from any errors. This helps assure that data integrity is maintained throughout the build and run time processes.

FIG. 9 details the polling process (16 of FIG. 3). The polling technology is essential for creating the necessary two-way real time communication between the JavaScript/ HTML interface and the JAVA build engine. Since there is no particular difficulty for JavaScript to be able to call and pass values directly to JAVA methods, the technological challenge is to find a reasonable technique to enable JAVA to communicate back to JavaScript. The polling technology is generic, and workable across all the current browsers. The polling technology is flexible, as there are no real constraints as to what data could be communicated from the build engine to the interface, and this communication can occur at any time. The polling technology is reasonably efficient, so that the performance of the build process is not significantly affected.

In one implementation, two different techniques were utilized to implement this capability. The first was to place the build engine inside a JAVA wrapper. The JAVA wrapper accepts direct communication from JavaScript function calls, interrogates a particular JAVA build engine method, and returns that method's return value back to the calling JavaScript function. The second technique was more unconventional. A polling loop is defined in the panel's (panel 400) JavaScript that creates a near continuous, at least from a human perception point of view, dynamic real time link, in order to monitor events occurring inside the build engine. The result is a real time retrieval (from an ergonomic perception point of view) of necessary data and status settings from the build engine back to the interface.

Upon the loading of the panel HTML file, a JavaScript function at 71 (the poller) is immediately called which initiates a polling loop. In one implementation, the polling loop is set at a poll rate of once every 100 milliseconds or less. The polling routine, operating through the JAVA wrapper, calls the build engine in order to read the current horizontal and vertical coordinates of the mouse cursor, and displays them in the panel's status fields (FIG. 37 at 450). The polling routine also polls the build engine in order to detect whether the mouse has moved over a valid object or, by inference, whether a mouse single click, or double click event has occurred. The poller is also constantly requesting the JAVA wrapper to return the status of an error flag in order to inform the user, if necessary, of an unrecoverable error condition, and the reason for it. (See FIG. 10). The poller then calls a panel JavaScript function that, in turn, calls the build engine to reset the flag. The poller constantly requests that the JAVA Wrapper return the status of whether the mouse cursor is over a valid object, and, if so, that object's number, type, height and width. The poller also constantly requests the JAVA wrapper to return the status of whether an object is selected, and, if so, the type and number of that selected object, as well as the objects height, width, and 3D frame state (and the point size of the object's current font if the object is a text button or paragraph object). In addition, if the object is a paragraph, the poller constantly requests the JAVA wrapper to return a flag if a double click or drag mouse event has occurred.

At 72 the polling routine detects a mouse event based on analyzing the return values received. The poller can infer that the mouse has either moved off or moved on to a valid object at 73 if the mouse over object state has changed or the mouse over object number has changed. If so, the poller updates the relevant interface objects of the panel as appropriate and displays them as necessary, and, depending upon whether the object is a text button object, a paragraph, image object, etc., at 75, begins polling their unique values.

The poller can infer that a single click mouse event has occurred at 74 if the selection state has changed, or the selected object changed. The poller updates the menu bar (FIG. 37 at 410) as appropriate, making the appropriate menu commands either active or inactive. The poller also sets the necessary status variables, and, depending upon whether the newly selected object is a text button object, a text object, image object, etc., at 74, begins polling their unique values. The poller also activates the appropriate menu choice objects inside the "Edit" menu, the "Text" menu, the "Button" menu, the "Image" menu, and the "Interactions" menu objects (FIG. 37 at 420 and 430), depending upon whether an web page object is selected or not, which type of web page object is selected, or, if the selected web page object is a text object, whether text is marked through a drag or double click event. In a similar manner, the poller also sets the values for the interactive field objects (FIG. 37 at 460) and the interactive drop-down list objects (FIG. 37 at 470). More specifically, JavaScript can poll the web page object number. The value of the web page object number can be used to initialize pop-up windows with that object's web page current values, either from the panel's database or, if necessary, by interrogating the build engine's database.

The poller can infer that a double click or mouse drag operation has occurred if the flag indicating a double click or mouse drag operation is detected at 75. The poller calls a panel JavaScript function that, in turn, calls the build engine to reset the flag. The poller then calls a panel JavaScript function to display the appropriate panel menu choices. For example, if the double click or mouse drag event occurs within a text object, then the "Text Style and "Hot Link" menu choice objects become active under the panel's "Text" menu object.

Depending on the object type (76), the polling technology performs various functions. If the object is a text object at 77, the values for the paragraph style, point size, object height and width, text color, and the 3D frame status are polled and displayed. The panel's menu objects and the menu choice objects within that are active for a text object are set to the active state, and the non-text menu choice objects are set to the inactive state, which visually means they are unavailable and are "grayed out". In addition, polling can be initiated for the creation of a hot link. If the object is a text button object at 78, the values for the text button style, point size, object height, width, text color, animation state, and 3D frame status are polled and displayed. The menu choice objects inside the panel's menu objects that are active for a text button object are set to the active state, and the non-text button menu choice objects are set to the inactive state, which visually means they are unavailable and are "grayed out". The value of the text button object string is also polled and saved in the panel's database for use when initializing relevant pop-up windows. If the object is an image object at 79, the values for the image style, object height, width, frame color, animation state, and 3D frame status are polled and displayed. Again, the menu choice objects inside the panel's menu objects that are active for a image object are set to the active state and the non-text button menu choice objects are set to the inactive state. In addition, the results of any relevant direct object manipulation are polled and displayed.

Figure 10:
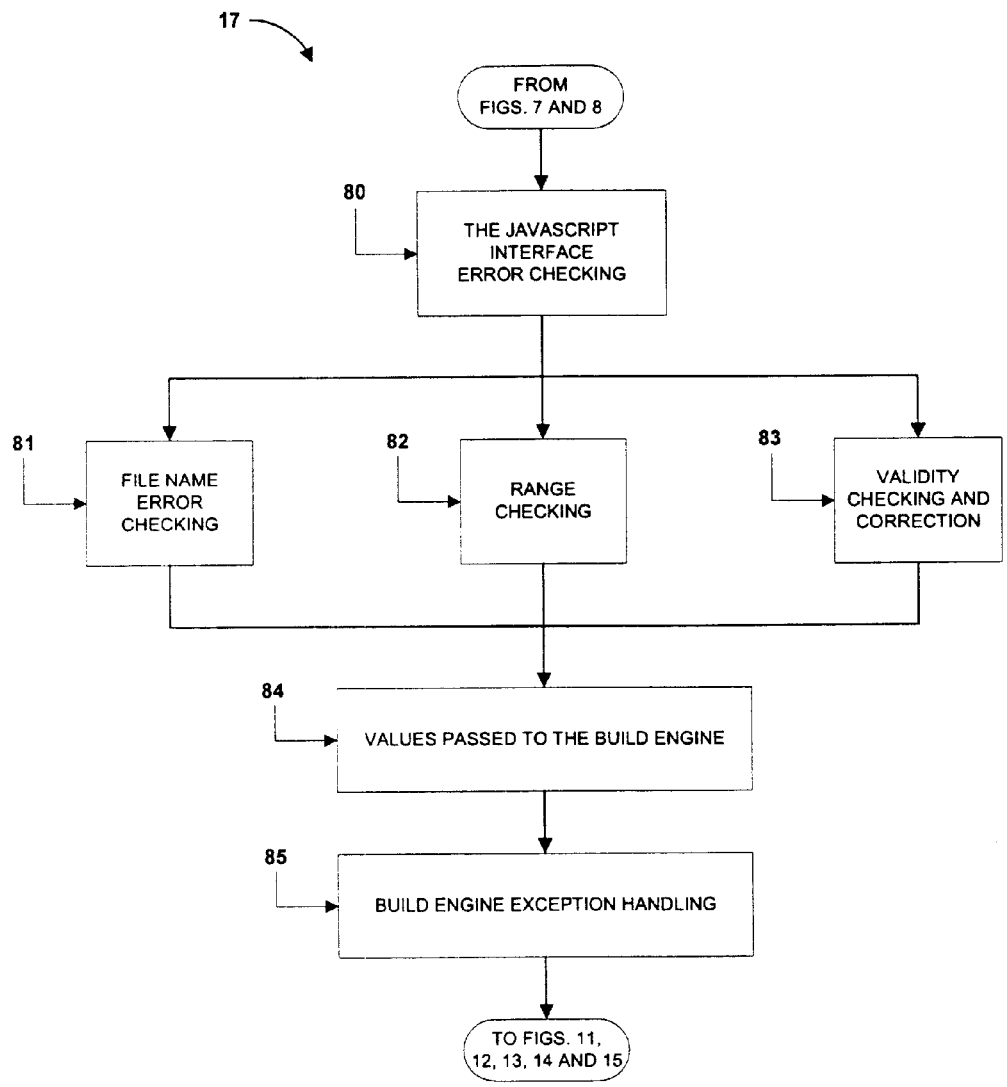
FIG. 10 is a flow chart that shows a detailed view of the build time techniques for analyzing user input for error checking and data integrity.

FIG. 10 describes a two level error correction technology (17 of FIG. 3) employed by the build process. Initial error checking occurs during the interactions between the user and the interface with the JavaScript error checking code at 80. Any file name, selected by the user through the file selection window or typed in a file pathname (See FIG. 6 at 49) is checked by the panel's JavaScript to assure that it has the correct file type suffix (gif, jpg, au, etc.) at 81.

The panel's JavaScript Code performs range checking at 82 to prevent user error or to prevent the breaking of any internal limits imposed by the build engine. These can include: going to a non-existent web page; exceeding any limit with the dual spin control (i.e. attempting to increment or decrement a point size outside of the legal range, or trying to illegally decrement a value to zero or a minus number; typing in a numeric value that is outside a legal range; and, implicitly creating an object that exceeds a limit imposed by the build engine).

The panel's JavaScript code also checks the file pathname to make sure it contains a valid address, and makes necessary additions or conversions, if necessary, at 83. For example, if the user selected a file from the local disk, the correct URL protocol is appended to the file name in order to make it a valid string representation of a URL address. Any illegal characters for a pathname or a null file pathname entry are also caught at 83. In addition to file pathname validity checking there are other validity checking functions that can be employed by the JavaScript at 83. They include the attempt by the user to enter a non-numeric character into a numeric field, or leaving an essential fill-in field empty.

The panel's JavaScript then passes these values to the build engine though the arguments of a JAVA method function call at 84. The build engine can utilize the extensive exception handling capability of JAVA at 85 (or that of any other full featured programming language used) to attempt to recover from any processing error. If recovery is not possible, the build engine sets an error flag, utilizing the polling technology (See FIG. 9 at 71). The poller, upon detecting this flag, informs the user, for example, through an alert JavaScript pop-up message, what non-recoverable error has occurred, from which operation, and what actions, if any, the user should take. For example, if the user had selected a corrupted image file, the exception handling technology can inform the user of this fact so that user corrective action can resolve this very common problem. In one implementation, error handling and exception recovery support is provided for a malformed URL, an input or output error, a security manager violation, and a null pointer error.

Figure 11:
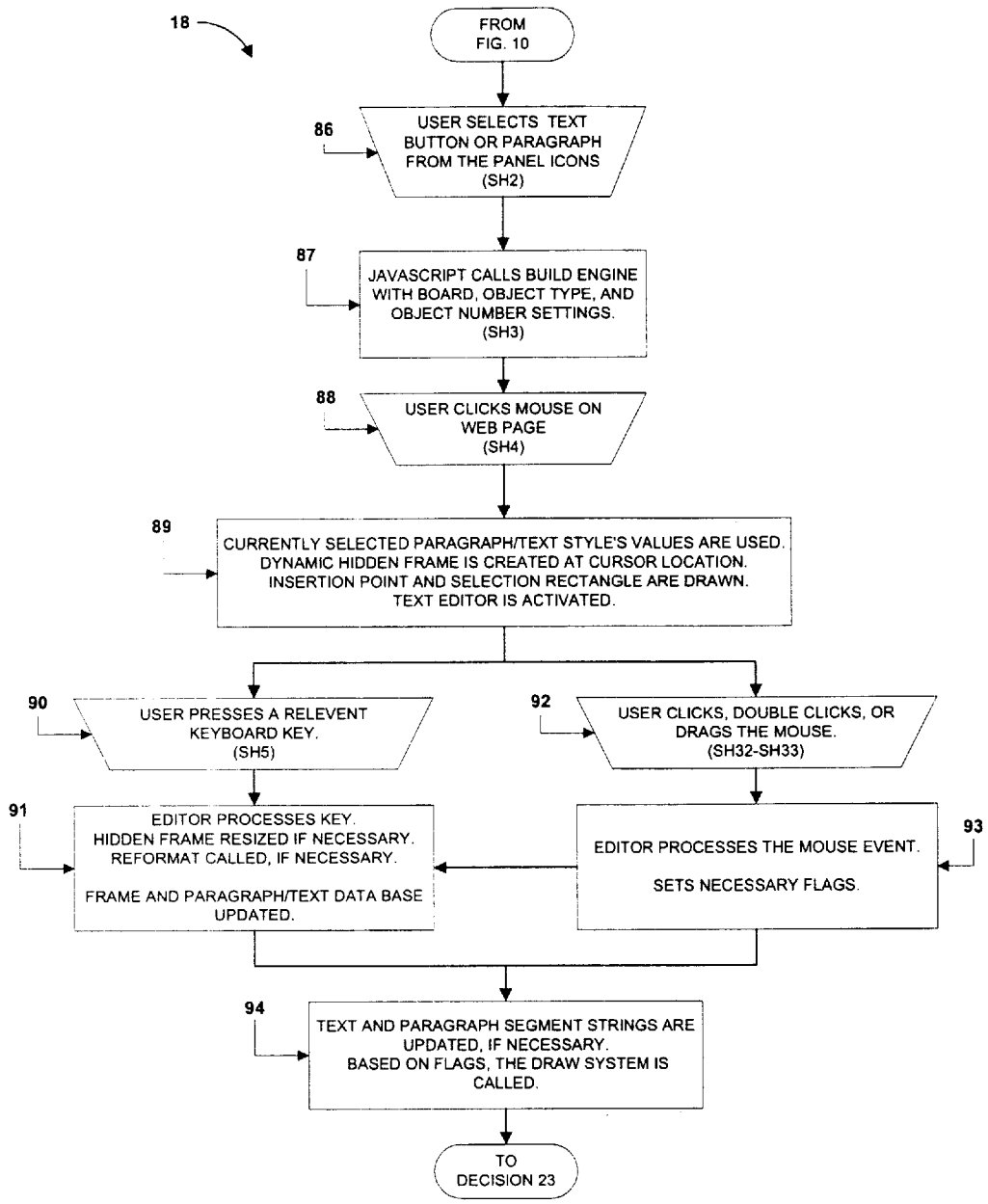
FIG. 11 is a flow chart, with its attendant screenshot shown in FIGS. 38–41, that shows a detailed view of the build time methods for direct text entry at an arbitrary cursor position and text editor implementation methods.

FIG. 11 shows a process for text entry and text processing (18 of FIG. 3). The process begins when the panel's JavaScript detects the user selecting either "Button" or "Text" icon objects from the panel's tool bar or from their equvalent menu choices under the "Button" or "Text" menus, and calls the appropriate JavaScript function at 86. The JavaScript function, after performing a range check to assure that no internal limits of the build engine are being broken, updates its database, and sets the necessary status variables. The panel's JavaScript then calls the appropriate build engine method, passing the necessary arguments, including the current board number, the internal number to be assigned to the object, the object type, and the current text button or paragraph style at 87. The build engine then updates its internal database and sets the necessary status variables. The build engine also changes the mouse cursor shape to that of a text entry symbol. In one implementation, the mouse cursor is shaped like a crosshair, and can be moved onto the web page (the build frame 402) at an arbitrary location.

The build engine detects a mouse click event through its "mouseDown" method at 88. This method reports to the build engine the exact horizontal and vertical coordinates of the crosshair mouse cursor at the moment the mouse button is pressed. The build engine places these values into its internal database. The polling process is also supported, as discussed in FIG. 9, by placing the necessary return values in the appropriate poll enabled methods.

The build engine-creates a dynamically resizable frame utilizing JAVA's "Text Area" object class, whose coordinates and size coincide with that of the draw system for the object as defined below. Other full-featured programming languages, if used by the invention, also possess similar object types. The text area is immediately overdrawn by the draw system's background paint routine. The build engine, utilizing the font metrics as defined by the selected text button or paragraph style, and utilizing the crosshair cursor's coordinates, calls the draw system. The draw system paints the background and then paints an insertion point and a selection rectangle, in the appropriate colors, and with the appropriate height and width, into the appropriate web page location at 89. If the text button or paragraph style has a 3D frame selected, this intelligent ornamental object would also be drawn, in the appropriate color, dimensions, and thickness. Screen shot FIG. 41 shows a visualization of this process. The text insert point is in black, surrounded by a red selection rectangle, and surrounded by a blue 3D frame, as defined by the selected style. The text editor is then initialized by setting the necessary status variables.

The build engine waits until a keyboard keystroke is detected. The scan code is interpreted, and if it is a text entry key, the text editor's methods are called at 90. The text editor processes the key event at 91. The build engine employs frame (Text Area) processing methods and draw methods to implement the text entry and text processing functions. As a keyboard key for a text character is pressed, the build engine passes this value to the editor's text entry method, which updates both the text area's frame definition, and the draw system's database. The width of the text area is dynamically resized as necessary. If the object was a paragraph, a check is made on whether a reformat event should occur, based on the paragraph style's definition and the width of the current line's text string. If so, the appropriate text editor reformat method is called, which may cause the text area's vertical dimension to also be resized. A high watermark variable may also be set, for optimization purposes. After the final state of the text area is determined for the text entry keyboard event, the internal database for the text area, and for the paragraph or text button object, are updated. The draw system is called, and the results of the text entry event are drawn on the web page at 94.

In one implementation, the build engine also supports the usual text processing functions found in MS Windows or Macintosh based Word Processors or Desktop Publishers at 92 and 93. For example, if the user single clicks the mouse when over an unselected paragraph or text button object, that object is selected, a selection rectangle is drawn, the mouse cursor shape is changed to a crosshair, and the poller reports the necessary information to the panel's JavaScript. If a mouse click occurs over a selected paragraph or text button object, the editor's "Set Text Insertion Point" method is called. Based on the coordinates of the mouse cursor, and based on a calculation by the build engine as to the nearest line, and the nearest character on that line, the text insertion point can be drawn appropriately, and the necessary status variables are updated. Text entry is then processed as discussed at 91.

If a double click or mouse drag mouse event is detected over a paragraph, an appropriate "text string selection" method is called (See FIG. 6). Based on the coordinates of the mouse cursor, and based on a calculation by the build engine as to what text string should be selected, the internal database in updated, appropriate status variables are set, and the draw system is called for marking the text string at 94. The polling technology is activated as discussed in FIG. 9.

The build engine's reformat methods for paragraphs can utilize a "Clean Text Stream" model for calculating line breaks and for updating four-dimensional variables utilized by the draw system in order to draw each paragraph, each paragraph line, and each paragraph line segment in the correct location, with the correct font type, font style, font size, font effect, and background and text string color. Font style refers to a font format such as Normal, Bold, Italic, or Bold Italic. Font effect refers to style overrides such as Underline, Double Underline, Small Caps, Cross Out, Superscript, Subscript, etc. The "Clean Text Stream Model" implemented by the build engine maintains multi-dimensional array pointers and records for every paragraph line and line segment external to the text string defined within the text area. Three-dimensional and four-dimensional variables are updated after each text entry or text editing and processing event in order to assure that the pointers into the paragraph text stream, defined in the text area, are current. The three-dimensional variables that the build engine has implemented can include soft and hard line end pointers for each paragraph line. Their values can be the absolute character positions within the text area text string for that line end. Hard line breaks can be created by the user pressing the enter key. Soft line breaks can be created by a reformat method based on a calculation defined below.

The four-dimensional variables can be absolute pointers into the text area text string for the beginning and end of every style override, associated with each paragraph line segment. These style overrides can include hot links, font type, font style, font size, numerous font effects, and text and background colors. For each style override there is an associated style override record that maintains all the font and color settings for that paragraph line segment. Also positional and size data such as start and end pointers into the paragraph text stream, a left offset relative to the paragraph's left origin, a top offset relative to the paragraph's top origin, and the line height. The style override record is created when the build engine detects a mouse drag or mouse double click event within a selected paragraph. When the mouse button is initially pressed, the current paragraph line and current word on that line are calculated in a manner identical to that for calculating the location of the text insertion point on a mouse click operation. The entire word becomes one anchor for the paragraph line segment, while the word defined by the mouse coordinates when the mouse button is released becomes the other anchor. Up to two other paragraph line segments can be implicitly created by the word oriented selection method. If there is text to the left of the first anchor word, and that paragraph line had not previously had a style override defined in it, the text string from the beginning of the paragraph line to the first anchor point has a style override record created for it. The values are set to that of the underlying paragraph.

If style overrides had already been created on that paragraph line, and the anchor word is inside one of them, then that style override's end pointer is adjusted to the start of the anchor word. All other style overrides, if any, to the right of the anchor word are deleted, as overlapping style overrides are not permitted. In a similar manner, the text string, if any, to the right of the last anchor point, up to the line or paragraph end, can also be defined as a style override. If a mouse click occurs before a "text style" operation, then these pointers will be reset. If the panel's JavaScript detects a user selection of "text style" from the "Text" menu, the appropriate pop-up window is drawn and its values initialized from the JavaScript database. Upon detecting a user completion event (i.e., the depressing of the enter key), the panel's JavaScript database is updated and a call is made to an appropriate build engine method, with the necessary data and status information passed as function call arguments. The build engine updates its internal database and calls the reformat method if necessary. The draw system utilizes these four-dimensional variables in order to paint the paragraph line segment style override.

The calculation for the creation or updating of a soft line break begins with the maximum paragraph width, which is set at a percentage of the browser screen width. This percentage is converted to an absolute pixel number based on the web designer's screen resolution. When any text entry or text editing and processing event occurs, a build engine method is called which calculates the width, in pixels, for the current paragraph line, based on the character string in the text area that exists between the previous line end pointer and the current line end pointer. The font definition(s) that are related to this character string are applied, and a string width is calculated. If the string width exceeds that of the maximum paragraph width, an "OverFlow" reformat method is called. The overflow reformat method calls a method to determine the settings for the last word on that line, and that word overflows to the following paragraph line. All pointers for the current line, and subsequent lines are updated as necessary, as are all pointers and records to paragraph line segments. If the string width is less than that of the maximum paragraph width, and the text processing operation was not text entry, then an "UnderFlow" Reformat method is called. The underflow reformat method calls a method to determine the width, in pixels, for the first word on the next line. If that word will fit on the current line it is placed there. As before, all pointers for the current line, and subsequent lines are updated as necessary, as are all pointers and records to paragraph line segments. The word oriented selection technique, and the reformat, database, and draw technologies that support it, greatly simplify the text editor and produce a run time engine that is smaller, faster and more reliable.

Figure 12:
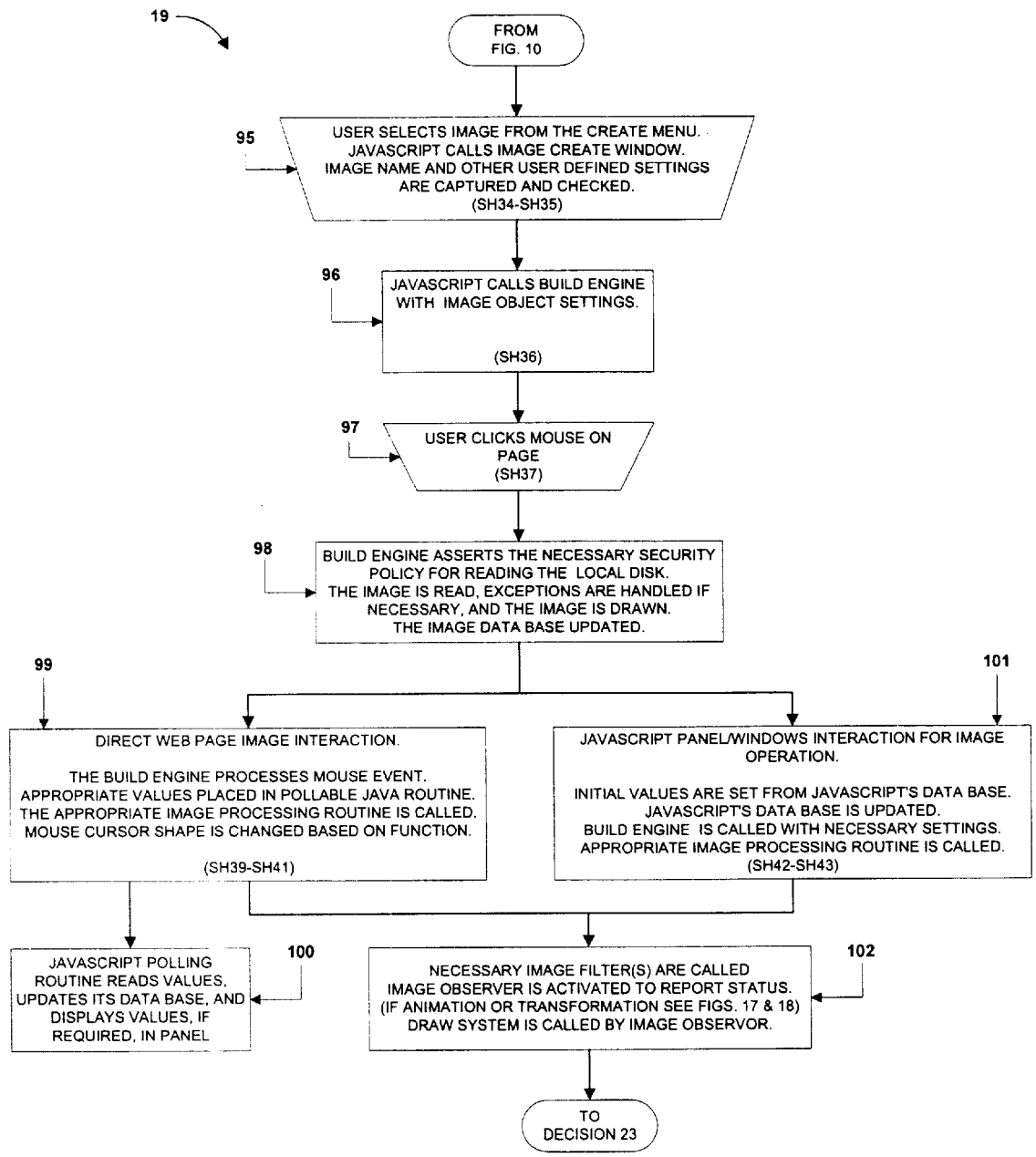
FIG 12 is a flow chart, with its attendant screenshot shown in FIGS. 49–56, that shows a detailed view of the build time techniques for reading external image files, creating them on a web page, and then manipulating them through either direct mouse interaction or through the interface's panel/windows.
Figure 49:
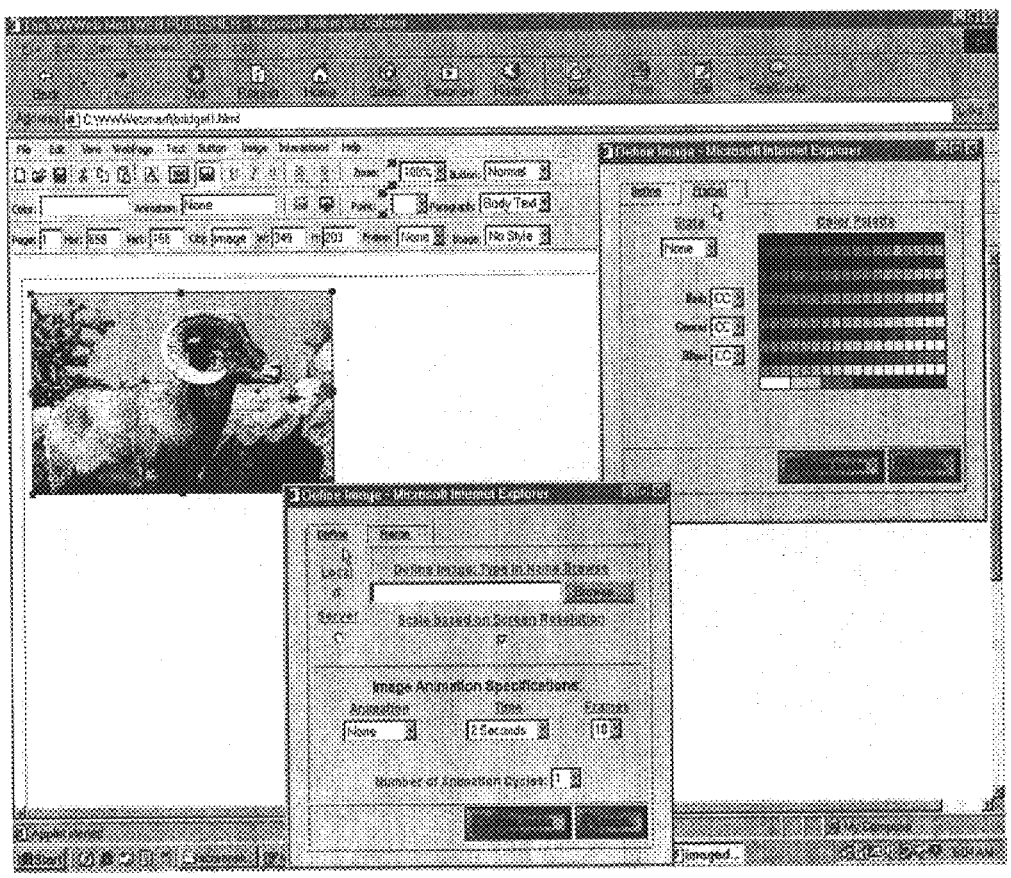

FIG. 12 shows the operation of the image processing technology utilized by the build engine (19 at FIG. 3). The process begins when the panel's JavaScript detects the user selecting the "Image" icon from the panel's tool bar or the comparable menu choice under the "hnage" menu. The appropriate JavaScript function is called at 95, which draws the define image pop-up window. The user then selects an image from the file selection window with the browser, types in the image pathname for the image file on the local disk, or types in the URL for the image that exists on a server. The user could also define a 3D frame for the selected image at this time. Screen shot FIG. 49 shows a visualization of a collage for the define image pop-up window and the user's selection choices under each tab setting. The user can complete the selection process by either pressing the Enter Key or clicking on the "Create Image" icbn in the pop-up window. If the Enter Key is pressed, the pop-up window's JavaScript Code utilizes the onKeyDown function, or if a mouse click, the onClick function, as described in FIG. 7, to recognize the completion event. An appropriate error checking JavaScript function is called, which performs a file name error check, a filename validity check, and a range check to assure that no internal limits of the build engine are being broken. If the error checking tests are successful another JavaScript function is called to update the panel's database, and set the necessary status variables.

The panel's JavaScript then calls the appropriate build engine method, passing the necessary arguments, including the current internal web page number, the internal number to be assigned to the image object, the object type, and the current image style at 96. The build engine then updates its internal database and sets the necessary status variables. It also changes the mouse cursor shape to that of an "Image Create" symbol. In one implementation, the mouse cursor is shaped like an arrow. The build engine detects a mouse click event through its "mouseDQwn" Method at 97. This method reports to the build engine the exact horizontal and vertical coordinates of the arrow mouse cursor at the time the mouse button was pressed, and places these values into its internal database. The polling process is also handled, as discussed in FIG. 9. The build engine then asserts the necessary security permission for reading from the local disk, if necessary, and attempts to create the necessary image object at the current mouse coordinates at 98, while checking for any exception conditions as described in FIG. 10. If no unrecoverable exceptions are reported, the internal database is updated and the draw system is called.

Figure 50:
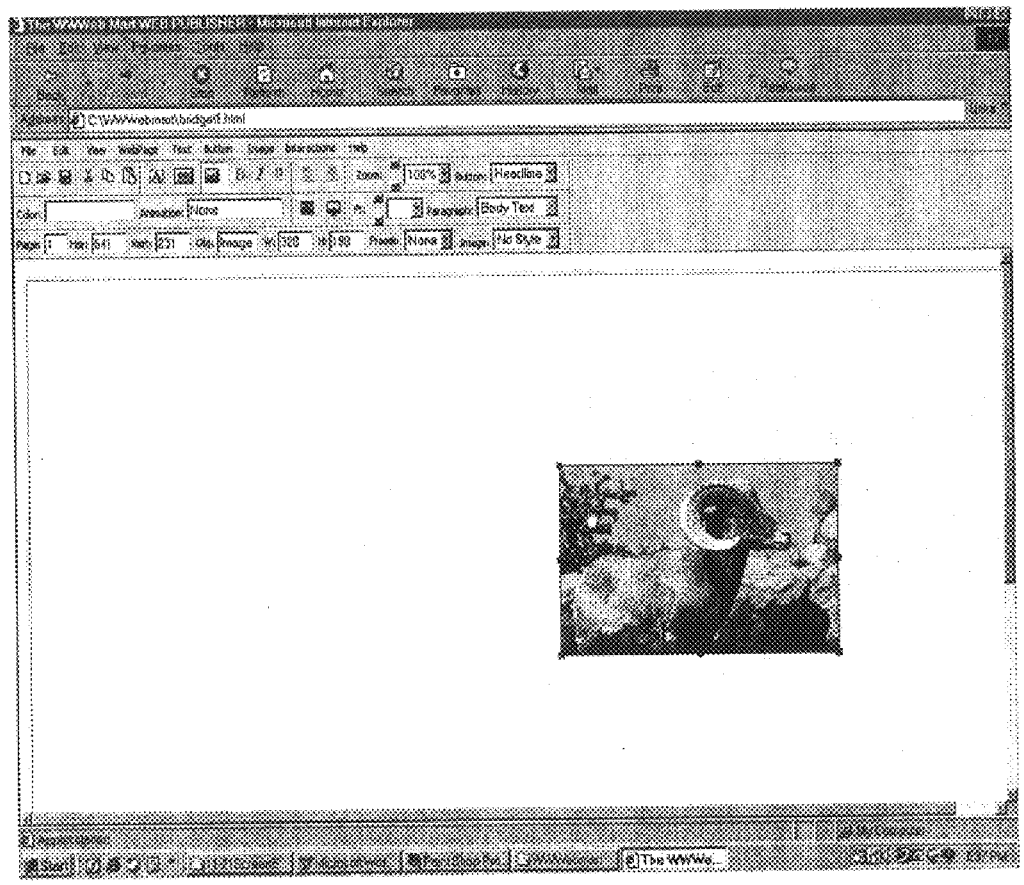
Figure 51:
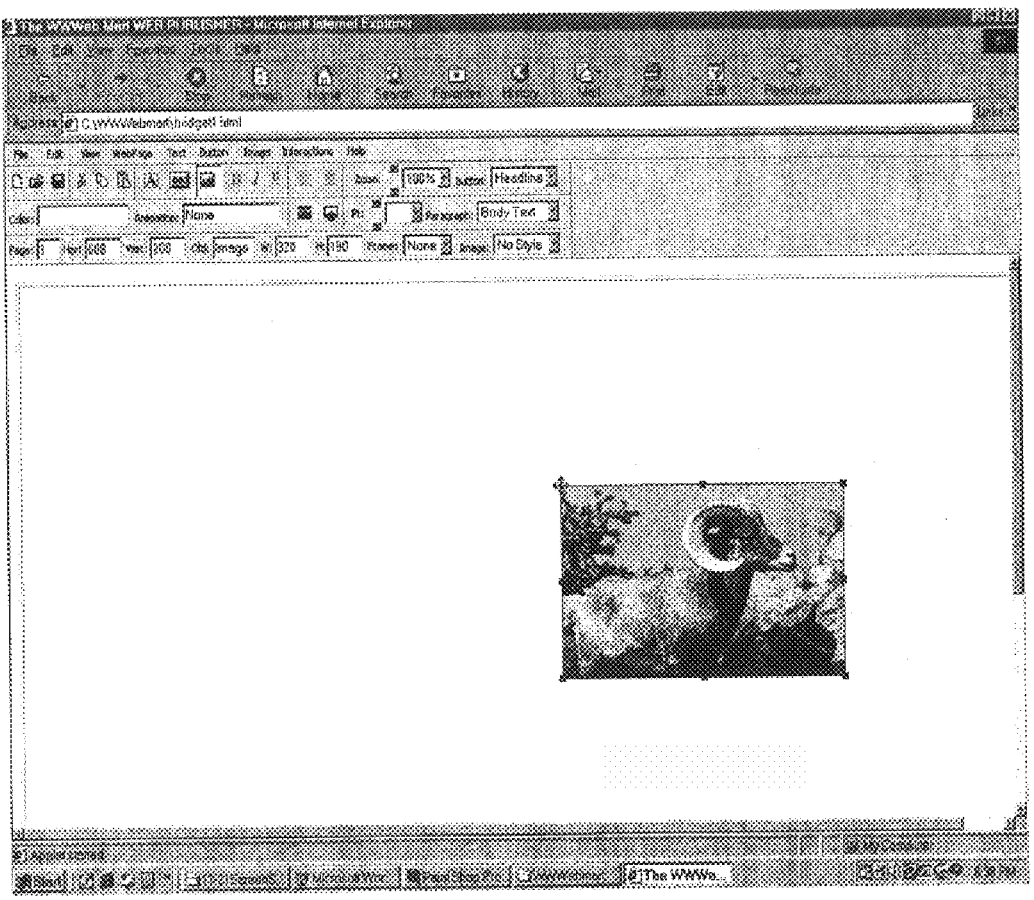
Figure 52:
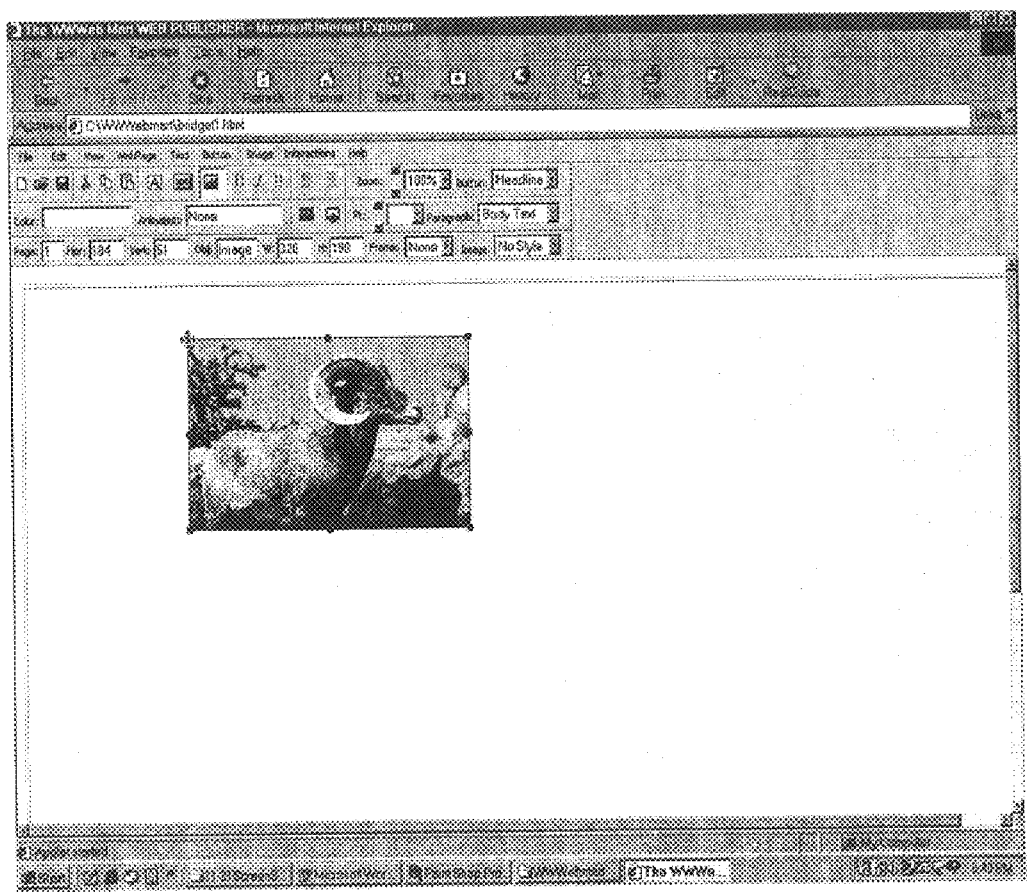
Figure 53:
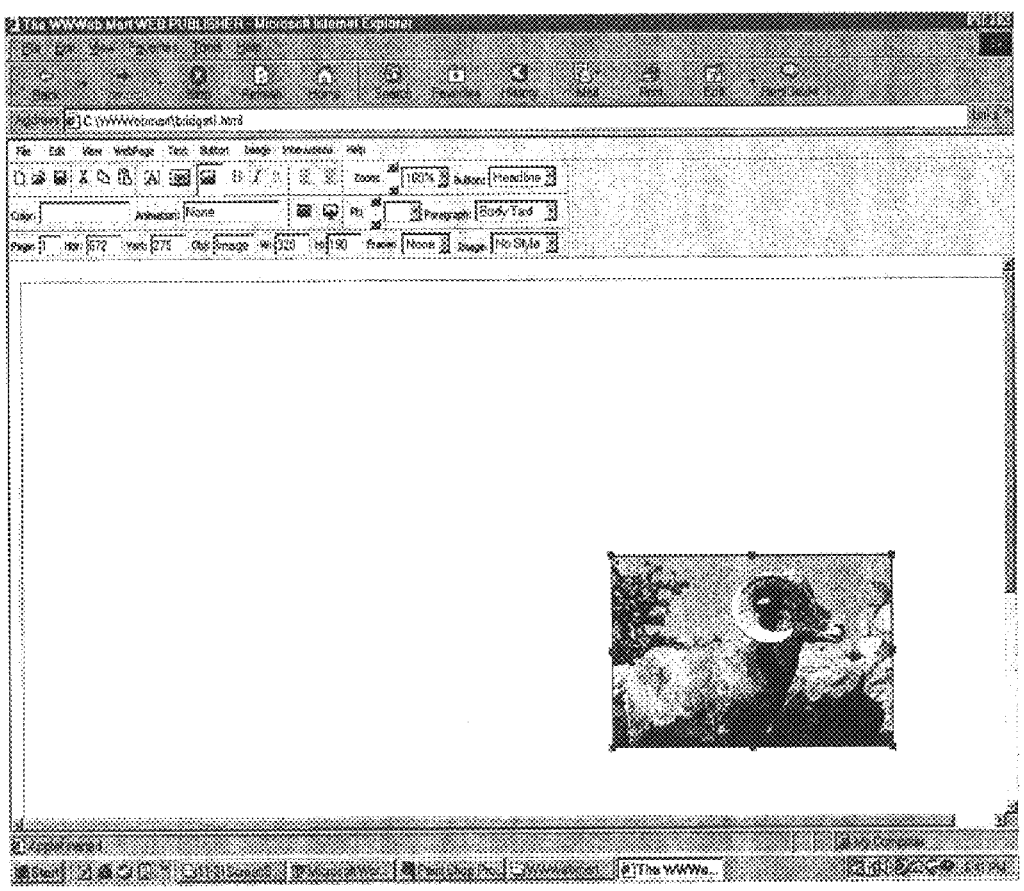
Figure 54:
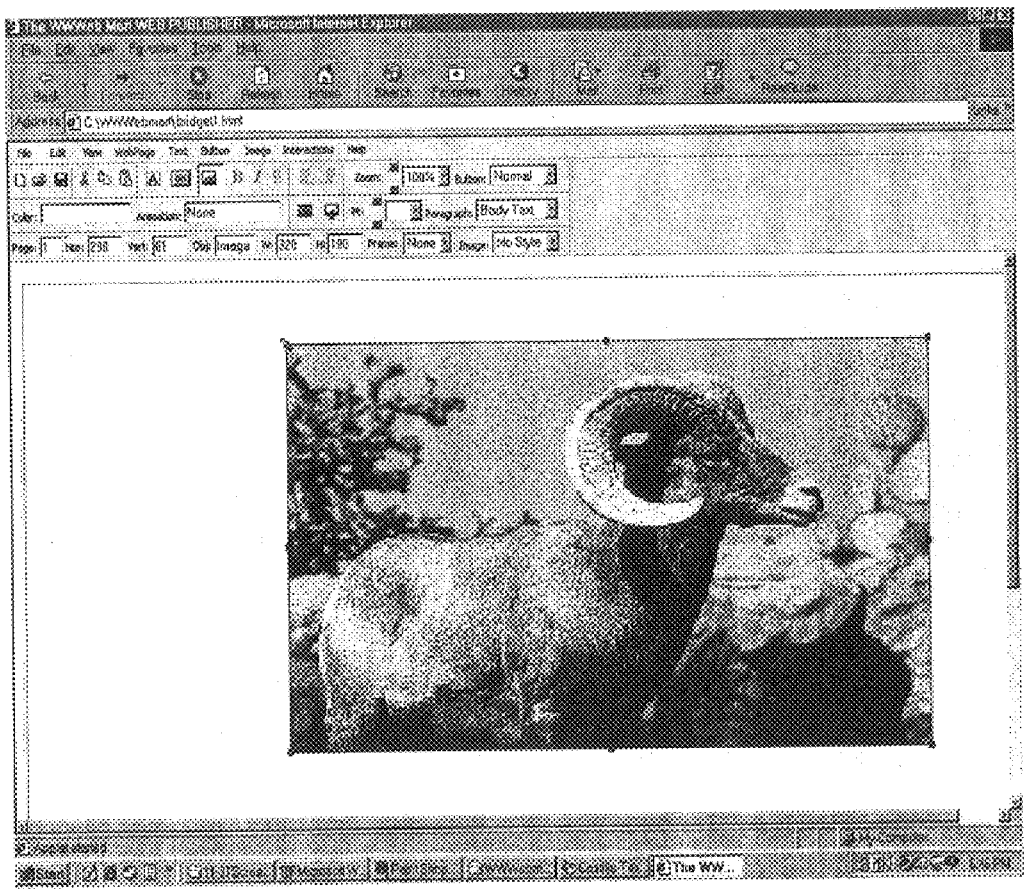

The image processing technology supports direct web page image object interactions at 99, utilizing the communication technology described in FIG. 6. The build engine first processes the mouse event as described in FIG. 7, and places the appropriate values into a poll enabled JAVA method as described in FIG. 9. There are two types of direct web page image object interactions. s The first occurs by simply selecting the image object with a single mouse click. A red selection rectangle is drawn around the image, as are eight attachment points. When the user has pressed the mouse cursor, the mouse cursor's shape changes to that of an anchor, which is a symbol that can be used when dragging or moving an object. The mouse's location will jump to the origin for the image. In an alternative implementation, the anchor can be defined by the mouse location at the time of the mouse drag operation. In either case, while the mouse is being dragged, the build engine updates its internal database. The build engine also updates its poll-enabled methods for communication with the interface's polling technology at 100. The JavaScript poller reads these values, updates the panel JavaScript database, and updates the panel's interface objects. In a similar way, placing the mouse cursor over an attachment point and dragging will result in an image resizing operation. Screen shots FIG. 50 through FIG. 52 show a visualization of an image dragging operation. Screen shot FIG. 50 shows the cursor over an unselected image. Screen shot FIG. 51 shows the screen state after the left mouse button has been pressed. Notice that the image is now selected and the cursor shape has changed to the drag state. Screen shot FIG. 52 shows the screen state after the mouse has been dragged to the northwest. Notice that the image stayed selected and moved with the mouse. Screen shots FIG. 53 and FIG. 54 show a visualization of an image resizing operation for a normal image. Notice that all eight-attachment points are drawn and active for the selected image. Screen shot FIG. 53 shows the cursor over the upper left attachment point. Notice that the cursor shape has changed to a northwest to southeast resize cursor shape. Screen shot FIG. 54 shows the result after the left mouse button has been pressed over the upper left attachment point and dragged to the northwest. Notice that the image's upper left corner is still under the cursor, the image has resized, and the cursor shape remained unchanged. For image resizing operations with the mouse over and mouse down objects, only the east, southeast, and south attachment points are drawn and active.

Figure 55:
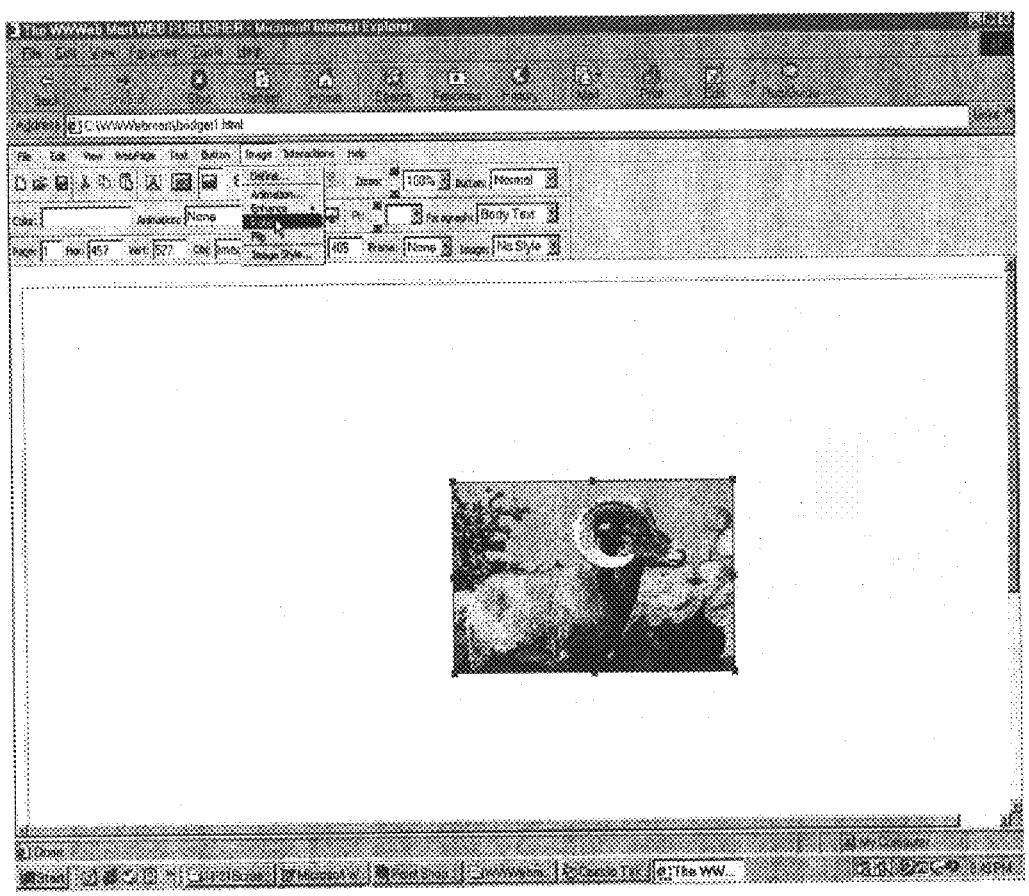
Figure 56:
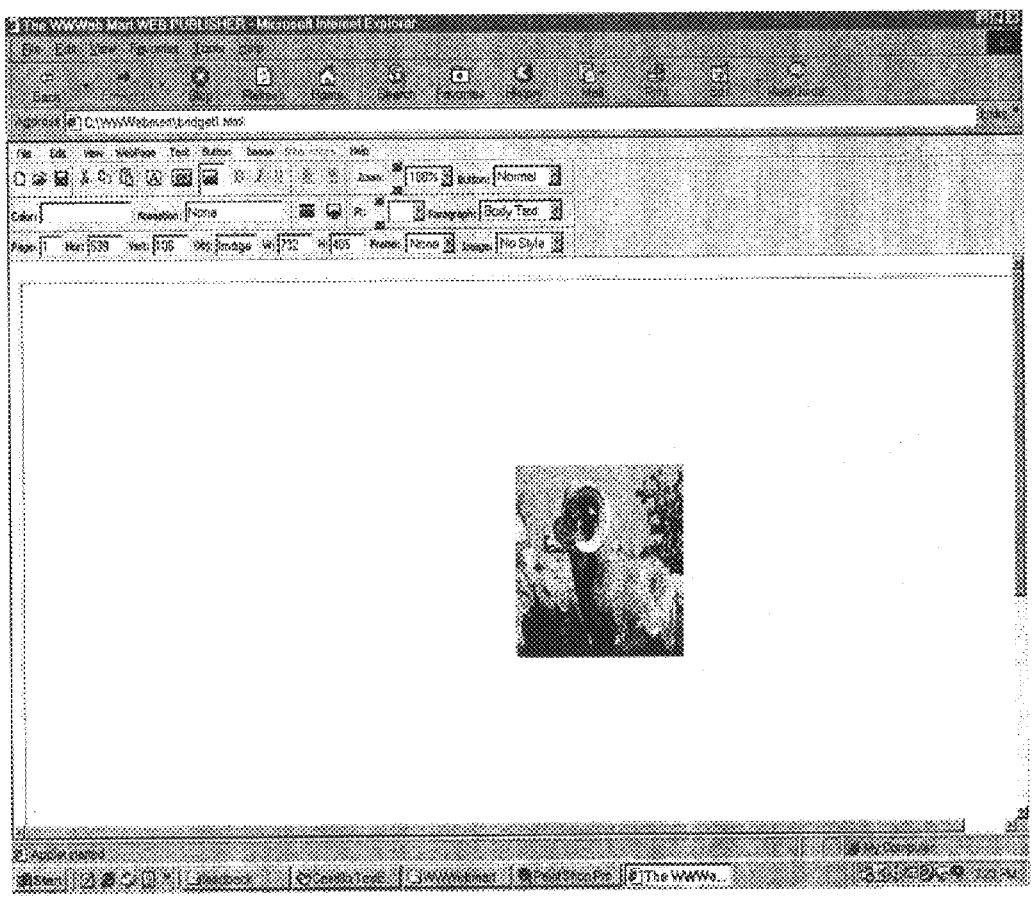

The second type of direct web page image object interaction occurs when the panel's JavaScript code detects that the user has selected an image object interaction feature from the panel's "Image" menu. The appropriate JavaScript function is called, which sets the necessary status variables, and then calls the appropriate JAVA method, passing the necessary values as arguments. The JAVA method then sets its necessary status variables, changes the mouse cursor shape as appropriate, depending upon the type of direct image operation, and awaits a direct mouse operation on the image object. Image rotation is an example of this type of direct image interaction. In one implementation, direct image object rotation is realized by utilizing the image rotation technology described in association with FIG. 33 below. Screen shots FIG. 55 and FIG. 56 show a visualization of an image rotation for a normal image. Screen shot FIG. 55 shows the user selecting the rotate command from the "Image" menu. Immediately the cursor's shape changes to the rotate (a dual left/right arrow) cursor, and the selected image's attachment points disappear. Placing the cursor on the image and dragging will cause the image to rotate on an east/west and/or north south axis. Screen shot FIG. 56 shows the result after the mouse was dragged on an east/west plane.

Image object interactions are invoked by selecting from the JavaScript panel, selecting from a JavaScript pop-up window, and by selecting from a JAVA window object at 101, as described in FIG. 6. The initial values in the pop-up window are set from JavaScript's database. After any user interaction, JavaScript's database is updated and the appropriate method in the build engine is called with the necessary settings. The build engine, after updating its internal database, calls the appropriate image processing method. The image processing routine then calls the required image filter(s), which then perform the necessary processing on the image bitmap at 102.

An image filter is a body of code, usually consisting of one or more digital image processing algorithms, which operate on an image bitmap, and create a transformed image bitmap. An image observer can be invoked by the image filter, which then reports when the image bitmap processing has been completed. An image observer is a independent process that monitor's a particular image processing event, such as the execution of an image filter or the reading in of an image file, and reports the status of that process when queried. When the image observer reports a successful completion, the image filter can call the build engine's draw system to display the transformed image bitmap. This interaction between the build engine's image processing method, the image filter(s), the image observer, and the draw system can occur many times, depending upon the image processing operation chosen. Image animations and image transformations, which are technologies that rely heavily on image filters, and the image observer are discussed in greater detail below in association with FIG. 16 and FIG. 17.

Figure 13:
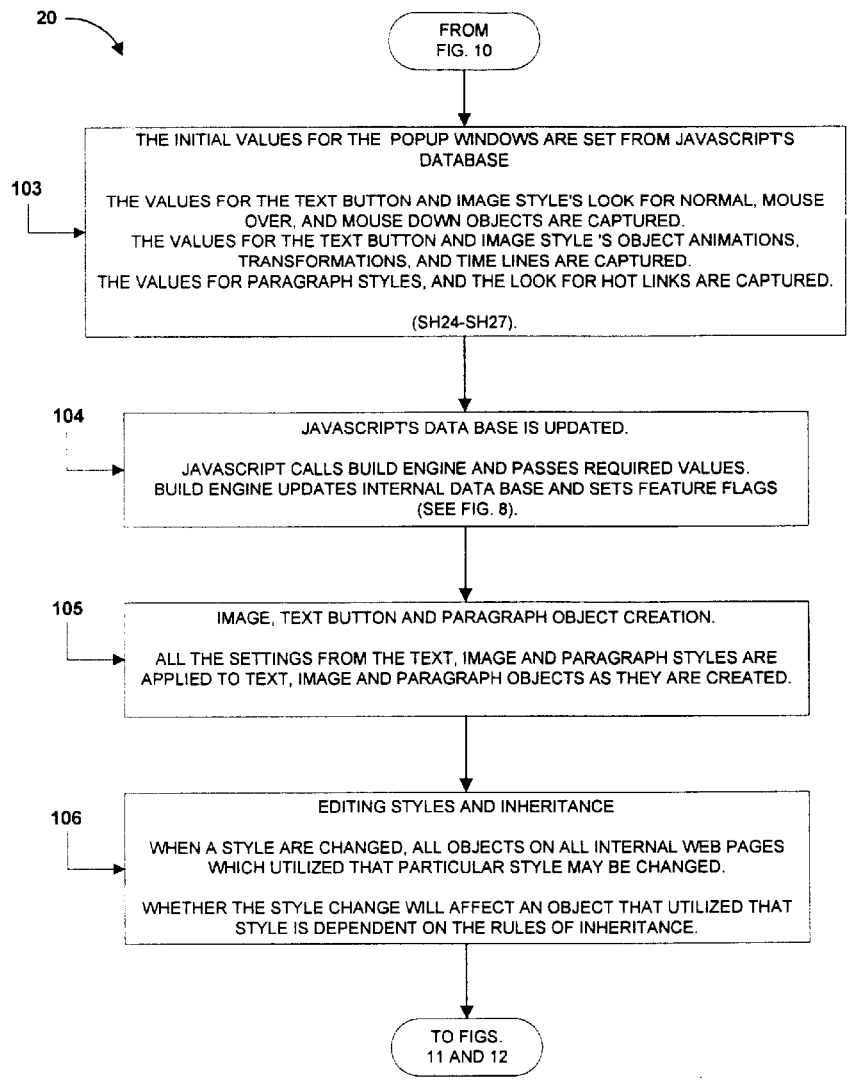
FIG. 13 is a flow chart that shows a detailed view of the build time implementation of text, button and image styles in accordance with one implementation of the present invention.

FIG. 13 shows a process for implementing text button, image and paragraph style settings (20 of FIG. 3). The initial values for all the settings inside a parent pop-up window and associated child pop-up windows, for a particular style, can be set from the JavaScript database at 103. The settings can include: image object styles, text button object styles and paragraph object styles.

The following settings can be initialized and changed for image object styles. The following settings are initialized for all image object states (Normal, mouse Over, mouse Down) and can be changed:

(1) resize factor.
    (2) rotation factor.
    (3) main animation type, speed, number of animation steps (resolution) and number of cycles.
    (4) image processing factors. (brightness, contrast, etc.)

(5) 3d effects and their color values.
(6) web page centering attribute.
(7) web page scaling attribute.
b) The following actions are initialized and can be changed.
   (1) sound effects and audio channels.
   (2) video files and video channels
   (3) text button and image pop ups and their attributes (See 1.a above and 2.a below.)
   (4) click events.
c) The following transformation settings are initialized and can be changed.
   (1) the initial delay
   (2) up to three transformations can be defined with the following settings:
      (a) which image states should the transformation be from and into.
      (b) the speed of the transformation.
      (c) any delay before the next transformation.
   (3) whether the transformation(s) should occur simultaneously with the enter and exit time line animation or after the enter and before the exit animations.
d) The following time line settings are initialized and can be changed.
   (1) the initial delay before the image object's appearance.
   (2) the enter animation type, speed, and animation resolution.
   (3) the delay after the enter animation and the main animation.
   (4) the exit animation type, speed, and animation resolution.
   (5) the initial delay, after the entrance of the parent object, before the child text button and image object's appearance(s).
   (6) the child object(s) enter animation type, speed, and animation resolution.
   (7) the delay after the child object(s) enter animation.
   (8) the child object(s) exit animation type, speed, and animation resolution. The following settings can be initialized and changed for text button object styles.
e) The following attributes are initialized for all text button object states (normal, mouse over, mouse down) and can be changed:
   (1) all font specifications.
   (2) vertical state.
   (3) all color specifications.
   (4) 3d effects and their color values.
   (5) web page centering attribute.
   (6) font processing attributes (available in java 2)
   (7) scale, shear, and rotate (available in java 2)
f) The following actions are initialized and can be changed.
   (1) sound effects and audio channels.
   (2) video files and video channels
   (3) text button and image pop ups
   (4) click events.
g) The following transformation settings are initialized and can be changed.
   (1) the initial delay
   (2) up to three transformations can be defined with the following settings:
      (a) which image states should the transformation be from and into.
      (b) the delay before the next transformation.
   (3) whether the transformation(s) should occur simultaneously with the enter and exit time line animation or after the enter and before the exit animations.
h) The time line settings are the same as those defined for image objects. They also are initialized and can be changed.

The following settings can be initialized and changed for paragraph styles.

The following attributes are and can be changed:
i) all font specifications.
j) all color specifications.
k) 3d effects and their color values.
l) web page centering attribute.
m) the look of hot links, including the text and background colors when the link is active and when the mouse is over the link.

The reference to JAVA 2 under text button object styles refer to the most recent version of JAVA released by Sun Microsystems. This version supports a far more robust two-dimensional processing capability than JAVA 1.6, including significant font processing capabilities and the scaling, shearing, and rotation of objects. Currently, most conventional browsers only support JAVA 1.6. Provisions are made in the invention so that as the then popular browsers support more robust versions of programming languages, those new capabilities can be employed to further enhance the capability of the invention.

Referring again to FIG. 13, upon detecting the completion of editing an image, text button or paragraph style, the panel's JavaScript calls a build engine method and passes the required values. The build engine updates its internal database and sets any necessary feature flags at 104. When an image, text button or paragraph object is created, all the style settings for the currently selected style are applied by the build engine as part of the definition for the newly created object at 105.

If a style is changed, all objects on all internal web pages that are utilizing that style are candidates for being changed to those new values at 106. Flags are kept for every possible style setting for each object. If a given object is edited through the text button, image, or interaction menus or other interface objects of the panel 400, the flags are set for any setting that are changed. If that style is subsequently changed, only those settings that have not had their flags set will be changed for any given object.

Figure 14:
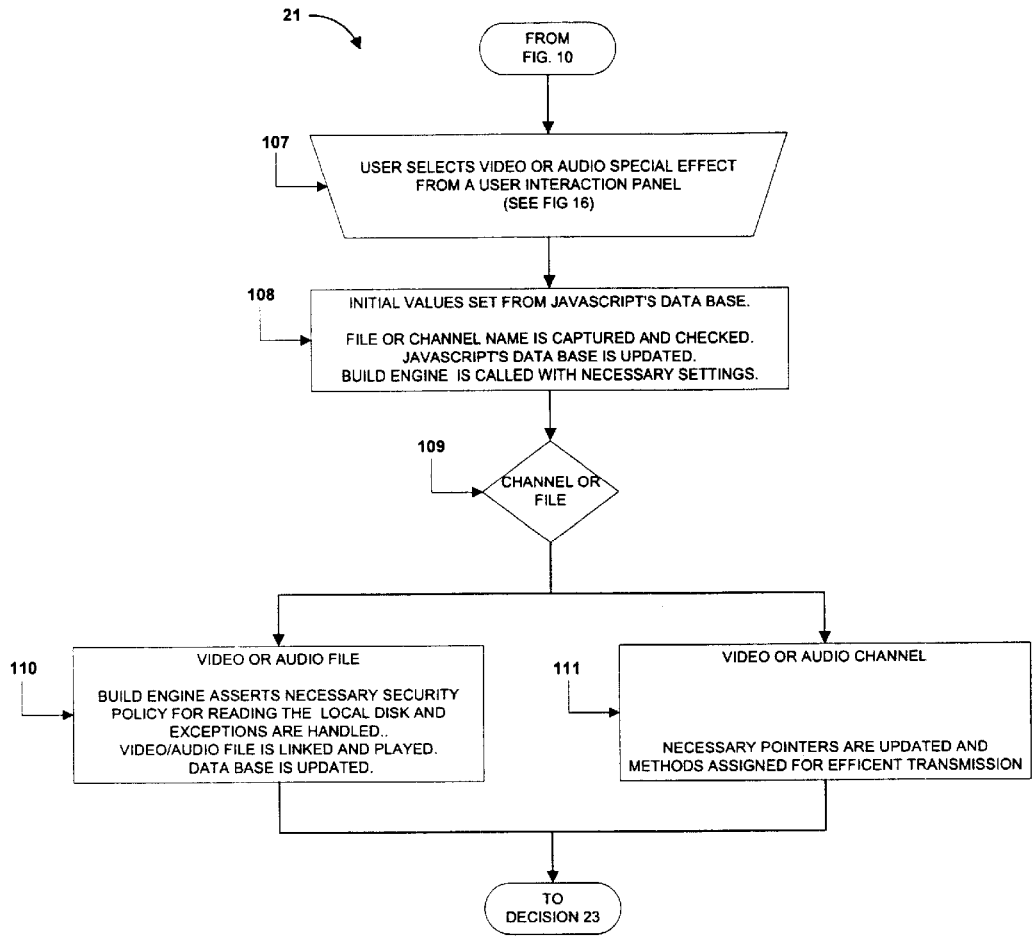
FIG. 14 is a flow chart that shows a detailed view of the video and audio processing in accordance with one implementation of the present invention.

FIG. 14 describes the video and audio file and video and audio channel processing techniques employed by the build engine (21 of FIG. 3). A user can select a video or audio special effect (i.e. user input is provided at 107 that indicates a video or audio special effect). The method for activating a video file or video channel is defined in the text button and image object "mouse over" interactive pop-up windows described later at FIG. 16. Methods for defining a video object as a pop-up, or a frozen object, are described with reference to the text button and image object "mouse down" interactive pop-up window also described at FIG. 16. Audio files and audio channels can be defined in both the "mouse over" and "mouse down" interactive pop-up windows also described at FIG. 16. The pop-up or a frozen object settings for audio are also set in the object "mouse down" interactive pop-up windows discussed therein.

As before, the panel JavaScript code initializes any pop-up windows (where the initial values are set from the JavaScript database), captures a file or channel name (from the user input) and performs file and validity error checking upon detecting a user completion action at 108. The build engine is then called, receiving the necessary data and status as function call arguments. The build engine determines if the audio and video definition is a file pathname or the URL of a live channel at 109, and thereafter initiates its exception handling. If the video or audio definition is a file, the build engine performs the relevant file exception handling checks, and asserts the necessary security permissions. If there were no errors, or the exception handling error was recoverable, the build engine reads and links the video/audio file to the database, and plays the file for user verification at 110. If the video or audio definition was a channel, the necessary pointers are updated in the database, and methods are assigned for efficient transmission, at run time by the run time engine, at 111. The ability of the run time engine to play multiple synchronized audio and video files and channels simultaneously will be described at FIGS. 31–35.

Figure 15:
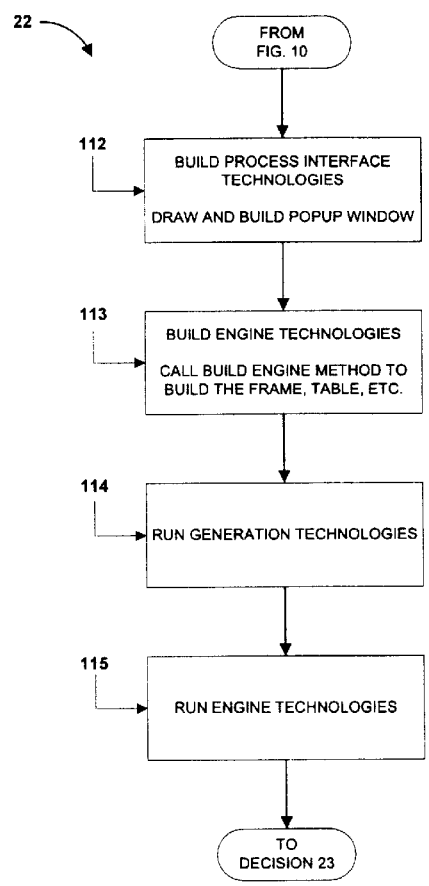
FIG. 15 is a flow chart that shows a detailed view of the frame, table, forms, and draw objects processing and technology in accordance with one implementation of the present invention.

FIG. 15 describes the frames, tables, forms and draw objects technologies employed by the build engine (22 of FIG. 3) in one implementation of the invention. When the panel JavaScript code detects a user action to create a "frame", "table", "form" or "draw object" from an appropriate panel interface object, it draws and initializes the appropriate pop-up window at 112. Upon detecting a user completion action by the pop-up window's JavaScript code, a panel JavaScript function is called to perform the necessary error checking and updating of the panel's database. Panel JavaScript thereafter calls the appropriate build engine method(s) passing the necessary data and status values as function call arguments at 113.

The build engine updates its internal database, sets the necessary status values, and initializes, as necessary, appropriate methods for run time processing. In one implementation, the build engine includes definitions to map a given object into a relational database. Also available are a full array of database operations. Support for popular databases (such as Oracle, Informix, Sybase and DB2) are available on a real time interactive basis.

Figure 16:
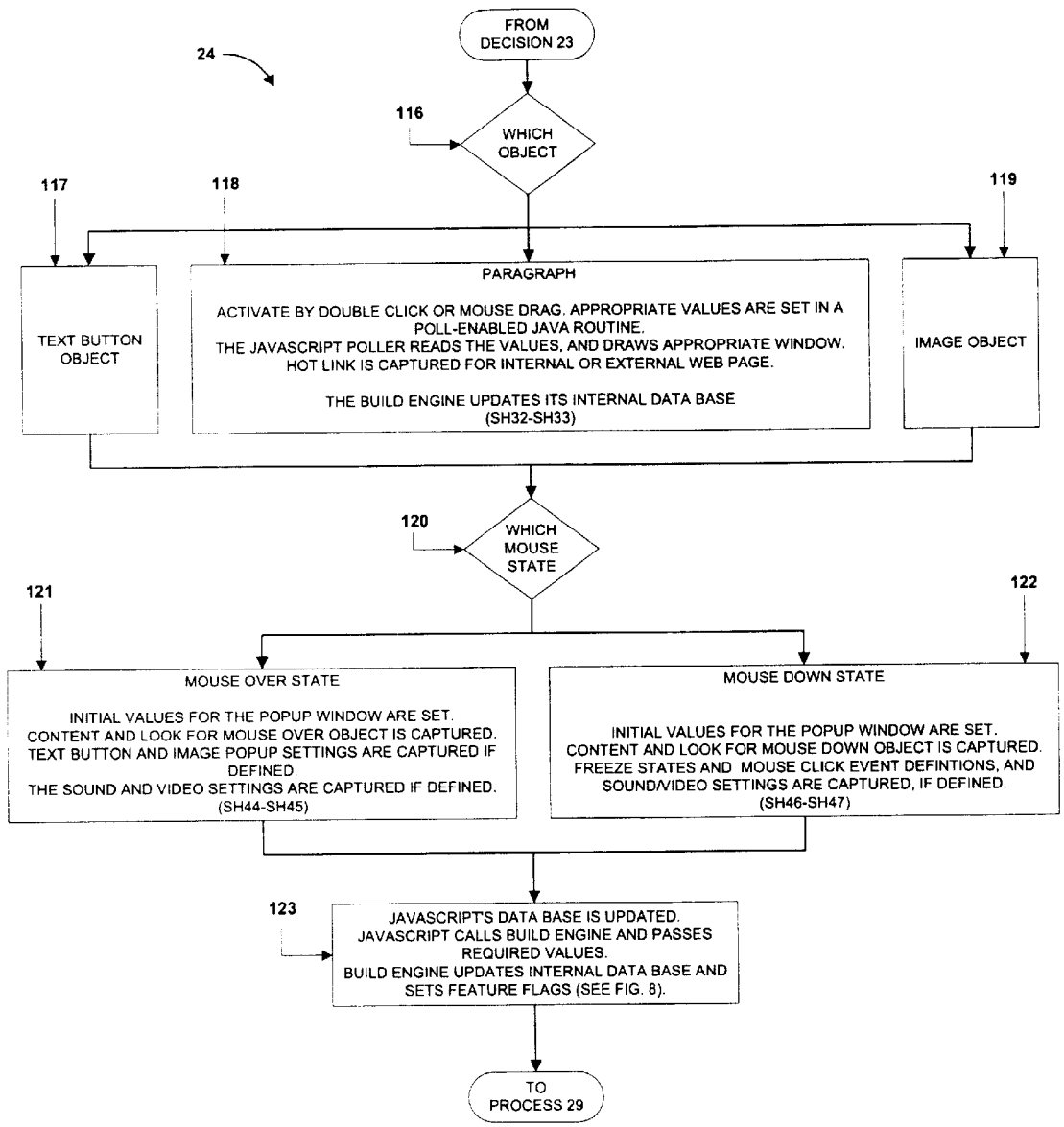
FIG. 16 is a flow chart that shows a detailed view of the build time methods for supporting various user interactions at run time.

The run generation technologies, as described later in FIGS. 24–27, are also implemented for a given frames, table, form and draw object at 114. The run time technologies, as described later in FIGS. 28–36, are also implemented for a given frame, table, form and draw object at 115. FIG. 16 describes the user interaction settings and technology employed by the build engine (24 of FIG. 3). Depending upon the type of object currently selected at 116 (if no object is selected no user interaction choices will be available) the panel JavaScript Code draws an appropriate pop-up window. If the selected object was a text buttoh object at 117, or an image object at 119, both "mouse over" and "mouse down" choices will be available from the panel's "Interactions" menu. If the selected object is a paragraph, user interaction definitions can be activated by a double click or a mouse drag event being detected by the build engine at 118.

More specifically, appropriate values are set in a poll-enabled JAVA routine. The JavaScript poller reads the values, and draws the appropriate panel menu choices. The "Text Style", "Hot Link", "Preferences" and "Format" pop-up windows can be chosen. If the hot link choice under the panel's "Text" menu is selected and executed, the hot link definition for internal or external web pages is captured by an appropriate JavaScript function and file pathname error and validity checking is performed. If either the "Text Style", "Hot Link", Preferences" or "Format" choices under the panel's "Text" menu are selected, the panel's JavaScript draws the appropriate pop-up window. Upon detecting a user completion event, the panel's JavaScript reads the values in the pop-up window and passes the font specification parameters to an appropriate build engine method as function call parameters. The build engine then processes this data, calls a reformat method, updates its internal database, and sets the necessary four-dimensional variables for communication with the draw system.

The normal and "mouse over" foreground and background colors for the hot link, which were defined in a link look pop-up window (available under the "Text" menu of the panel), are utilized by the build engine to draw the hot link. The build engine performs the necessary exception handling, and then updates its internal database.

Based on the panel's JavaScript Code detecting whether the user chose the "mouse over" or "mouse down" choice under the "Interactions" menu at 120, as well as based on whether an image or text button object is currently selected, the panel's JavaScript code draws the appropriate pop-up window. Initial values for the pop-up windows are set from the panel's database at 121 and 122. In one implementation, the following user interaction's for the "mouse over" and "mouse down" states for text button and image objects are supported:

1: 3D Frame, in a specified color, and selected for a specified 3D appearance, can be defined for text button and image object's "mouse over" and "mouse down" states, as well as for their text, image and video pop-ups.
2: The font typeface, font style, font size, font effect(s), text color, and text background color can be defined for a text button object's "mouse over" and "mouse down" states, as well as for the text pop-ups associated from both text button and image objects.
3: Text, image, and video pop-ups can be defined for the text button and image object's "mouse over" state.
4: A sound track (file) can be defined for the text button and image object's "mouse over" state with the following choices:
   a. play once when a "mouse over" event occurs.
   b. play until a click event while on the object.
   c. play until the mouse moves off the object.
5: A sound track (file) can be defined for the text button and image object's "mouse down" state with the following choices:
   a. play once when a mouse click event occurs when over the object.
   b. play until a second click event while on the object.
   c. play until the mouse moves off the object.
6: Both video and sounds can be defined as channels as well as files.
7: The text, image, and video pop-ups can be frozen (i.e. not disappear when the mouse moves off the object after a mouse click event, for both text button and image objects).
8: Text button and image objects can have one of the following click events defined:
   a. go to a specific internal web page.
   b. go to the next internal web page.
   c. return to the parent (calling) web page.
   d. go to an external web age. That web page will replace the current web page.
   e. go to an external web page. That web page will be launched into a new window so that both web pages will be visible and accessible.

After a user completion action is detected, the panel JavaScript code performs the necessary file error and validity checking, updates its database and sets necessary status values, and then calls the appropriate build engine method, passing the necessary data values and status as function call arguments at 123. The build engine updates its internal database, sets the necessary status variables, then draws the appropriate "mouse over" or mouse down" text button or image object states. The build engine also plays the sound or video file for user verification. The run time technology behind the user interactions will be described in greater detail in association with FIG. 36.

Figure 17:
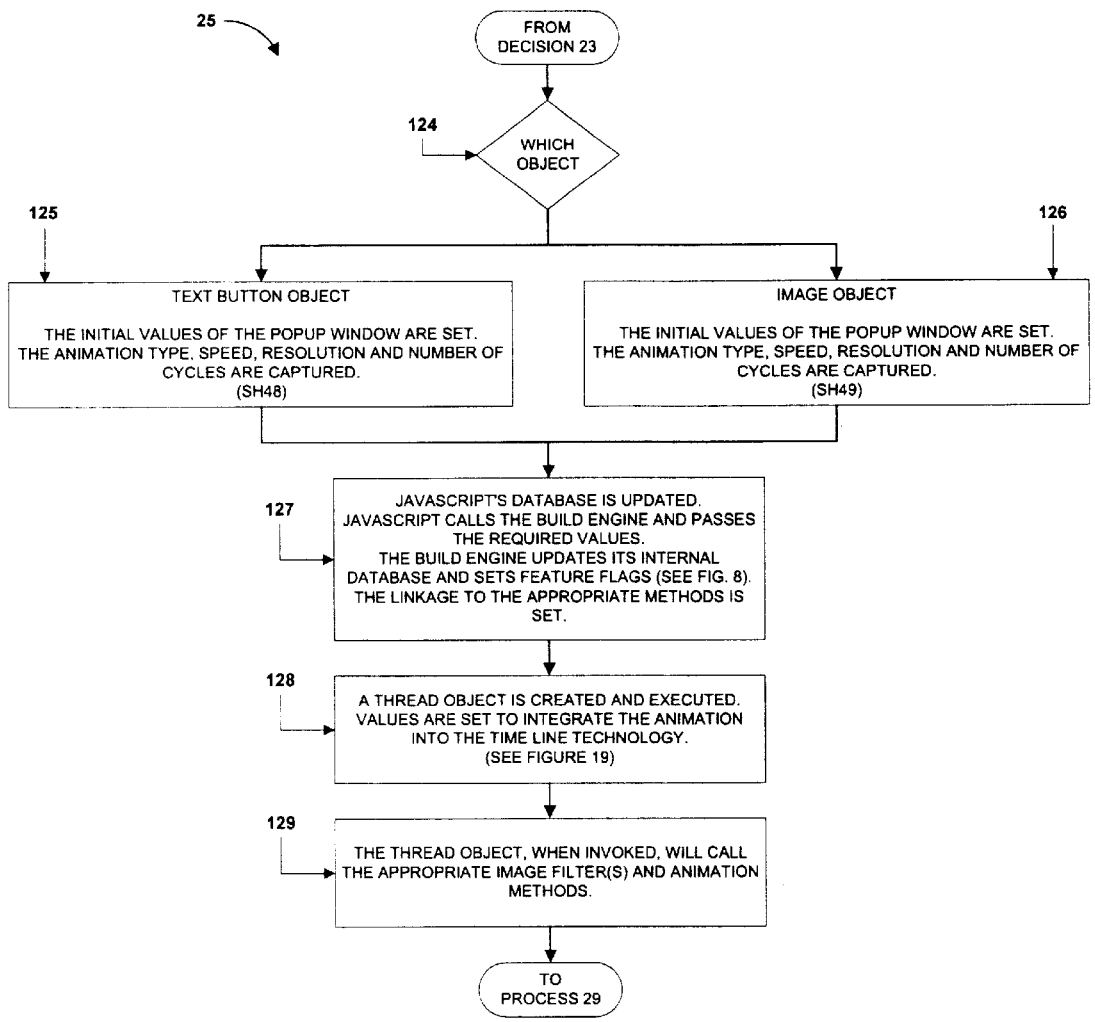
FIG. 17 is a flow chart, with its attendant screenshots shown in FIGS. 57–58, that shows a detailed view of the build time methods for text button and image object animation.
Figure 57:
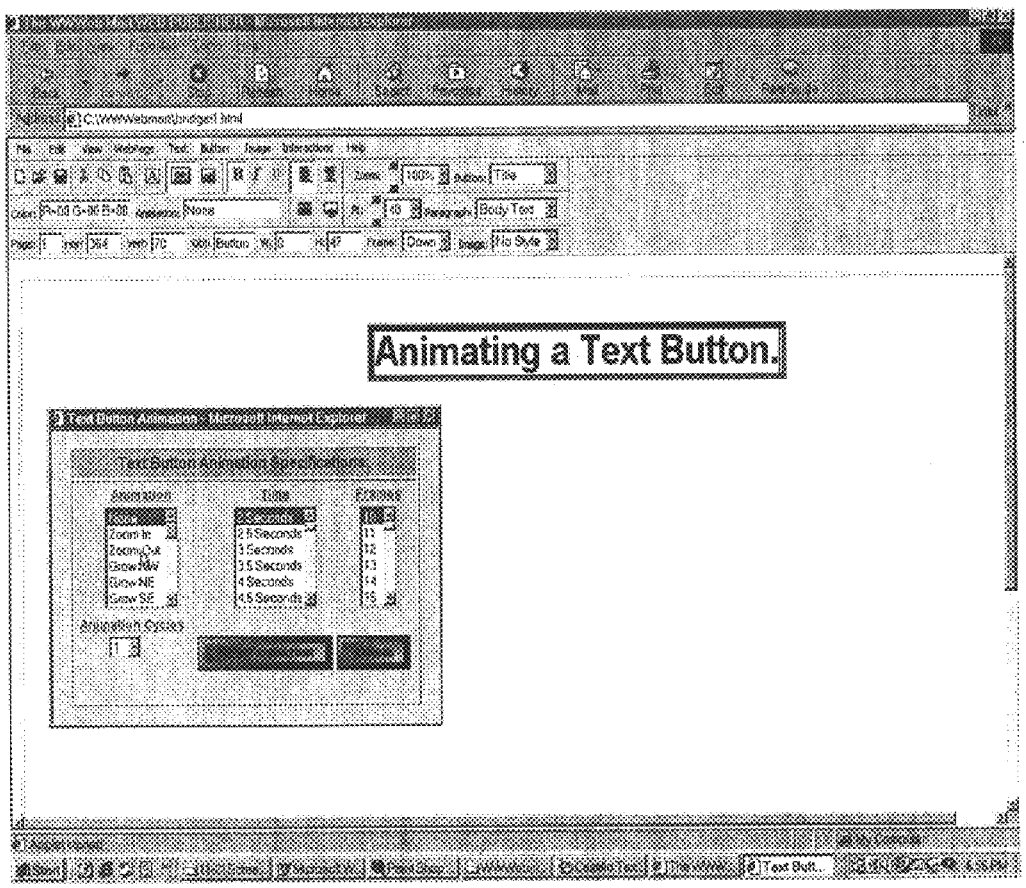
Figure 58:
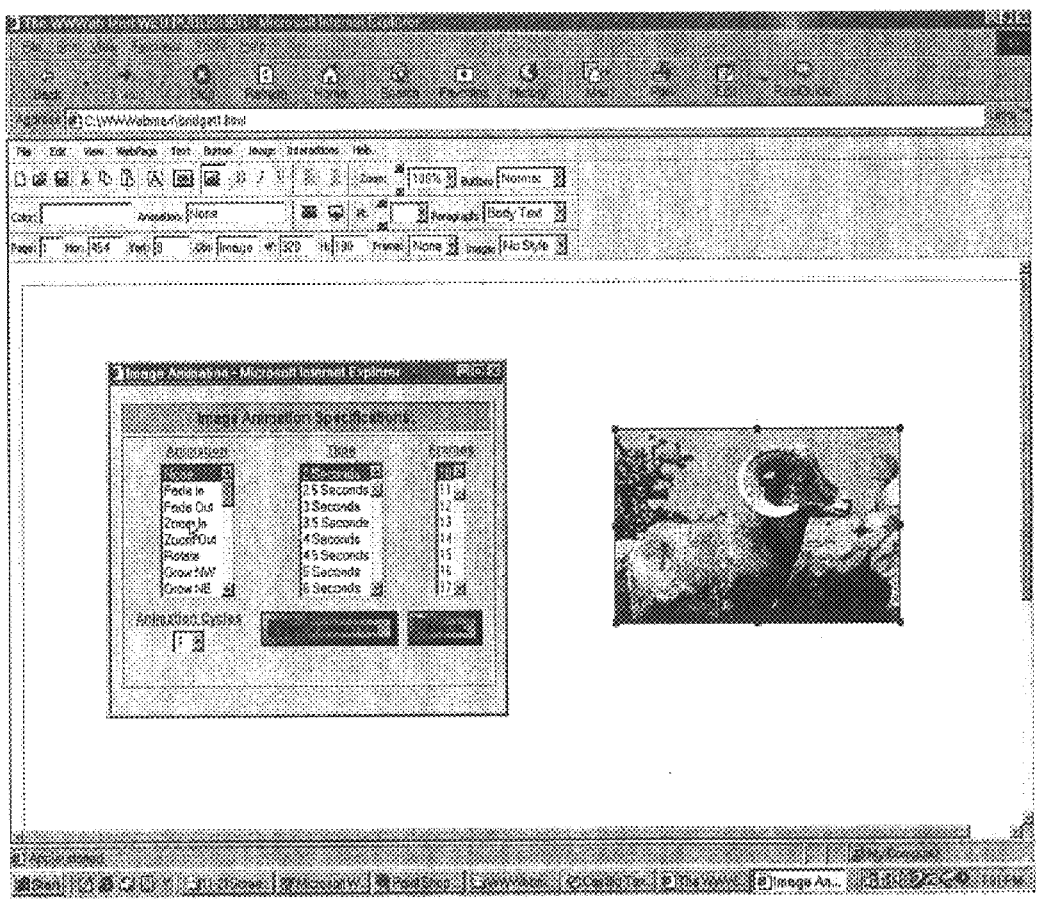

FIG. 17 describes the image and text button object animation settings and technology employed by the build engine (25 of FIG. 3). The panel's JavaScript code determines which type of object, and which object number, from the currently selected object, as reported by the poller at 124. When the panel's JavaScript detects a user selection of "Define Image" or "Animate" from the panel's "Image" menu, or a user selection of "Define Button" or "Animate" from the panel's "Button" menu, it draws the appropriate pop-up window and initializes the pop-up window's values from its database at 125 and 126. Screen shot FIG. 57 shows a visualization of one implementation of the "Text Button Animation Specifications" pop-up window and the animation settings available to the user. Screen shot FIG. 58 shows a visualization of one implementation of the "image animation specifications" pop-up window and the animation settings available to the user.

When a user completion event is detected, the panel's JavaScript code captures the values from the pop-up window for the animation type, speed, resolution, and number of animation cycles at 125 and 126, respectively, and updates its database at 127. The panel's JavaScript then calls the appropriate build engine method, passing the necessary data and status values as function call arguments. The build engine updates its internal database and sets the necessary feature flags (See FIG. 8.) Linkage to the appropriate animation method(s) is also set.

A thread object (a thread is an independent asynchronous program that is multiprogrammed with other threads, are defined and executed by the invention, by a JAVA Virtual Machine and by the browser) is created and executed for user verification at 128. Values are set to integrate the given animation thread with the object time line technology (See FIG. 19). Values are set at 129 so that when the thread object is invoked by the run time engine, the appropriate image filter(s) and animation methods are called. The run time technology behind image and text button object animations is described in greater detail in association with FIG. 31 through FIG. 35.

Figure 18:
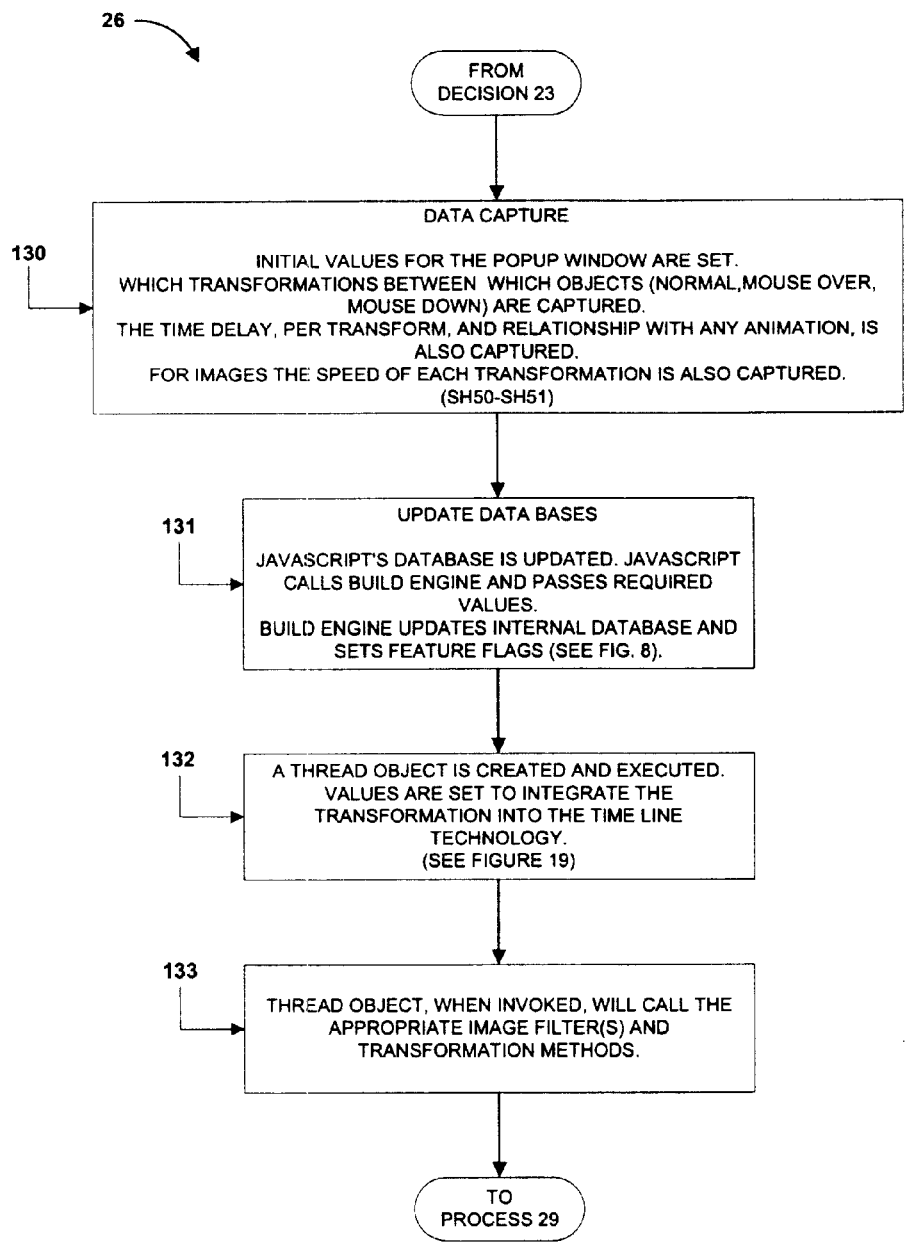
FIG. 18 is a flow chart, with its attendant screenshots shown in FIGS. 59–60, that shows a detailed view of the build time methods for text button and image transformations.

FIG. 18 describes the transformation settings and technology utilized by the build engine (26 of FIG. 3). A transformation is defined as the changing of an object from one state to another based on a timer control, subject to user settings. In one implementation, the available states for text button and image objects are their "normal", "mouse over", "mouse down" and "pop-up" definitions. For text button objects, a transformation is implemented as the instantaneous drawing of one object state while erasing the previous object state. For images, a transformation is the gradual fading out of the previous object state, while, simultaneously, fading into the next object state.

Figure 59:
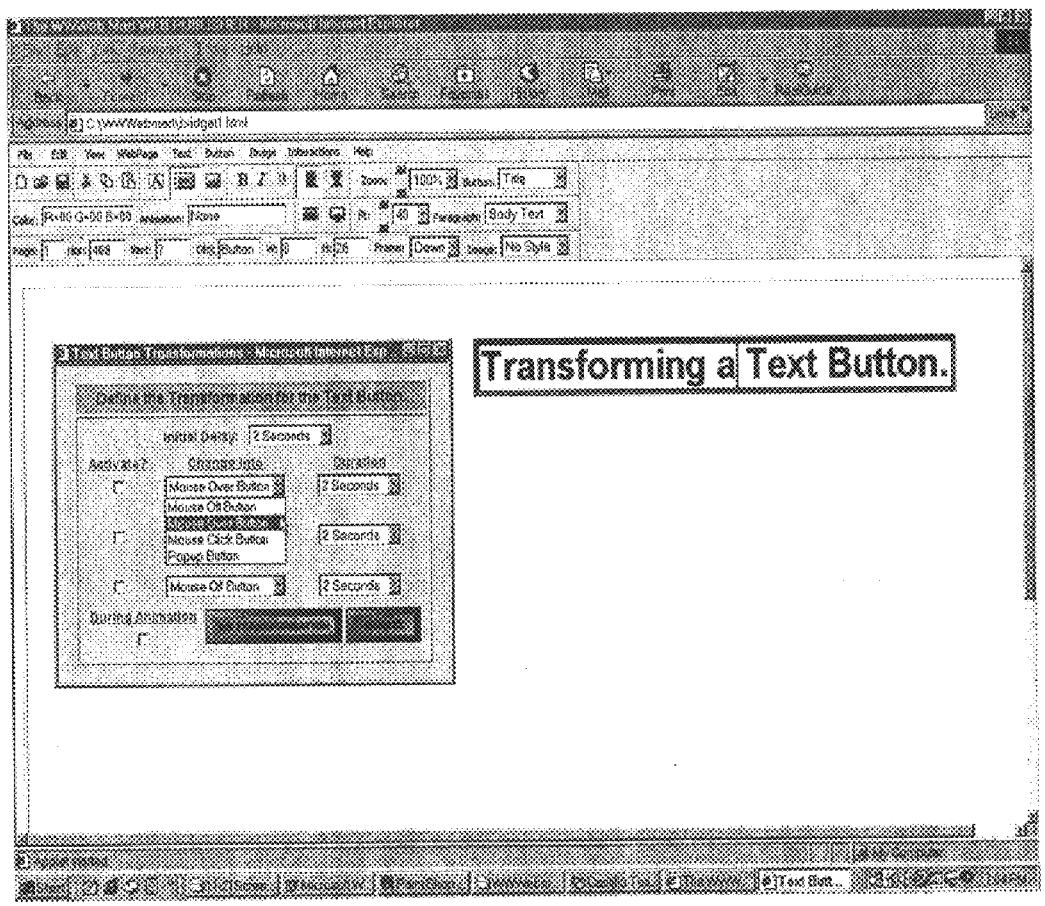
Figure 60:
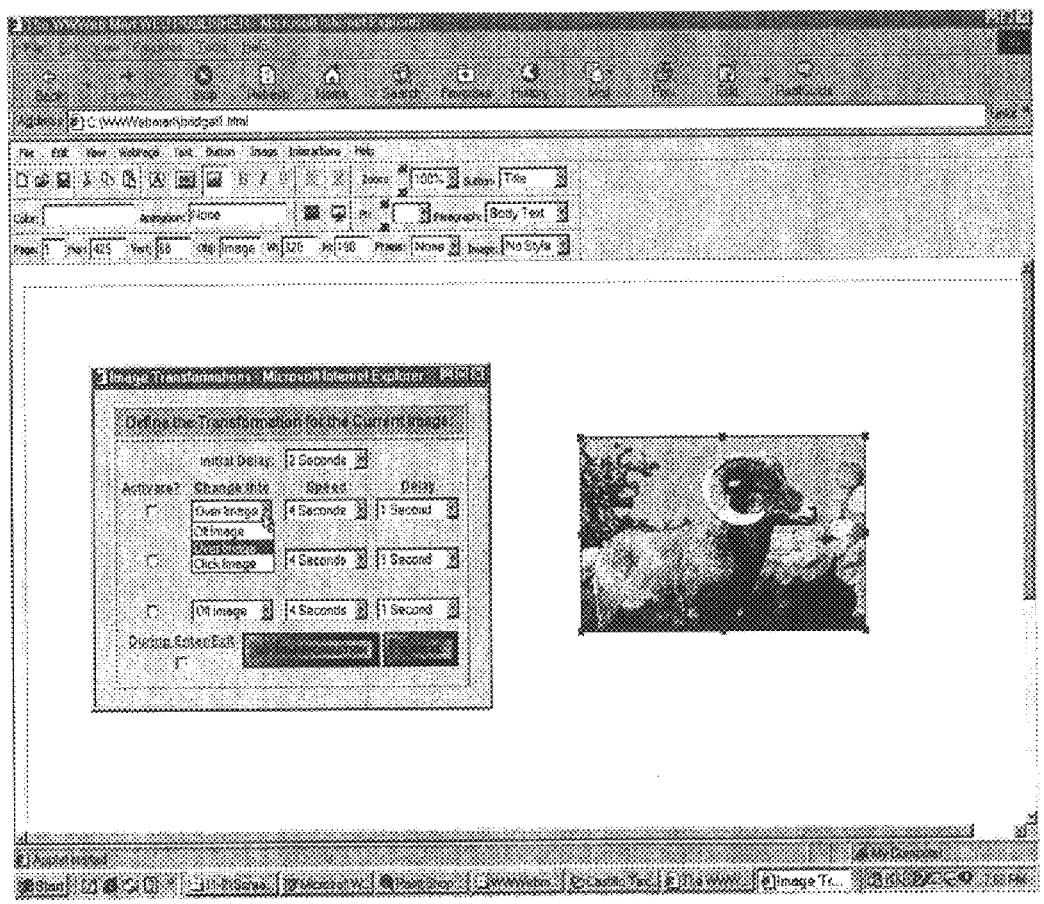

Prior to any user menu selection, the panel's JavaScript code already knows the status of any selected object through the poller mechanism (124 of FIG. 17). This includes what type of object and the object's internal identifying number. When the panel's JavaScript detects a user selection of "Transform" from the panel's "Interactions" menu, it draws an appropriate pop-up window and initializes the pop-up window's values from its database at 130. Screen shot FIG. 59 shows a visualization of one implementation of a "define the transformation for the text button object" pop-up window and the transformation settings available to the user. Screen shot FIG. 60 shows a visualization of one implementation of a "define the transformation for the image object" pop-up window and the transformation settings available to the user. When a user completion event is detected, the panel's JavaScript Code captures the values from the pop-up window based on the object type.

In one implementation, the following settings for text button objects can be specified:
1. The initial delay.
2. Up to three transformations can be defined with the following settings:
   a. Which image states should the transformation be from and into.
   b. The delay before the next transformation.
3. Whether the transformation(s) should occur simultaneously with the enter and exit time line animation or after the enter and before the exit animations.

In one implementation, the following settings for image objects can be specified:
1. The initial delay.
2. Up to three transformations can be defined with the following settings:
   a. Which image states should the transformation be from and into.
   b. The speed of the transformation.
   c. The resolution of the transformation.
   d. Any delay before the next transformation.
3. Whether the transformation(s) should occur simultaneously with the enter and exit time line animation or after the enter and before the exit animations.

The panel's JavaScript updates its database at 131. The panel's JavaScript then calls the appropriate build engine method, passing the necessary data and status values as function call arguments. The build engine updates its internal database and sets the necessary feature flags (See FIG. 8.) Linkage to the appropriate transformation method(s) is also set.

Figure 19:
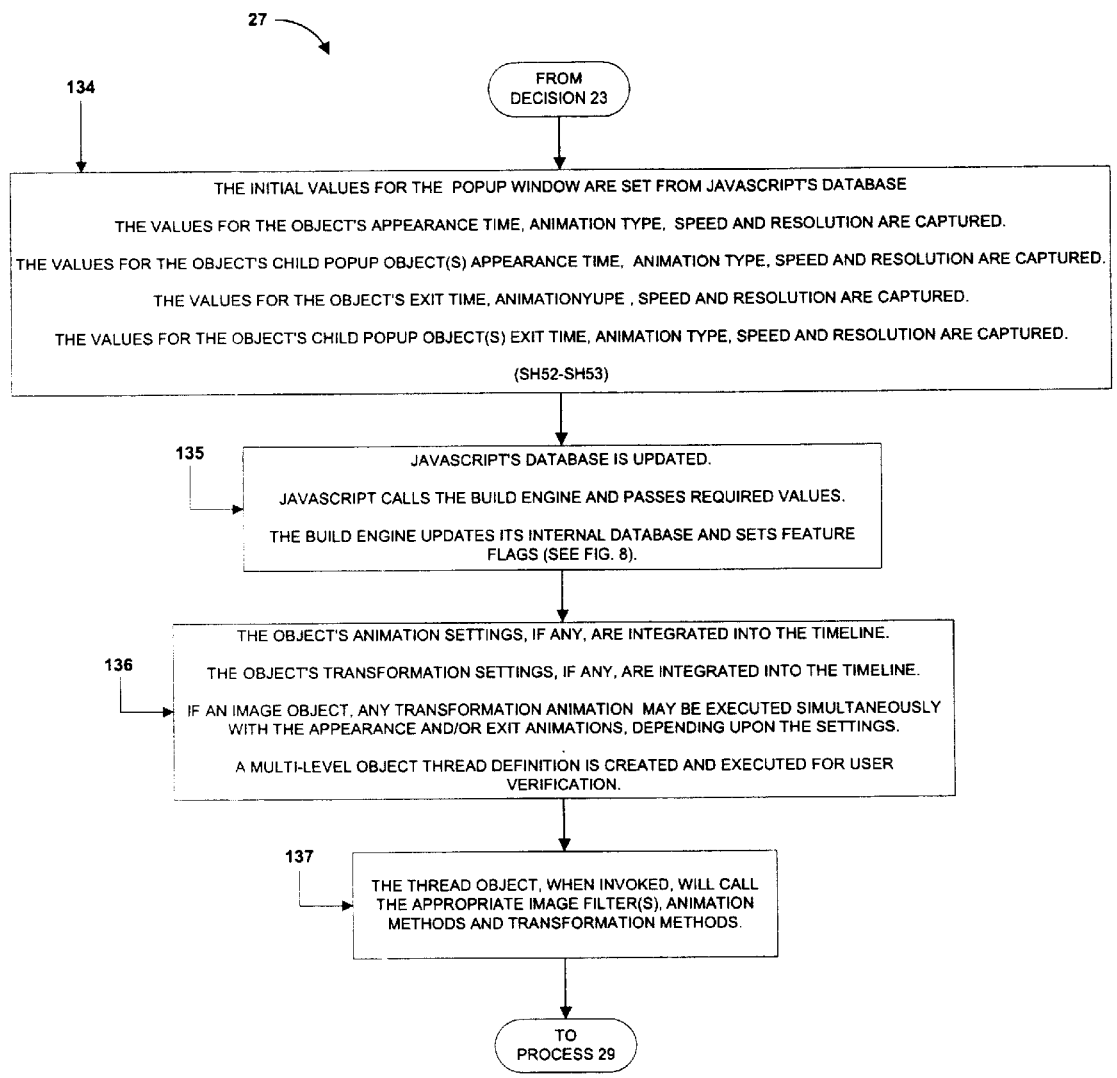
FIG. 19 is a flow chart, with its attendant screenshots shown in FIGS. 61–62, that shows a detailed view of the build time methods for text button and image time lines.

A thread object is created and executed for user verification at 132. Values are set to integrate this transformation thread with the object time line technology (See FIG. 19). Values are set at 133 so that when the run time engine invokes the thread object, the appropriate image filter(s) and transformation methods are called. The run time technology behind image and text button object transformations is described in greater detail below in association with FIG. 31 through FIG. 35. FIG. 19 describes the text button and image time lines and technology utilized by the build engine (27 of FIG 3). A time line is an independent asynchronous process that defines the existence of a given text button or image object. An object's time line begins at the time a given web page makes its appearance, either through an immediate draw or through a transition animation. In one implementation, an object time line can be created as an instance of a class, which has a threadable interface. This instance has its own data structures, which define the animations, and transitions associated with the time line definition. An image or text button object time line can spawn child time lines, at a designated moment. A complete description of time line technology, and how they integrate the animation and transformation technologies, will be described below in association with FIG. 31 through FIG. 35.

The build process begins the time line definition process by having the panel's JavaScript determine what is the currently selected object, utilizing the polling technology at

Figure 61:
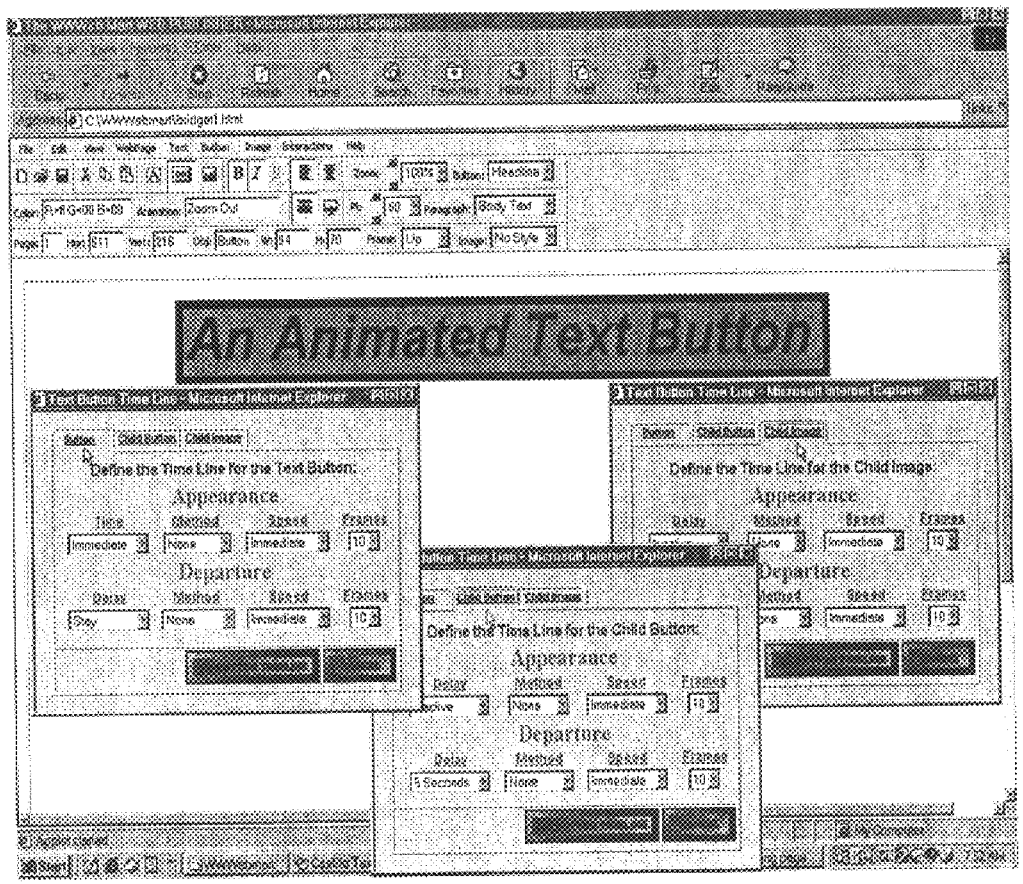
Figure 62:
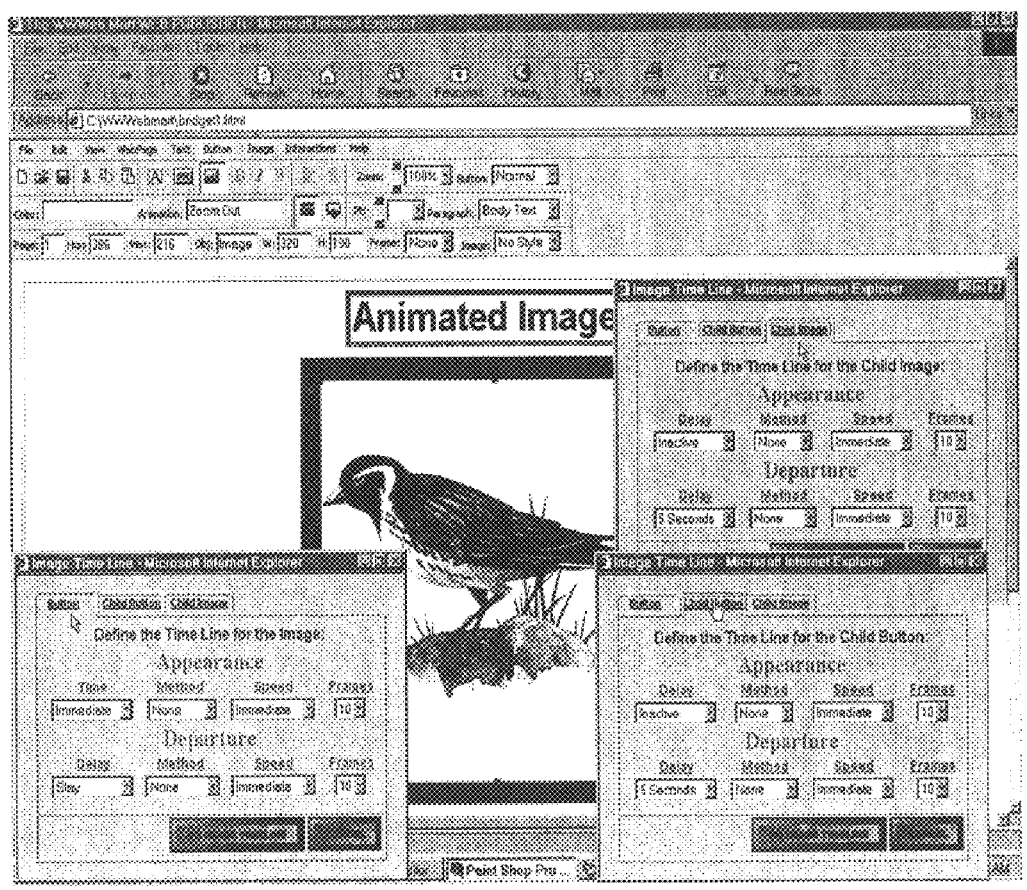

134. That is, values for the object' appearance time, animation type, speed and resolution are captured. When the panel's JavaScript detects a user selection of "time line" from the panel's "Interactions" menu, it draws the appropriate pop-up window and initializes the pop-up window's values from its database. Screen shot FIG. 61 shows a visualization of a collage of one implementation of a "define the time line for the text button object" tabbed pop-up window and the time line settings available to the user under each tab. Screen shot FIG. 62 shows a visualization of a collage of one implementation of a "define the time line for the image object" pop-up window and the time line settings available to the user under each tab. When a user completion event is detected, the panel's JavaScript captures the values from the pop-up window based on the object type. The currently available settings, for both text button and image objects, are:

1: The initial delay before the image object's appearance.
2: The enter animation type, speed, and animation resolution.
3: The delay after the enter animation and the main animation.
4: The exit animation type, speed, and animation resolution.
5: The initial delay, after the entrance of the parent object, before the child text button and image object's appearance(s).
6: The child object(s) enter animation type, speed, and animation resolution.
7: The delay after the child object(s) enter animation.
8: The child object(s) exit animation type, speed, and animation resolution.

The panel's JavaScript updates its database at 135. The panel's JavaScript then calls the appropriate build engine method, passing the necessary data and status values as function call arguments. The build engine updates its internal database and sets the necessary feature flags (See FIG. 8.) A build engine method then processes all the data related to this object. The object's animation settings, if any, are integrated into the timeline at 136. The object's transformation settings, if any, are also integrated into the timeline. If an image object, any transformation animation may be executed simultaneously with the appearance and/or exit animations, depending upon the settings. Finally, a multi-level object thread definition is created and executed for user verification. Values are set at 137 so that when the run time engine invokes the thread object, the appropriate image filter(s), animation methods, and transformation methods are called.

Figure 20:
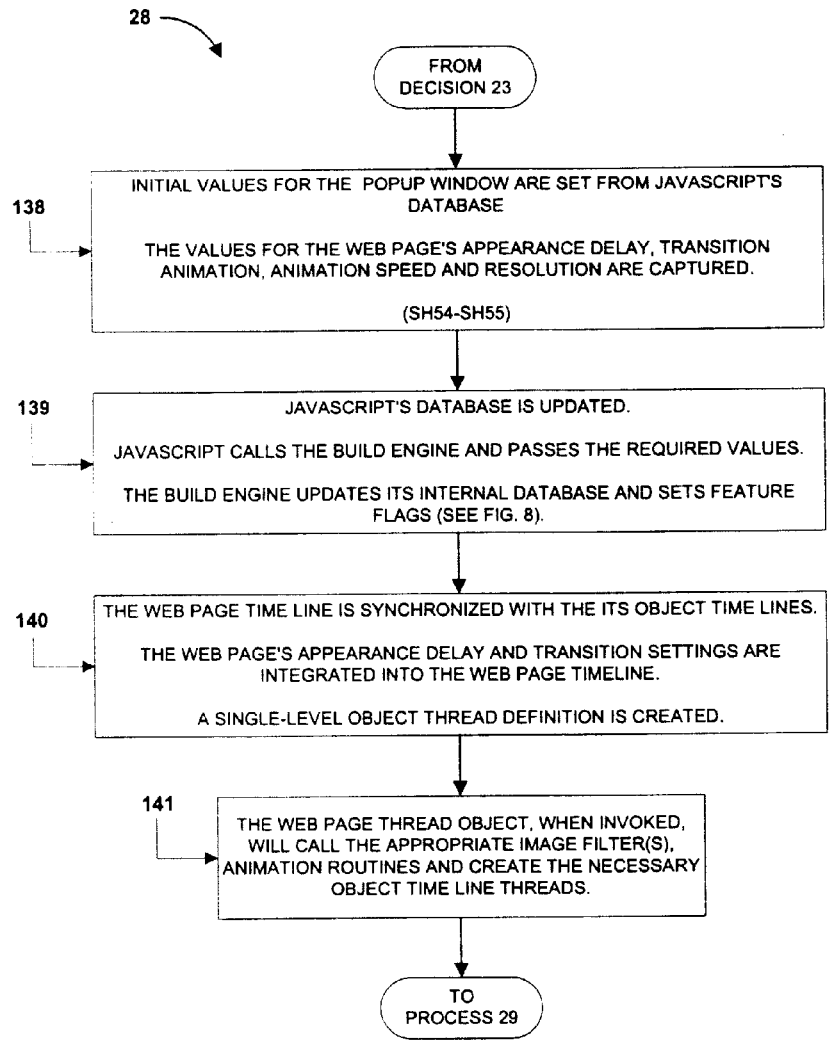
FIG. 20 is a flow chart with its attendant screenshot shown in FIG. 63, that shows a detailed view of the build time web page transition animations and time lines.

FIG. 20 describes the web page transition animations, time line settings and technology utilized by the build engine (28 of FIG. 3). When the panel's JavaScript detects a user selection of "Define" from the panel's "Webpage" menu, it draws the appropriate pop-up window and initializes the pop-up window's values for the current web page from its database at 138. Screen shot FIG. 63 shows a visualization of one implementation of the "define the current web page settings" pop-up window and the web page settings available to the user. In the implementation shown, the choices supported include:

1: The web page delay time (which is the delay, after the completion of the last object time line, to the loading of the next web Page).
2: The transition animation, which can include a random animation choice. This is the animation applied to the web page when it is loaded and to the previous web page as it departs.
3: The number of animation frames per second, which effectively is the resolution of the transition animation.
4: The number of animation frames, which effectively defines the time expected for the transition animation to complete.
5: The web page's background color. This setting will override the generic setting for the web site, defined in FIG. 21a.
6: A web page boarder. This boarder, if selected, will also override the setting for the web site, defined in FIG. 21a. The boarder can be drawn with a 3D effect, taking the background color, and applying a transformation so that, to the human eye, a lighter and darker shade of that color will be drawn appropriately to create a 3D effect.
7: The web page's background pattern. This setting will override the generic setting for the web site, defined in FIG. 21a.

The panel's JavaScript updates its database at 139. The panel's JavaScript code then calls the appropriate build engine method, passing the necessary data and status values as function call arguments. The build engine updates its internal database and sets the necessary feature flags (See FIG. 8.). The web page time line is synchronized with its object time lines by an appropriate build engine method at 140. The web page's appearance delay and transition settings are integrated into the web page time line. Thereafter, a single-level object thread definition is created. Values are set at 141 so that when the thread object is invoked by the run time engine, the appropriate animation methods and object time line threads are called. Again, the run time technology behind web page transition animations and web page time lines is described in greater detail below in association with FIG. 31 through FIG. 35.

Figure 21A:
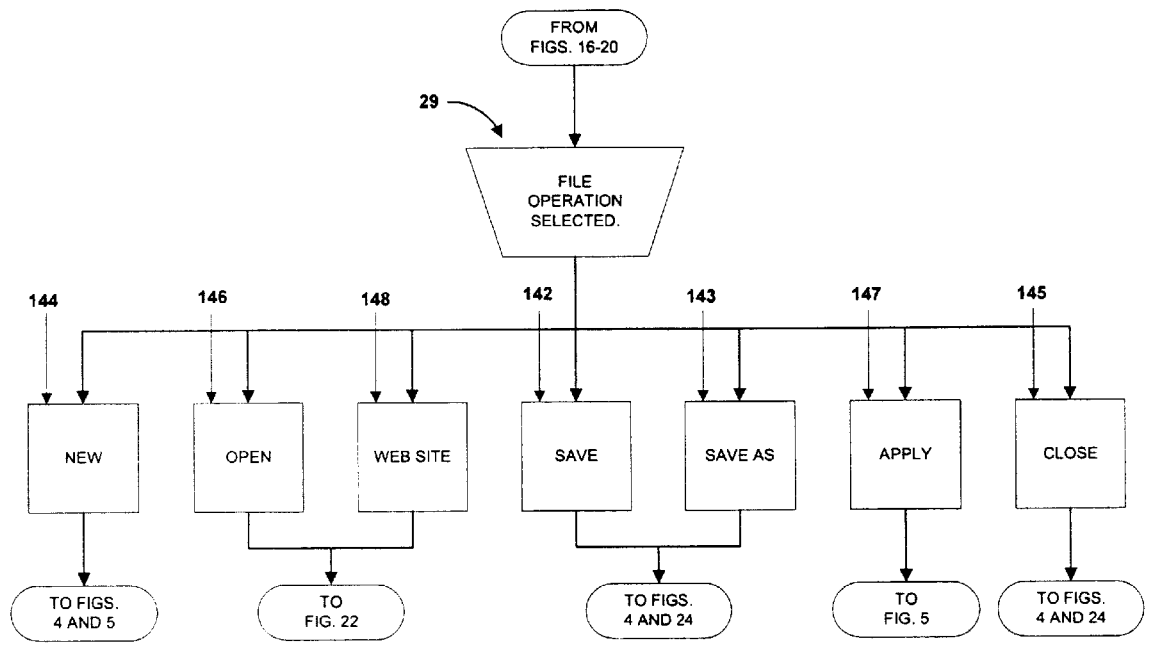
FIG. 21a is a flow chart that shows a detailed view of file operations performed in accordance with one implementation of the present invention.

FIG. 21a describes the file operations supported by the build engine (29a of FIG. 3). In one implementation, the file operations supported include:

1: "Save" at 142 or "Save As" at 143. If the selection from the panel's "File" menu is to "Save" as a web page, the current browser screen height percentage value is sent to the build engine. The build engine updates its internal database and the build process is completed. Thereafter, the run generation process is executed. (See FIG. 24 through FIG. 27.) If the selection is to "Save As" a template for the run generation process is also executed but the generated files are placed in the template directory. If the selection is to save as a banner or custom application, those absolute screen dimensions are sent to the build engine and its internal database is updated and the run generation process is executed.
2: "New" at 144. A test is made by the panel's JavaScript code to see if any user input has been processed and not saved. If so, the user is asked whether this data should be saved. If so, and if the selection is to "Save" as a web page, the build process is completed and the run generation process is executed as described above. If the selection is to "Save" as a template the run generation process is executed but the generated files are placed in the template directory as described above. The panel's JavaScript code then reinitializes its database and calls a build engine method that reinitializes the build engine database.
3: "Close" at 145. A test is made by the panel's JavaScript to see if any user input has been processed and not saved. If so, the user is asked whether this data should be saved. If so, and if the selection is to "Save As" a web page, the build process is completed and the run generation process is executed. If the selection is to "Save As" a template the run generation process is executed but the generated files are placed in the template directory. The panel's JavaScript then terminates the build process.

4: "Open" at 146. A test is made by the panel's JavaScript to see if any user input has been processed and not saved. If so, the user is asked whether this data should be saved. If so, and if the selection is to "Save As" a web Page, the build process is completed and the run generation process is executed. If the selection is to "Save As" a template the run generation process is executed but the generated files are placed in the template directory. The panel then initiates the dynamic web page resizing technology as described in FIG. 22 below for the open re-initialization mode.

5: "Apply" at 147. A template is applied to the existing web site that is being processed by the build engine. The web page and style record definitions of the template replace those of the existing web site. The web page objects of the template are added to the web page objects of the existing web site.

6: "Web Site at 148. The web designer can define settings that will be applied to all web pages in the web site. In one implementation, the web site applications supported include:
  a: web page. The web page height can be set, as a percentage, larger than the browser window for long vertically scrolled web pages.
  b: Standard banner sizes.
  c: Custom. (The user can define any arbitrary web page size and resolution) Screen shot FIG. 63 shows the generic web site setting choices presented to the user in one implementation of the invention.

Figure 21B:
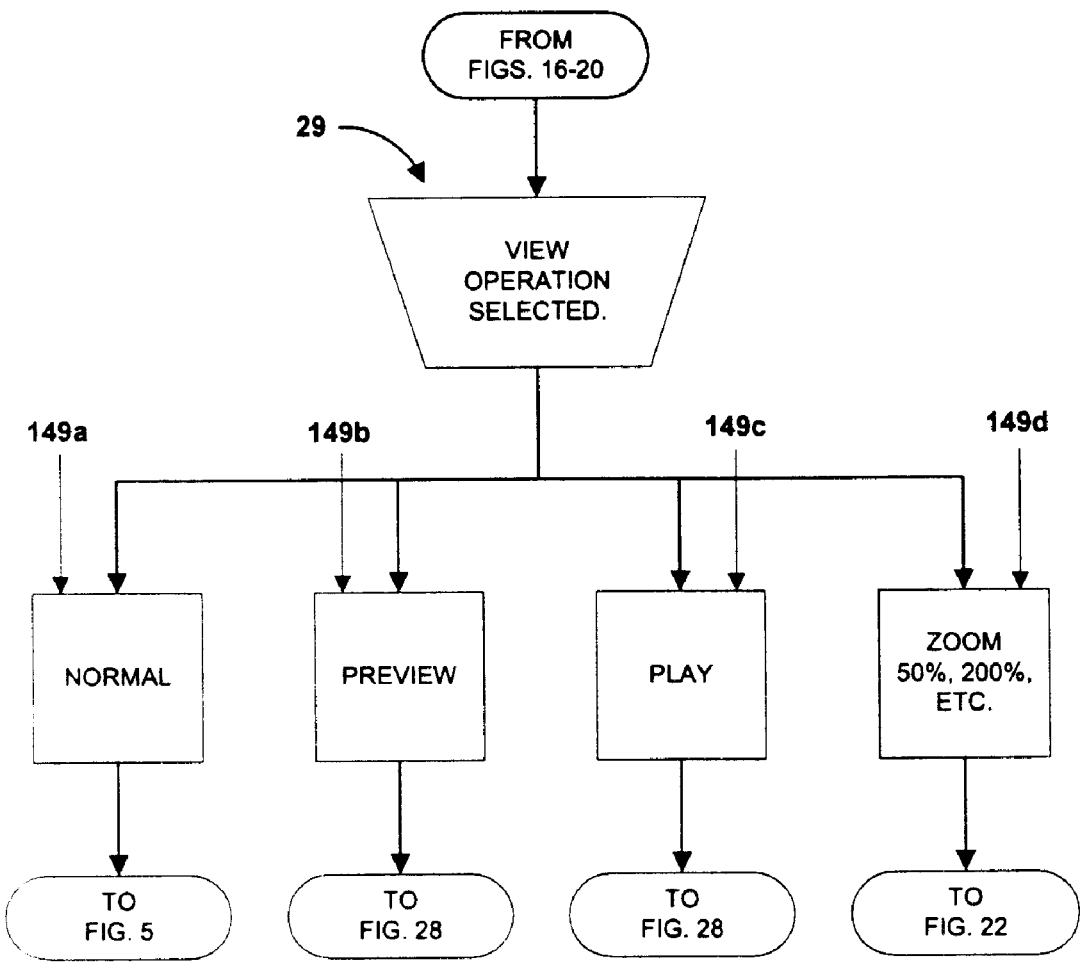
FIG. 21b is a flow chart that shows a detailed view of the view operations performed in accordance with one implementation of the present invention.

FIG. 21*b* describes the view operations supported by the build engine (29*a* of FIG. 3). In one implementation, the file operations supported include:
  1: "Normal" at 149*a*. This is the default file mode in which the interface and the build engine are processing user input as described in FIG. 5 through FIG. 23 above.
  2: "Preview" at 149*b*. The build engine runs the web site off its internal database. The web site will perform in an identical manner as if it had gone through the entire run generation and run time process, but it is being executed on the web designer's computer.
  3: "Play" at 149*c*. The build engine runs the web site off an external database in a separate browser window. The web site will perform in an identical manner as if it had gone through the entire run generation and run time process, but it is being executed on the web designer's computer.
  4: "Zoom" at 149*d*. The dynamic web page resizing technology (see FIG. 22 below) is first executed. When the engine is fully reinitialized, and the engine has gone to the current web page, the page and all its objects are drawn to the scale as defined by the zoom level. All object coordinates and sizes are automatically scaled appropriately because they are always defined with virtual screen values, even when the web page is being draw in the "normal" view.

Figure 22:
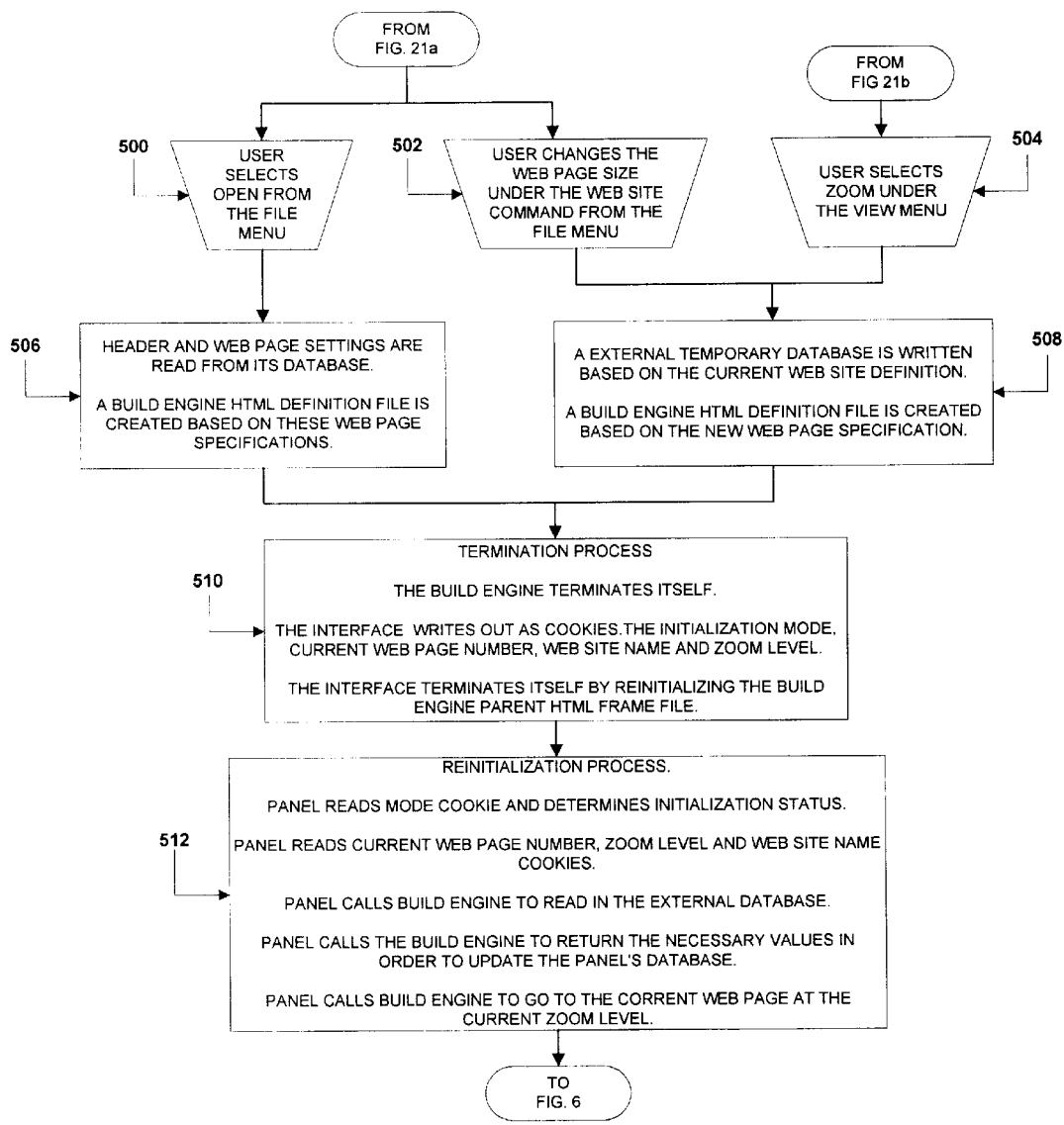
FIG. 22 is a flow chart that shows a detailed view of a dynamic web resizing process that is activated by the "Open" and "Web Site" commands under the "File" menu and the "Zoom" command under the "View" menu.

FIG. 22 describes the dynamic web page resizing technology supported by the build engine. If a user selection of the "Open" command from the "File" menu is detected by the panel at 500, the panel calls an engine method to read selected contents from that web site's external database file.

In one implementation of the invention at 506, the engine reads the web page width and length fields, as well as the background color or background image definition for the first web page of the Web Site. The engine then creates a build engine HTML definition file based on these specifications, and writes this file either to the local disk or the server, depending upon the origination of the build tool.

At 502, if a user completion event occurs inside the web site JavaScript pop-up window, which had been activated when the user selected the "Web Site" command from the "File" menu, the panel determines if the web site page size has been changed. If so, the panel calls an engine method for processing.

Similarly, at 504, if a user selection of a "Zoom" command from the "View" menu is detected by the panel at 504, the panel also calls an engine for processing.

Figure 24:
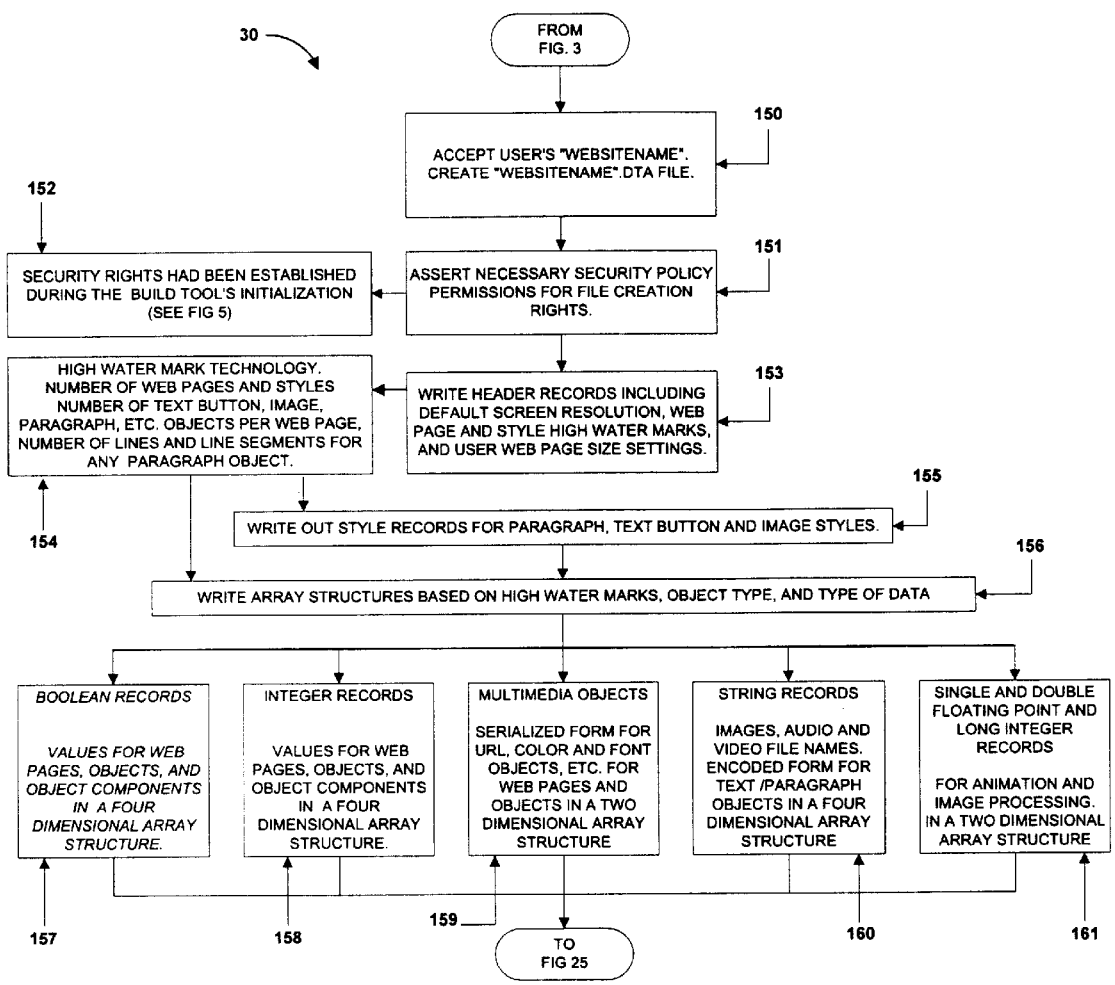
FIG. 24 is a flow chart showing a detailed view of an external database in accordance with one implementation of the present invention and also shows the security and optimization techniques that can be employed.

In both the cases at 502 or 504, in one implementation of the invention, the engine writes out a checkpoint record at 508 that is similar to that of a "Websitename".dta "database file (See FIG. 24). But is given the temporary checkpoint Websitename. The engine then creates a build engine HTML definition file based on these specifications, and writes this file either to the local disk or the server, depending upon the origination of the build tool.

In one implementation of the invention at 510 the engine terminates itself, by stopping all of its threads. Meanwhile the interface writes out four cookies onto the local disk which define the following:
  1: The re-initialization mode. (Either Open or Checkpoint).
  2: The current web page number when the resizing event occurred.
  3: The Web Site Name. (The checkpoint name if in checkpoint mode)
  4: The zoom level.

The interface then terminates itself by executing the JavaScript "parent.location.href" command, which causes the build engine parent HTML frame file (PFF) to be reloaded (See FIG. 5).

In one implementation of the invention at 512 the re-initialization process begins. The PFF cause both the panel and the build engine to be reloaded and activated. The panel then reads the mode cookie. If the mode is either open or checkpoint, the interface reads the web site name, page number and zoom level cookies, then resets the mode cookie to the initialize state for subsequent operations. The interface then calls an engine method to read the external database, and then to return the necessary values from that database in order to update the interface's database. Finally the engine calls two engine methods in order for the engine to go to the correct current web page and draw that page at the now current zoom level. Normal processing can then resume.

Run Generation Process

FIG. 24 through FIG. 27 describe the run generation process. This process starts when the build process detects that the user is finished defining the web site (user has saved the web site and invokes the run generation process), and concludes with the actual uploading of all the necessary web site run time files to the user's server.

FIG. 24 describes the techniques employed by the build engine for the creation of the external database, and the security and optimization techniques that support this process (30 of FIG. 4).

When the panel's JavaScript Code detects a user selection of "Save" or "Save As" from the panel's "File" menu, it draws the appropriate pop-up window and initializes the pop-up window's values for the current web page size as had been defined at FIG. 5 and passed to the build engine. The panel's JavaScript in the "save the web page/template" pop-up window detects a user completion event at 150 (i.e., the designation of a user's web site name followed by the enter key), and calls the appropriate panel JavaScript function. More specifically, after completing the appropriate validity checks, the function calls the appropriate JAVA build engine method, passing as a function call argument the user defined "Websitename". The build engine method checks for the existence of a "Websitename".dta file, and, if so, posts that result into a poll-enabled method return value. The poller checks that value, and if set to true, calls a JavaScript function which draws a pop-up window asking the user to confirm whether the existing web site definition should be overwritten or not. This JavaScript function also calls an appropriate build engine method to reset the return value to false in order to be initialized for the next possible "Save" operation.

Once this verification process is completed the build engine begins the external database creation process at 151, which will vary depending upon the security manager of a given browser at 152. See FIG. 5 for a detailed description of the browser security manager alternatives. If the browser's security manager allows for local disk file creation, the build engine calls a method, which asserts the necessary security policy permissions to create and write a file. If not, the build engine calls the necessary method to create and write a file on the user's server.

The external database contains, as its first record, a "Header" record, which contains can include the following information:

1: A file format version number, used for upgrading database in future releases.
2: The default screen resolution, in virtual pixels, for both the screen width and height. This is usually set to the web designer's screen resolution, unless overwritten by the user at FIG. 5.
3: Whether the application is a web site.
4: Virtual web page size settings. A calculation is performed by the build engine method, in order to calculate what the maximum web page length is, after reformatting all paragraphs on all internal web pages, based on the default screen resolution.
5: Web page and styles high watermarks.
6: The Websitename.

The header records are written at step 153.

During the build process, as new web pages or new objects are created by the user, or as text is added to or deleted from a paragraph, or as new styles are created or deleted, appropriate high watermarks are set, in order to show the current number of each of these entities. Thus, at 154, the values for the number of active web pages and the number of text button, image, paragraph or other styles are written as high watermarks in the header. The high watermarks for the number of text button, image, paragraph or other objects that exist for each web page, the number of lines for each paragraph object, and the number of line segments for each paragraph line are written within the body of the external database as described at 156, and used as settings for each of the loops in the four-dimensional data structure. Because no structural limits are set on the number of web pages, objects per web page, styles, or paragraph size, these high watermarks greatly reduce the external database file size, and the time it takes for the run time engine to process the data stored in its database.

The settings for all paragraph, text button and image styles are then written as a style record at 155 based on their high watermark. This data includes Boolean and integer variables, and font and color objects, written as a one-dimensional array, based on the high watermark values for the number of styles that exist. The font and color objects are serialized as is discussed in greater detail below (See 159 below).

The body of the external database is then written at 156. All Boolean values are written inside a four-dimensional loop at 157. The outside loop contains the Boolean values used to define web pages (i.e. a one-dimensional array definition) as well as the high watermarks for the number of text button, image, paragraph or other objects per web page, with the loop set at the high watermark which defines the number of existing web pages for this web site structure. The second level consists of three or more two dimensional loops with the loops set to the high watermarks defining the actual number of text button, image, and paragraph or other objects that appear on any given web page and contains the values used to define web page objects ((i.e. a two-dimensional array definition; web page number by object number). Included within the loop for paragraph objects are the high watermarks for the number of lines for each paragraph object. The third loop is set by the high watermark defining the actual number of paragraph lines that for all paragraphs on any web page and contains the values used to define paragraph lines (i.e. a three-dimensional array definition; web page number by object number by paragraph line.) Included within the loop for paragraph lines are the high watermarks for the number of line segments for each paragraph line. The inner most loop is set by the high watermarks defining the number of line segments per paragraph line and contains the values used to define paragraph line segments (i.e. a four-dimensional array definition; web page number by object number by paragraph line by paragraph line segment.).

All integer values are written inside a four-dimensional loop at 158. Their four loops are controlled by the same high watermark settings as used for the Boolean records, and they describe the same logical entities.

Multimedia objects are written inside a two-dimensional loop at 159. They include URL, color, and font objects, and can include other types of objects. A URL object is the encoded form of a URL Address, used by a browser or a JAVA method to access files and web addresses. All multimedia objects must be serialized before they can be written. This means that the objects are converted into a common external definition format that can be understood by the appropriate deserialization technique when they are read back in and cast into their original object structure. The outside loop contains web page related objects, and the inner loop contains image, text button, paragraph, etc. related URL, color, and font objects. The outer loop is defined by the web page high watermark and the inner loops by the high watermarks for the actual number of text button, image, paragraph or other objects on a web page.

String records are written inside a four-dimensional loop at 160. The outer loop may be empty. The second loop can include the string values for text button objects, audio and video filenames, and audio and video channel names. The third loop contains values for paragraph line related data, and the innermost loop contains the values for paragraph line segment definitions. The string records are controlled by the same high watermarks as those used for Boolean and integer records. String records are stored utilizing an appropriate field delimiter technology. In one implementation, a UTF encoding technology that is supported by JAVA is utilized.

Single and double floating-point, and long integer records are written inside a two-dimensional loop at 161. The outer loop may be empty. The inner loop contains mathematical values required for certain animations and image processing algorithms. The single and double floating-point, and long integer records are controlled by the same high watermarks as those used for Boolean and integer records.

Figure 25:
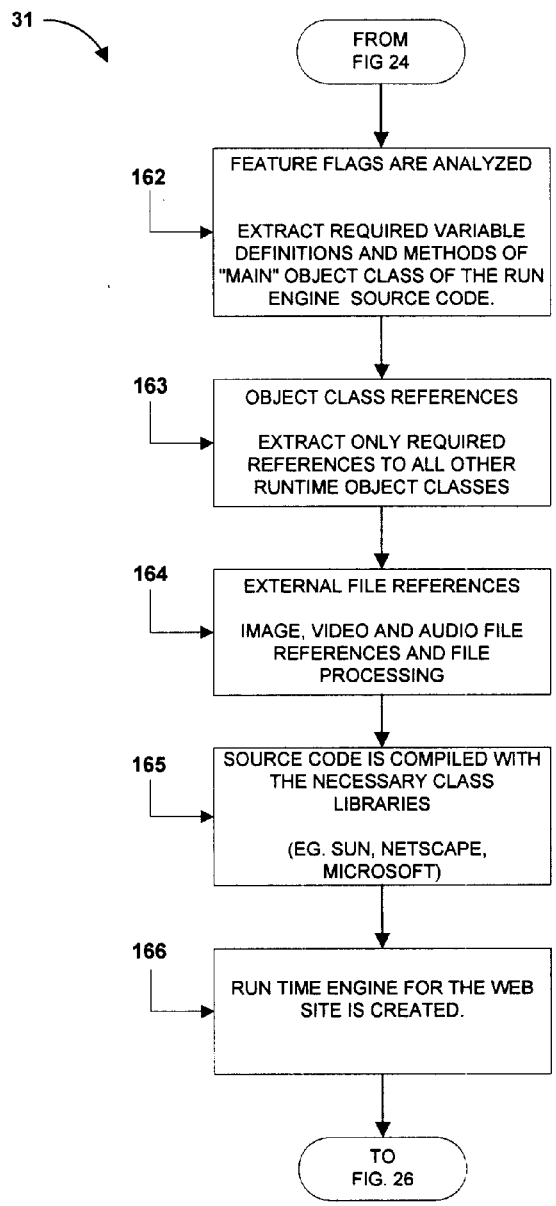
FIG. 25 is a flow chart showing a detailed view of a method for creating a customized and optimized run time engine in accordance with one implementation of the present invention.

FIG. 25 describes the techniques used to create a customized and optimized run time engine by the build engine (31 of FIG. 4). A versionizing program analyzes the feature flags, and only those variable definitions, defined in the "Main" object class, relating to the object classes and methods that will be executed at run time, are extracted at 162. All references to object classes that will be called at run time are extracted, creating the source code for the run engine "Main" object class that is ready for compilation at 163.

All external image, video and audio files are resolved at 164. The external references can be copied to designated directories at 164, either on the user's local disk or file server. The file Pathnames can be changed to reflect these new locations. During the installation of the build tools, the necessary class libraries from Sun, Microsoft and Netscape are either installed on the local system (See FIG. 5) or made available on the server where the build tools can be optionally located. The necessary environmental variables are set to permit normal access to the required class libraries.

The customized run engine and a library of the referenced run time classes are compiled and converted into byte code at 165. Finally, the run time engine for the web site is created at 166. The required set of class objects required at run time is flagged for inclusion into the CAB/JAR file (See FIG. 27).

Figure 26:
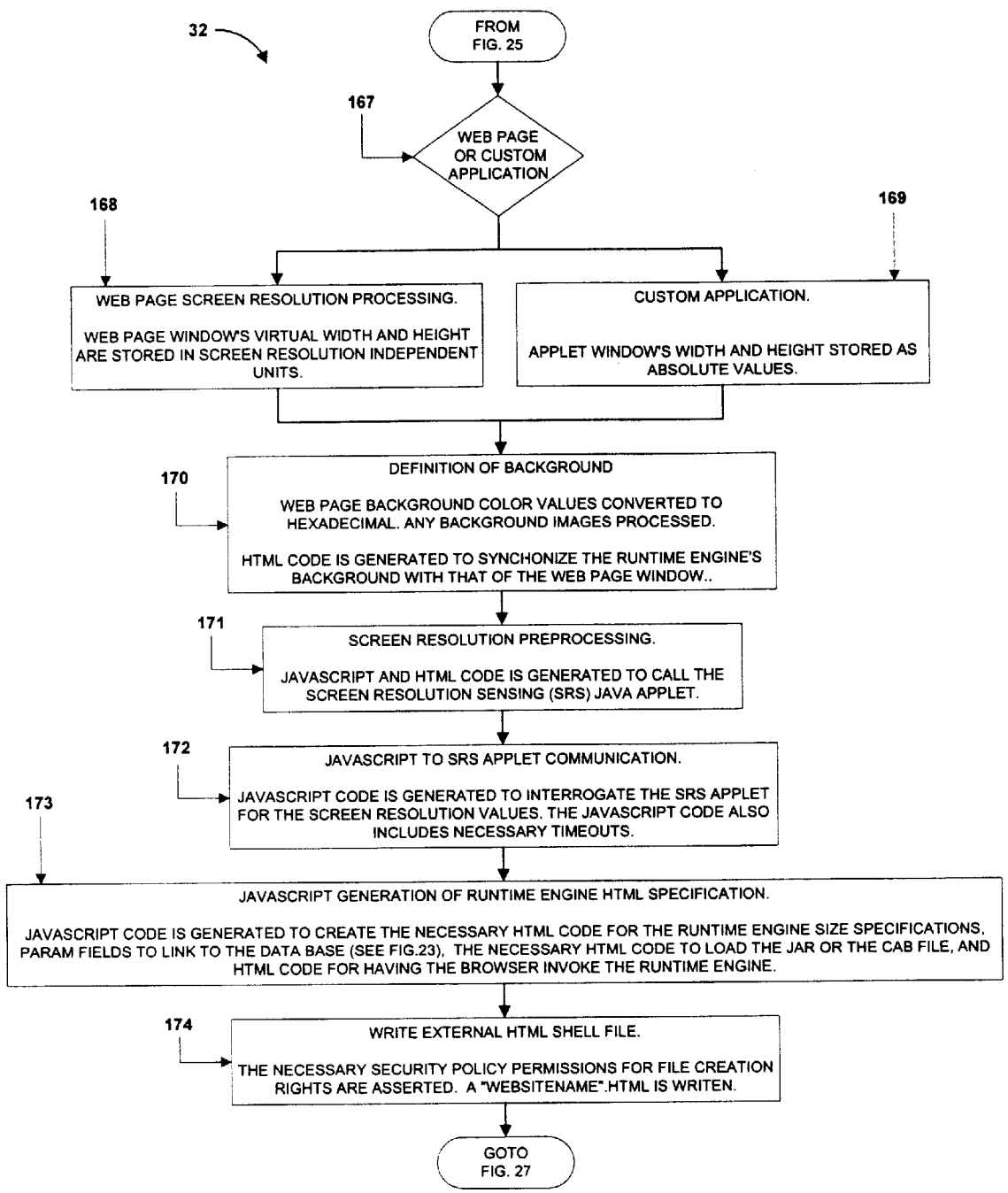
FIG. 26 is a flow chart showing a detailed view of the methods for creating an HTML shell file in accordance with one implementation of the present invention.

FIG. 26 shows the techniques used to create the HTML Shell File (HSF) (32 of FIG. 4). The first step of the process at 167 is to determine whether the dynamic web page and object resizing is desired by testing the application setting, set by the user at FIG. 21*a*, or possibly reset at FIG. 24. If the application was a web page, and thus requiring dynamic web page and object resizing, virtual screen resolution settings, calculated at FIG. 24 at 153, are placed in an appropriate HTML compliant string at 168. If the application is a banner or other customized application, the absolute values for the run time object (applet size) height and width are placed in an appropriate HTML compliant string as absolute width and height values at 169.

An analysis is made for the background definition for the first internal web page at 170. If a background pattern is defined, an appropriate HTML compliant string for setting the HTML "background" to the same background image is generated. If the first web page definition is a color instead, then the RGB values from those colors are converted to hexadecimal and an appropriate HTML compliant String is generated setting the "bgcolor" to the required hexadecimal value. This process synchronizes the web page background with the background that will be drawn by the browser when it first interprets the HSF.

Thereafter, a JAVA method generates HTML and JavaScript compliant strings, that when executed by a browser, generate additional sets of HTML and JavaScript compliant strings that are again executed by the browser. More specifically, if the application required dynamic web page and object resizing (See 167) then JavaScript and HTML compliant strings are generated at 171 so that, when interpreted by the browser at the time the HTML Shell File is initialized, the screen resolution sensing JAVA applet (SRS) will be executed. JavaScript code is generated at 172 in order to enable JavaScript to SRS applet communication. In one implementation, the code is generated by performing the following functions:

1: Determine the current browser type.
2: Load the SRS from either a JAR or CAB File, based on browser type.
3: Enter a timing loop, interrogating when the SRS is loaded.
4: When the SRS returns an "available" status, interrogate the SRS, which will return the current screen and window's actual height and width.
5: Convert the virtual screen resolution settings into appropriate absolute screen width and height values.

Strings defining additional JavaScript code are generated at 173 that perform the following steps at the time the HSF is initialized by the browser:

1: Generate HTML compliant strings that set the run time engine's applet size to the appropriate values.
2: Generate an HTML complaint string that contains a "param" definition for linking the run time engine to the External Database created at FIG 24.
3: Generate an HTML complaint string, dependent upon the type of browser, which causes the current browser to load either the JAR or the CAB File(s).
4: Generate JavaScript Code compliant strings that create and dynamically write the applet size defining HTML strings utilizing the JavaScript "document.write" function. This dynamically created code causes the browser to execute the run time engine, in the correctly sized window, from the correct JAR or CAB file, and linked to the external database.

At 174, writing out the above-generated HTML and JavaScript compliant strings creates the HSF. The necessary security policy permissions are asserted, and a "Websitename".html file is created.

Figure 27:
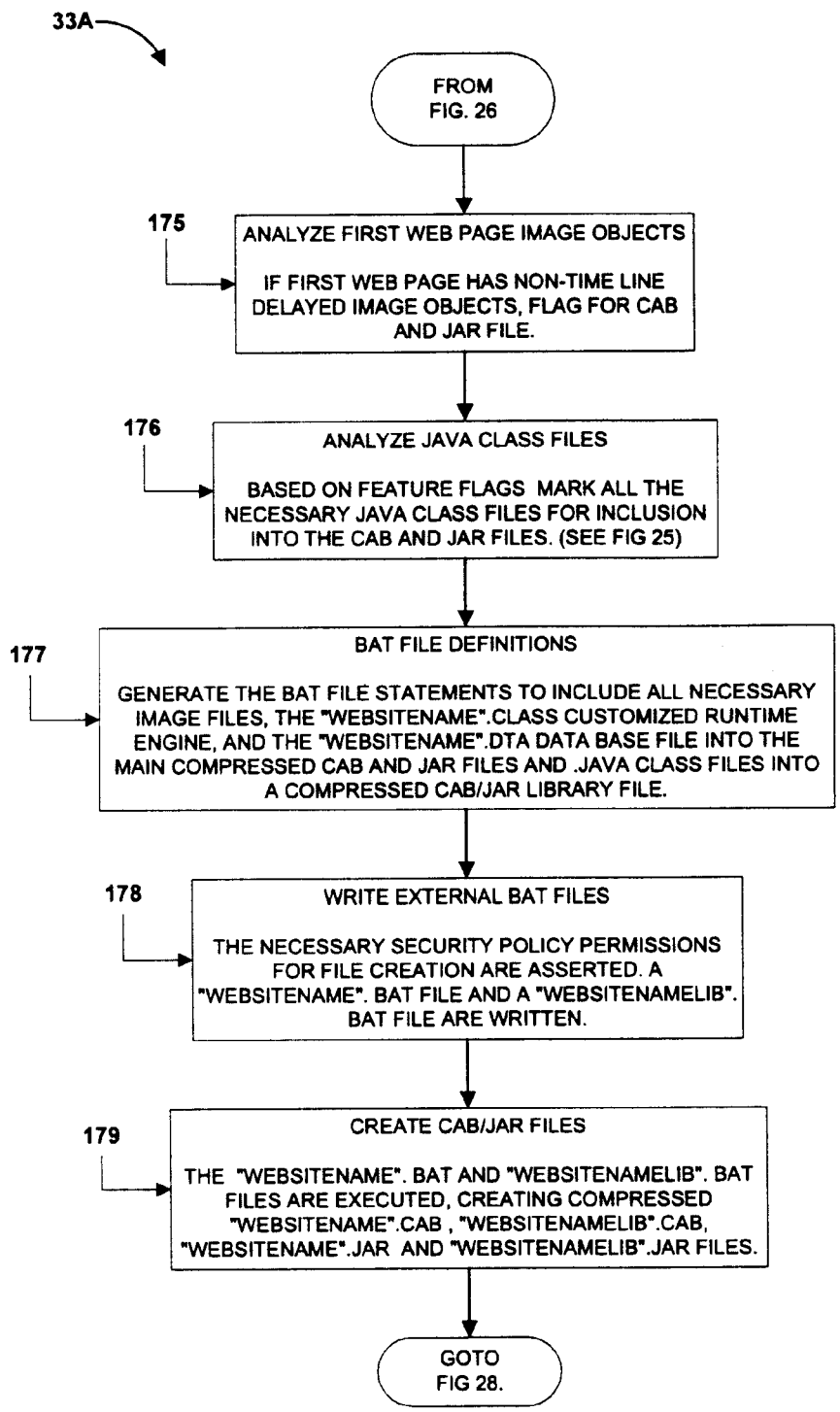
FIG. 27 is a flow chart showing a detailed view of the methods for creating compressed CAB and JAR files in accordance with one implementation of the present invention.

FIG. 27 describes the processes for creating the CAB and JAR Files (33*a* of FIG. 4). The image objects, if any, which were defined on the first internal web page are analyzed at 175. If they are set to draw immediately upon the loading of the first web page, then they are flagged for compression and inclusion in the CAB and JAR Files. The feature flags are analyzed at 176 to determine which JAVA classes have been compiled (See FIG. 25). These class files are flagged for compression and inclusion in the library CAB and JAR Files. Strings that are BAT compliant definitions are created at 177 that will, when executed in DOS, create compressed CAB and JAR Files. These CAB and JAR Files contain the compressed versions of all necessary JAVA class files, image files, the "Websitename".class, customized run time engine file, and the "Websitename".dta database file. In one implementation of the invention, two BAT files are created. The first, when executed, will create a CAB/JAR file with the "Websitename".dta database file and the customized "main" run time engine, excluding all the image and button object animation, transformation, and image processing code. The second BAT file, when executed, will create a CAB/JAR file with all the library of all the referenced image and button object animation, transformation, and image processing code.

The necessary security policy permissions for file creation are then asserted, and "Websitename".bat and "Websitenamelib".bat files are written at 178. The "Websitename".bat and "Websitename".bat files are then executed under DOS, creating compressed "Websitename".cab and "Websitenamelib".cab files and compressed "Websitename".jar and "Websitenamelib".jar files at 179. The HTML Shell File and the JAR and CAB files are then, either as an automatic process, or manually, uploaded to the user's web site. This completes the run generation processes.

Run Time Process

The run time process is shown in FIG. 28 through FIG. 36.

Figure 28:
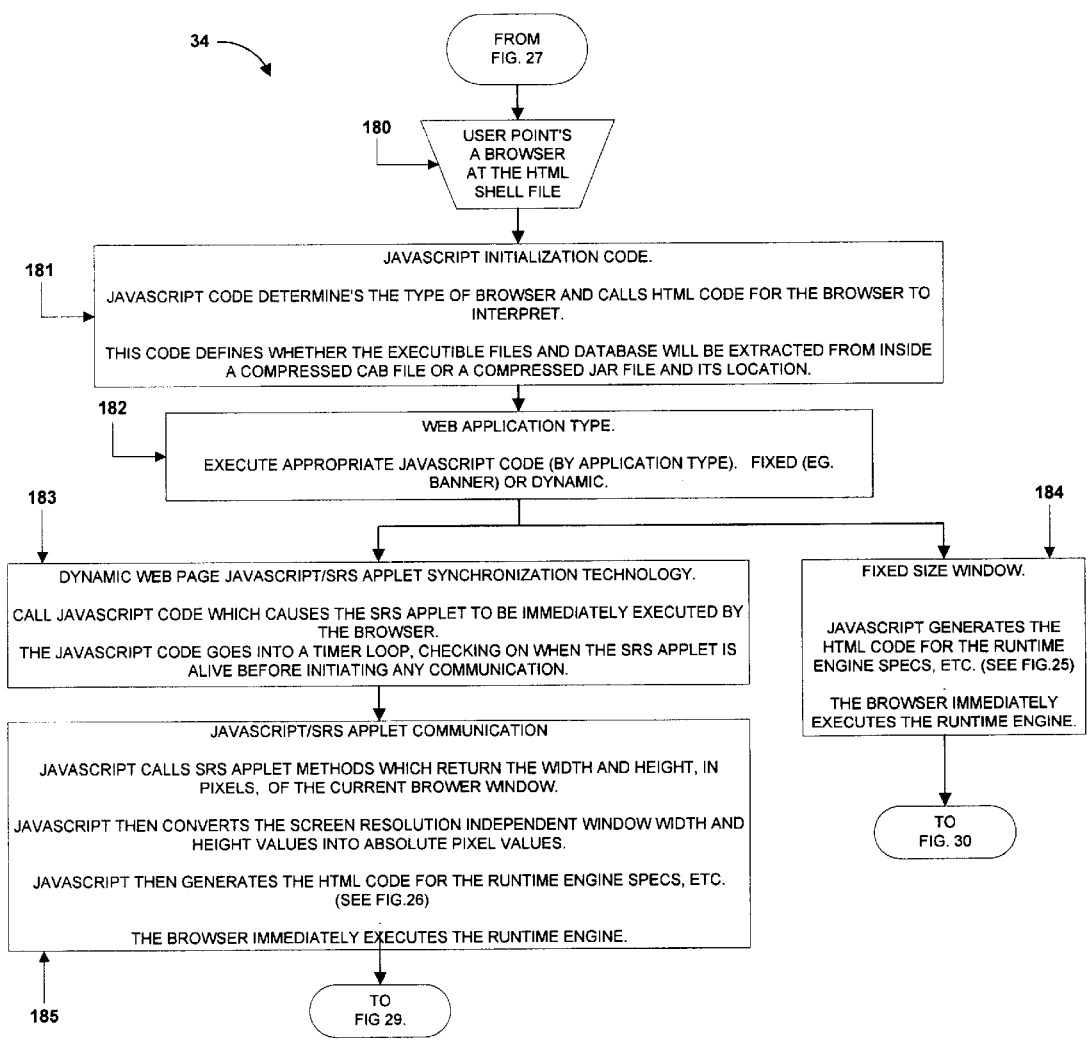
FIG. 28 is a flow chart showing a detailed view of the technology for dynamic web page size creation in accordance with one implementation of the present invention.

FIG. 28 shows the web page size generation technology utilized by the run time engine. A web surfer points a browser at the HTML shell file (HSF) at 180. The browser begins to interpret the HTML and JavaScript code in the HSF that was created (See FIG. 26). The browser draws either the background color or background image pattern, as defined by the HTML complaint code (See FIG. 26) at 170. The browser then executes the HSF's JavaScript initialization code, which "sniffs" the current browser at 181 to determine its type, and then generates the appropriate HTML code for that particular browser to interpret. This code defines whether the executable files and database will be extracted from inside a compressed CAB file or a compressed JAR file and its location.

Based on the user application (defined at FIG. 21a, or possibly reset at FIG. 24), the HSF at 182 will then execute an appropriate JavaScript function (as created in FIG. 26 at 167). If the application required dynamic resizing of the web page's dimensions, JavaScript code is called which generates HTML code using the JavaScript "document.write" function, which causes the SRS applet to be immediately executed by the browser at 183. The JavaScript code then goes into a timer loop, checking on when the SRS applet is alive before initiating any communication. After detecting that the SRS has been initialized, a JavaScript function calls the appropriate SRS applet methods at 185, which return the width and height, in pixels, of the current browser window. JavaScript Code is then called which converts the screen resolution independent window width and height values into absolute pixel values. A JavaScript function is then called which use the JavaScript "document.write" function to generate HTML code that define the run time engine specifications, etc. (see FIG. 26) and cause the browser to immediately execute the run time engine. If the application had not required dynamic resizing of the web page's dimensions, then a JavaScript function is called which generates HTML code using the JavaScript "document-.write" function that defines the fixed dimensions for the web page size and cause the browser to immediately execute the run time engine at 184.

Figure 29:
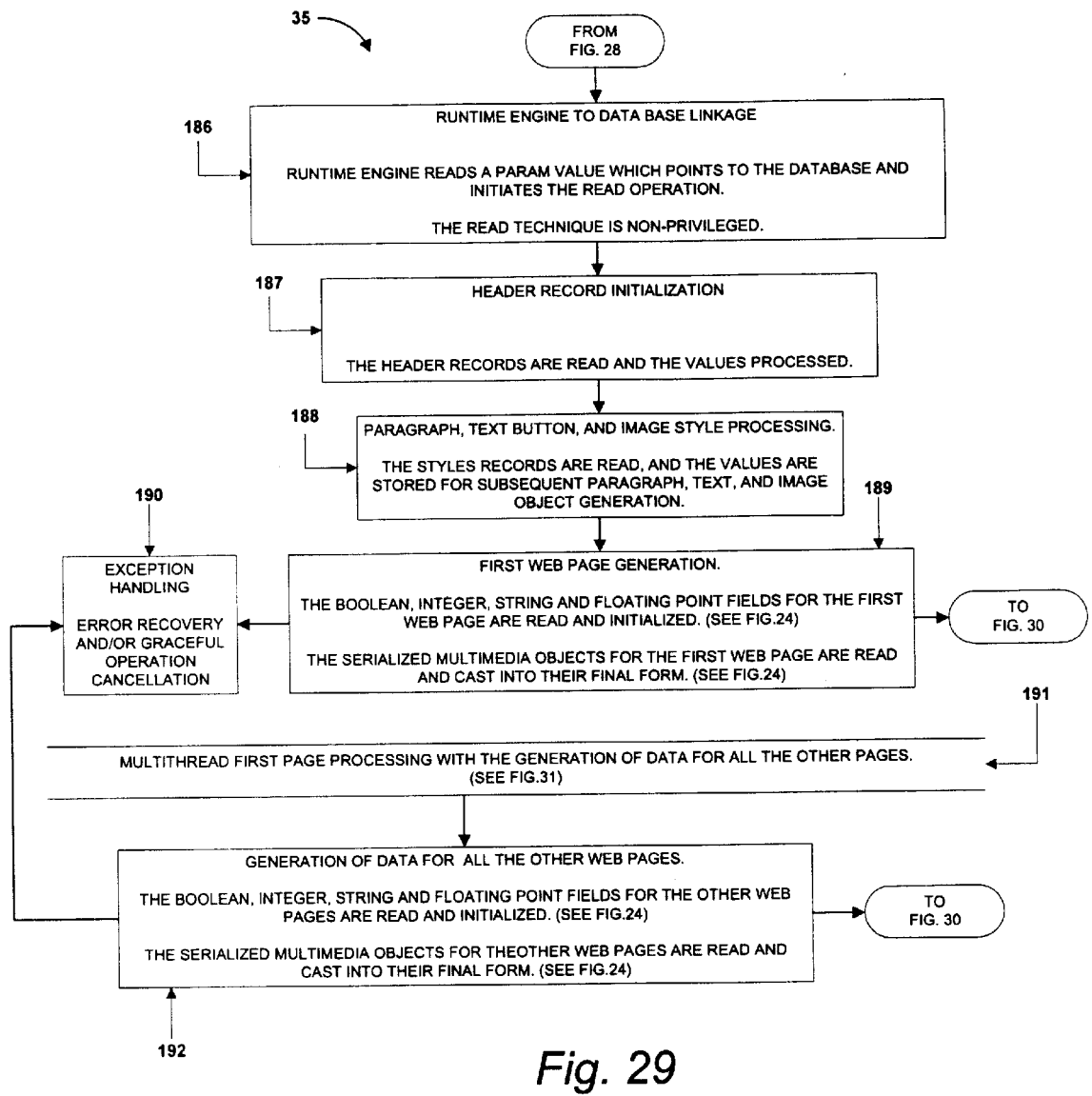
FIG. 29 is a flow chart showing a detailed view of the methods for reading the multimedia database and generating the necessary objects in accordance with one implementation of the present invention.

FIG. 29 shows the techniques employed by the run time engine to read the external database and to generate the necessary web page objects (35 of FIG. 4). The run time engine reads a "PARAM" value at 186, from HTML Code that was generated above (see FIG. 26), which points to the "Websitename".dta external database that is compressed into the JAR or CAB File (that was loaded and accessed in FIG. 28). The run time engine then initiates the read operation. In one implementation, the read technique is always non-privileged. If permitted by the current browser as a non-privileged operation, the "Websitename".dta file will be extracted and read from the CAB/JAR file residing in temporary local storage. If not, the run time engine will read the "Websitename". dta file directly from the server. The header record is read at 187. Any objects, such as fonts and colors, are cast into their original form. The high watermark values, as they are encountered in the header and in the body of the database, are immediately used for setting the limits for the subsequent multilevel read loops for reading in the style record and the web page(s) and object(s) definitions. The virtual screen resolution values are read for the subsequent dynamic resizing of the web page objects.

The style record is read based on its high watermarks, and processed at 188. The definitions for all paragraph, text button, image or other styles are read and stored for subsequent initialization and processing of all paragraph, text button, image or other objects. The data representing the values for the first web page and all its objects is read at 189. The Boolean, integer, string and floating point fields for the first web page are initialized. The serialized multimedia objects for the first web page are read and cast into their final form. (See FIG. 24)

If external files, such as image, audio and video files, must be read as part of the first web page's generation, exception handling routines are executed at 190, as necessary, in the event of any processing errors. In one implementation, error recovery at this stage places the highest priority on a graceful operation cancellation, rather than a web page crash. In the worst case, a particular image, sound or video file may not be available to the web surfer. All other aspects of the web page will likely be available even in this error scenario.

Process step 191 is executed simultaneously with the generation of all the other web pages at 192 by means of multiprogramming utilizing thread technology. Thus the first web page will be drawn and active for user viewing and user interaction long before the data for all the other web pages have been read, processed, and initialized. The data representing the values for the subsequent web pages and all their objects are read at 192. The Boolean, integer, string and floating point fields for these web pages are initialized. The serialized multimedia objects for these web pages are read and cast into their final form. (See FIG. 24)

Figure 30:
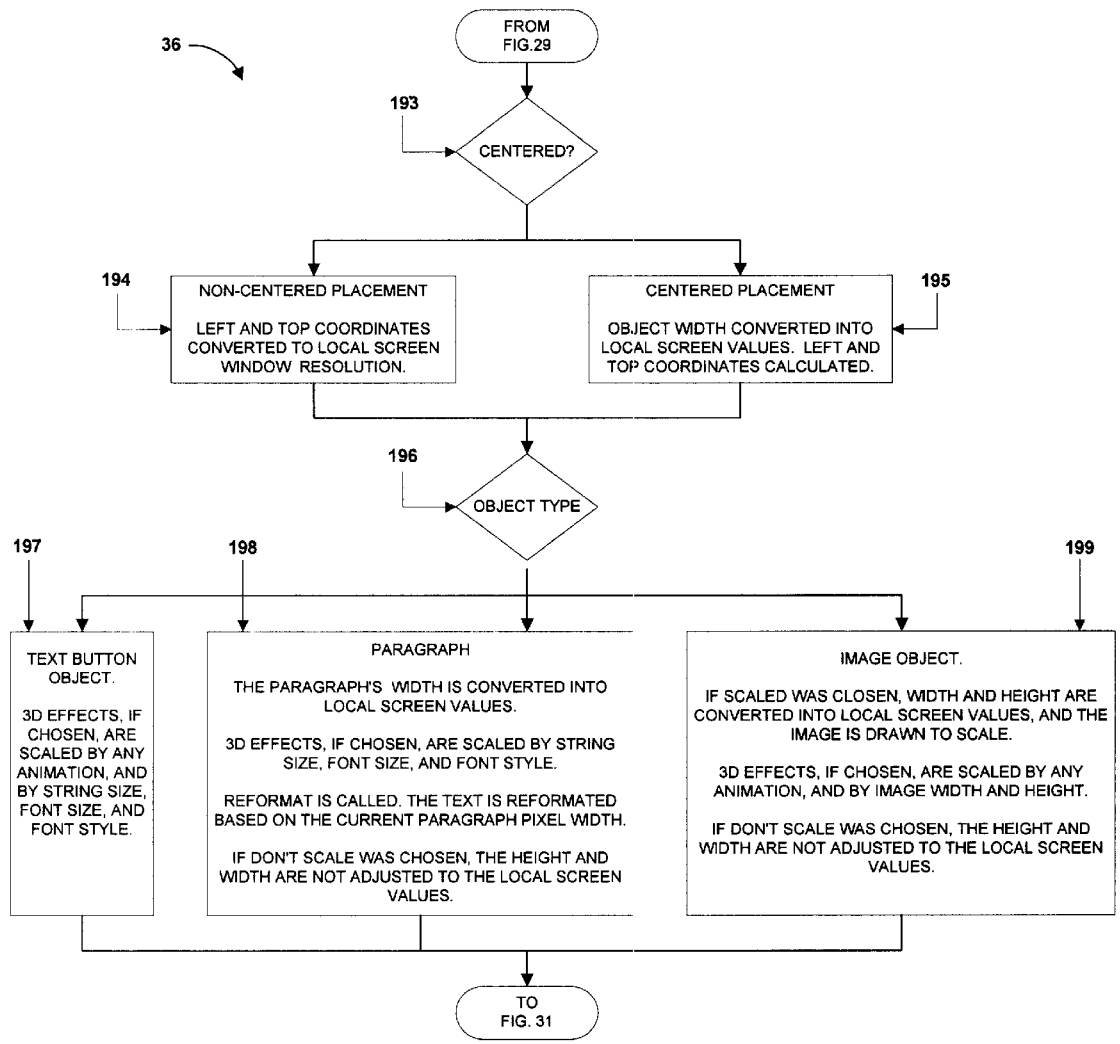
FIG. 30 is a flow chart showing a detailed view of the methods for dynamically scaling the web page object(s) to different screen resolutions and window sizes in accordance with one implementation of the present invention.

FIG. 30 shows the scaling techniques employed by the run time engine for web page generation (36 of FIG. 4). The first step in the scaling process is to calculate the coordinates that define the origin for the placement of each object for a given web page. (This is usually the upper left corner of the object, defined in actual screen pixels.) A test is made at 193 to determine if the centering attribute is set for the object. If not, the left and top coordinates are converted from the virtual screen values to the local screen values, based on the local screen window resolution at 194. In one implementation, multiplying the virtual coordinate by the local screen window resolution and dividing by the virtual screen resolution determine the conversion.

If the centering attribute is on, then a calculation for the object's width is performed. See processes 197, 198, and 199 below for a description of this calculation. Based on this calculated width, and based on the local screen window resolution, the left coordinate is calculated at 195. One algorithm that can be used is to subtract the screen width, as calculated in 197–199 below, from the local screen window resolution, and divide that result by 2. The top coordinate is calculated the same as in process 194 above.

Based on the object type, determined at 196, a different scaling technology is employed. If the object is a text button object at 197, the text button object itself, including its background, is not scaled. The virtual width and the local screen width remain the same. However, if a 3D Frame effect is defined, it is scaled based on the following algorithm: if the text string's orientation is Left to Right, the inner width of the 3D Frame, and its placement relative to the text string, is calculated as the length of the text string, plus ⅛ of an "n" space on each side, plus an additional offset appended to the right of the inner width to compensate for the italic font style, if defined for the font of that text string. The italic offset can be defined as the font size for the text string, divided by 10, plus 1. The inner height of the 3D Frame can be defined as the font height plus 2 pixels. The font height equals the font's leading plus its ascent plus its descent specifications. The inner height origin can equal the text string origin. The style of the 3D effect (i.e., either a 3D raised look or a 3D depressed look), plus the inner width and height, is sent to a 3D frame build method for the construction of the 3D frame. The width of the 3D frame in pixels can be calculated as the inner width divided by 10 plus 3.

If the text string's orientation is vertical, the inner width of the 3D Frame is an "m" space. The inner height of the 3D Frame can be calculated as the font height times the number of characters in the text string. Both the left and top placement of the 3D frame can be set to the left and top origin of the text string. The width of the 3D Frame can then be calculated as the inner height divided by 10, plus 3.

If an animation is assigned to the text string, the font size used for the initial calculation of the 3D frame is the same as that used to define the animation's initialization value. If the object is a paragraph at 198, and the scaling attribute is on, the maximum width for the paragraph can be defined by the attached paragraph style (or paragraph override) as a percentage of the screen width. This screen width percentage can be converted into an actual width in pixels, based on the local screen's window resolution. If the current screen resolution is the same as that used by the web designer, then the paragraph line end values (just read from the external database) are used without adjustment, bypassing the entire paragraph reformat process. If the current screen resolution is different than that of the virtual screen resolution, then a very compact method of reformat is called (relative to the build engine reformat methods at FIG. 6 and at FIG. 18), and the text for the paragraph is reformatted based on this width.

The run time engine's reformat technology begins by creating one paragraph line for the entire text string assigned to the paragraph text area. All the style overrides are renumbered sequentially with the style records or the non-marked text strings ignored. A simplified "Overflow" reformat method can be called, which chops up the single paragraph line first into paragraph line segments, where each word is defined as a line segment. Because of the word oriented style override architecture, the style overrides have a one-for-one correspondence with the line segments. Each paragraph line break can be calculated by relying on the simplified word oriented style override technology described above. The paragraph line can be built inside a tight word-by-word loop, with a simple logic check for a style override or hard line break. The paragraph width is then derived as the width of the longest line of the reformatted paragraph, while the paragraph height is defined as the font height times the number of lines. If a 3D frame was defined for the paragraph, it can be scaled based on the following algorithm:

The inner width is defined as the same as that of a text string, but the width of the text string for the longest line is used. The same "n" space and italic offset calculations are used. The inner height is calculated as the font height times the number of lines plus 2 pixels.

If the object is a paragraph, and the scaling attribute is off, then the paragraph is treated the same as a text button object, with the only exceptions that there is no vertical orientation, and the height and width of the 3D frame, if defined, is calculated using the same algorithm as was used for the scaled paragraph above.

If the object is an image at 199, and the scaling attribute is on, the image width can be calculated as the virtual width times the local screen window width divided by the virtual screen width. The image height can be calculated as the virtual height times the local screen widow height divided by the virtual screen height. If the image had been resized or rotated, then the virtual width and height of the image would differ from that of that of the original image. If a 3D frame is defined for the image, it can be scaled based on the following algorithm:

The inner width and the inner height of the 3D frame will coincide exactly with the outer edges of the image, after the image had been scaled. Adding the scaled image height to the scaled image width and dividing the result by 40 and adding 3 can calculate the width in pixels of the 3D frame.

If an animation is assigned to the image, then the animation's initialization values for the image's width and height can be used to calculate and draw the initial 3D frame. The coordinates and sizes for the backgrounds for text button, image and paragraph objects can be calculated using the same algorithms as was employed for the calculation and placement of the inner width and inner height for the 3d frame for each object.

FIG. 31 through FIG. 35 shows the multilevel web page and object thread technology employed by the run time engine. The description includes all the animation technologies, transformation technologies, time line technologies and drawing technologies that support this multi-level architecture.

Figure 31:
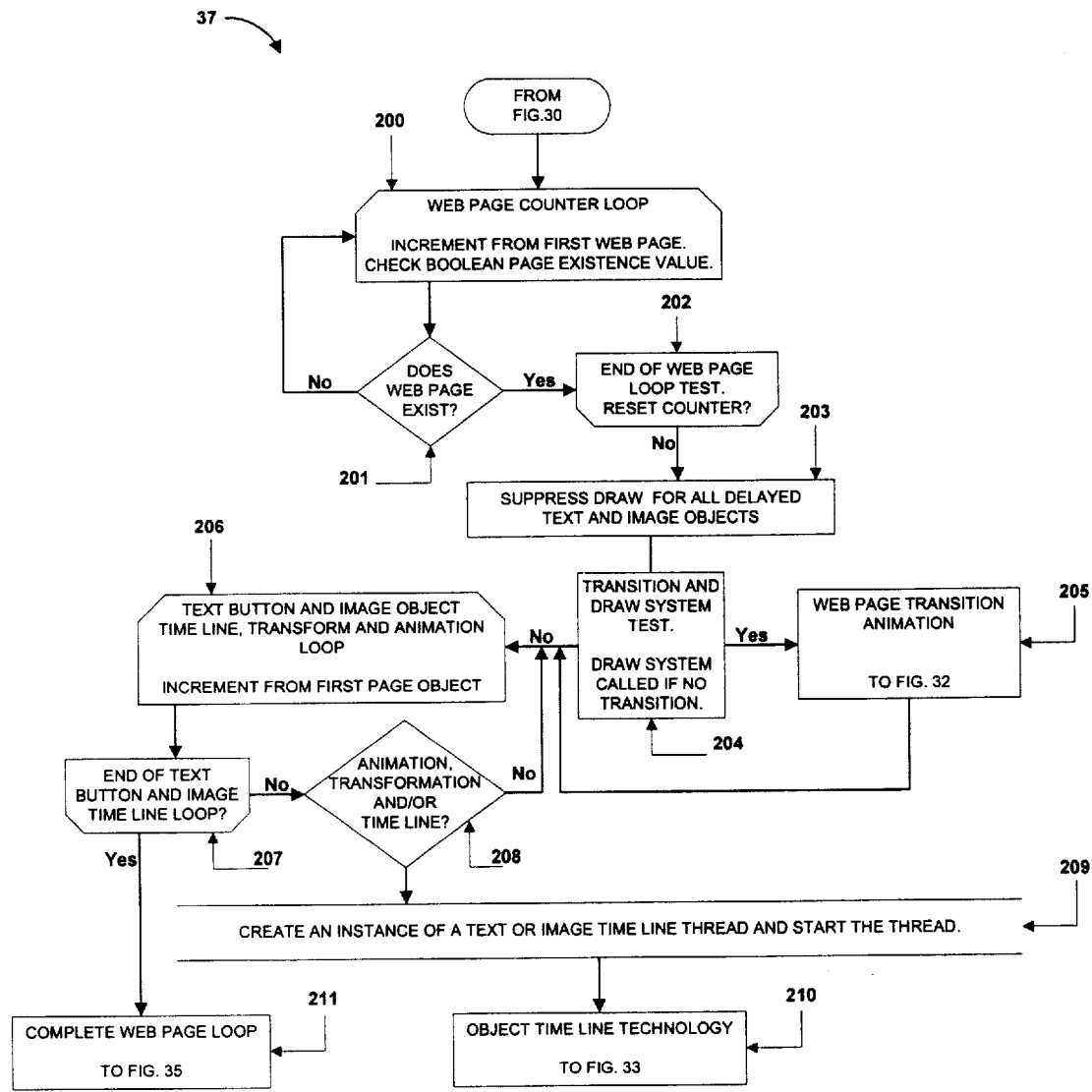
FIG. 31 is a flow chart showing a detailed view of the methods for executing a multi-level web page and object thread architecture in accordance with one implementation of the present invention.

FIG. 31 describes the initial processes for the invention's multilevel web page and object thread technology employed by the run time engine (37 of FIG. 4). Upon the completion of the processing of all the data definitions for the first internal web page (FIG. 30), the main web page thread is created and executed. This causes the run method for the main run time engine class to be executed simultaneously with the reading, processing, and scaling of the data for the subsequent web pages (See FIG. 29). In addition, the reading of any image files defined for the first web page is also performed simultaneously, under the control of an image observer (See FIG. 12). The main run method enters a web page counter loop at 200, the loop being defined from the first internal web page to the high watermark that was set to the number of existing internal web pages for the web site.

A check is made at 201 to see if the current web page exists. If the web page does not exist, and the current web page number is less than that of the high watermark, then the web page counter is incremented by one and the web page counter loop is reentered. If the current web page number equals the high watermark at 202, then the web page counter is reinitialized to the first web page, so that the web page loop may repeat itself, from the first internal web page, depending upon the delay setting for the last web page.

A test is then made on all objects defined for this web page at 203, utilizing a loop whose range is defined by the number of objects per web page high watermarks. More specifically, within this universe of possible objects, if the object exists, and it is defined by a time line in which there is a delayed entrance, then a boolean flag is set for those objects that causes the draw system to suppress drawing these objects during the web page transition as defined below.

A test is then made to determine if the web page has a transition animation defined at 204. If not, the draw system is called for the first time. The draw system for a given web page utilizes a loop whose range is defined by the number of objects per web page high watermarks. The draw system can also employ technology so that the draw process generates a screen image in one or more off-screen buffers, only drawing to the screen when the screen image, or the clipping area for the screen, has been fully generated. This greatly reduces, if not totally eliminates, any screen flicker, and creates visually smooth animation effects.

The first draw function is to draw the web page background into the primary off-screen buffer. The web page background color is drawn, as defined initially at FIG. 21a, or modified for that particular web page at FIG. 20. A test is then made to determine if the web page has a background image pattern, as defined initially at FIG. 21a, or modified for that particular web page at FIG. 20. If it does, and the image observer reports that the image is ready to be drawn, a background image draw loop is executed, defined by the height and width of the background image, and the screen resolution of the current browser window. In the unlikely event that the background image pattern is not yet available, there is a delay until the image observer reports the completion of the image processing operation. The tiled background image pattern is also drawn into the primary off-screen buffer, completely overdrawing the background color. The backgrounds for all non-suppressed (See 203) parent web page text button and paragraph objects are then drawn into the primary off-screen buffer, unless a background transparency flag has been set (See FIG. 7).

The text strings for non-suppressed parent web page text button and paragraph objects are then drawn into the primary off-screen buffer. These text strings are drawn based on their font name, style, size, effect(s), and color. If a paragraph line string, the string may have multiple string segments, each with their own font name, style, etc. If the text button object has its vertical attribute set to true, then the draw system executes a loop defined by the number of characters defined in the text button object. The top and left origin coordinates were set in the usual way (See FIG. 30), but the top coordinate is adjusted by the font height for each iteration of this draw loop. The intelligent 3D Frame, if defined, is then drawn into the primary off-screen buffer for the paragraph and text button objects (See FIG. 30). The primary image objects for the web page are then processed by the draw system. If the image observer reports that the image is ready to be drawn, it is drawn into the primary off-screen buffer, based on the coordinates and size as defined in FIG. 30. If not ready, there is a delay until the image observer reports the completion of the image processing operation. The Intelligent 3D frame, if defined, is then drawn into the primary off-screen buffer for the image objects (See FIG. 30).

The draw system is responsive to two other technologies at this stage. The first is user interaction based on the location of the mouse cursor and any user initiated mouse event. This subject will be described in greater detail below in association with FIG. 36. The second is object animation for non-delayed web page objects. This subject will be described in greater detail below in association with FIG. 33.

If the web page transition test at 204 was true, then the run time engine's main run method executes the web page transition animation technology at 205.

Figure 32:
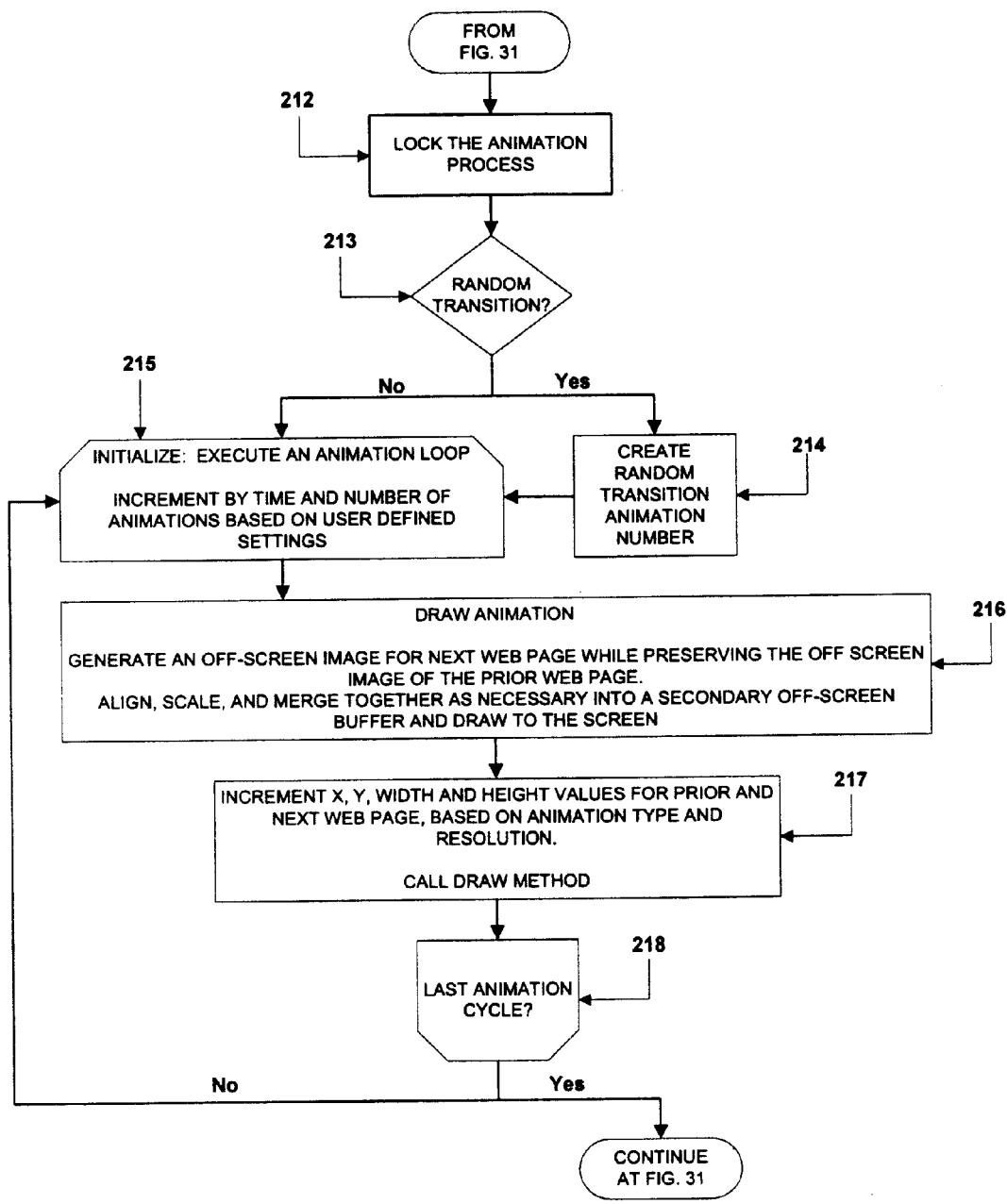
FIG. 32 is a schematic diagram that shows a detailed view of the web page transition animation architecture in accordance with one implementation of the present invention.

FIG. 32 describes the web page transition animation technology. First a lock is placed on this method at 212, as a safety precaution to prevent any interference from other threads during the animation. A test is then made on whether the transition animation setting (See FIG. 20) for the web page is random at 213. If so, a random transition number is generated at 214. The web page thread then begins a particular animation loop at 215, depending upon the random number that was generated at 214 or by the transition animation that was set previously (at FIG. 20). In one implementation, 13 different transition animations plus random are supported including. They are: Fade In, Zoom In, Zoom Out, Zoom to Upper Left, Zoom to Lower Right, Rotate to the Left, Rotate to the Right, Rotate Bottom to Top, Rotate Top to Bottom, Slide to the Left, Slide to the Right, Slide Bottom to Top, and Slide Top to Bottom.

For all web page transition animations, the X and Y animation increment values are calculated by dividing the current browser's screen width and height by the user defined animation resolution at 215. In all animation and draw loops, the number of loops can equal the number of animation frames as set at FIG. 20. The timer delay for all animations, in milliseconds, can be calculated by dividing the number of frames per second (See FIG. 20) into 1,000.

Figure 33:
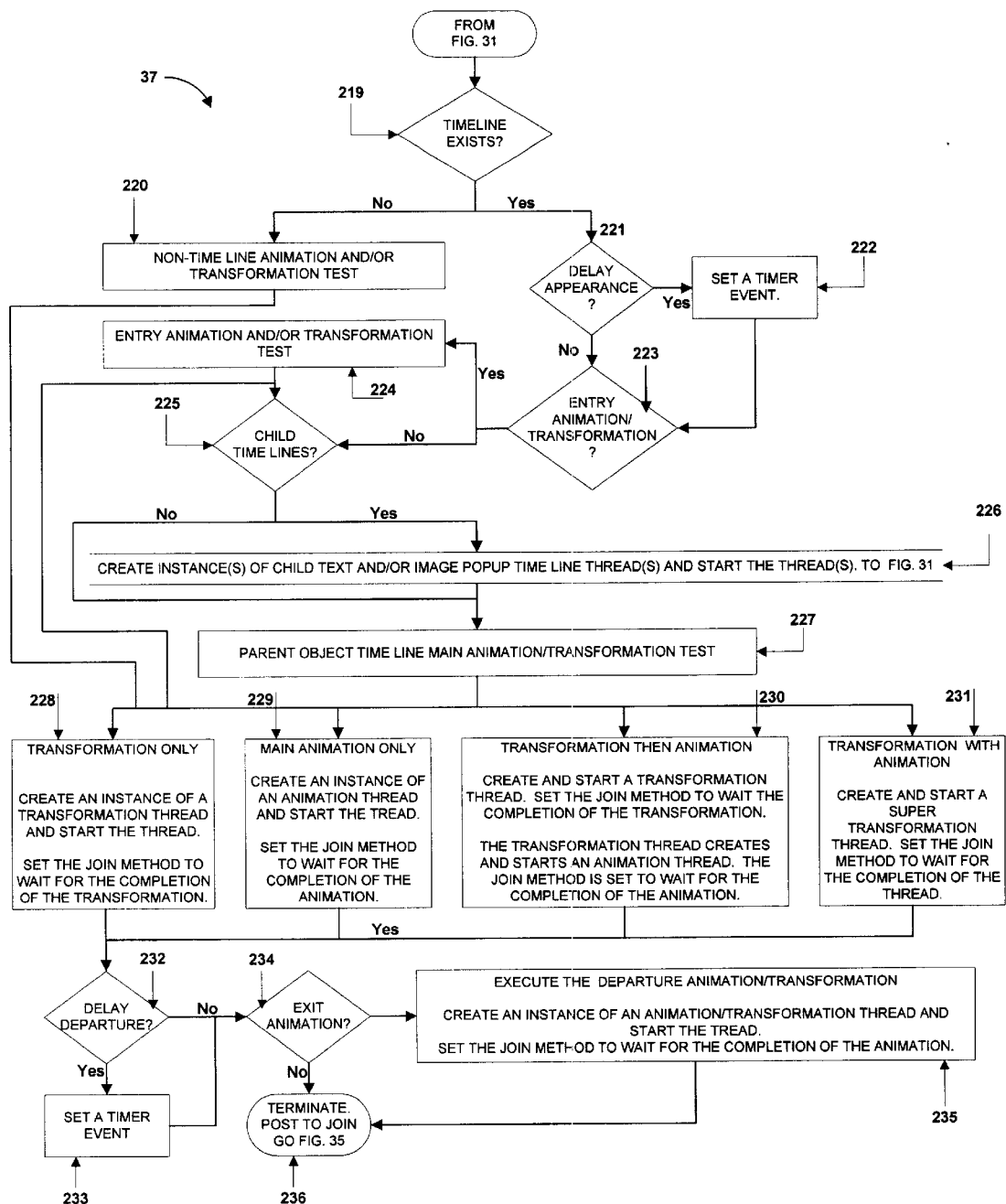
FIG. 33 is a schematic diagram that shows a detailed view of the parent object time line architecture in accordance with one implementation of the present invention.

For a description of "Fade In" Technology see FIG. 33. A "Zoom In" algorithm sets the initial scaled width and height for the current web page image to zero and the prior web page image to its full size. In each animation and draw loop the previous web page's final image state is drawn into a secondary off-screen buffer at 216. (If this is the first occurrence of the first web page, then the secondary off-screen buffer is set to the background of the first web page.) The upper left hand corner (origin) of the current web page can be calculated based on the following formula: browser screen width minus the scaled width divided by two.

The scaled image of the current web page is then drawn into the secondary off-screen buffer at the calculated origin, using the current scaled width and height for the web page image. This merged image of the prior and scaled version of the current web page is then drawn to the screen. A timer delay then occurs as defined at 215, after which the X and Y animation increment values are added to the scaled width and height for the current web page image. The animation loop is then repeated to its conclusion at 218.

The other eleven web page transition animations follow a similar methodology, but have quite different calculations, which are based on the following variables:

1: Order of drawing of the prior and current web pages.
2: Initialization values for the X and Y origin coordinates for the current and prior web pages.
3: The initial values for the scaled width and height for the current and prior web pages.
4: Whether X and Y origin coordinates for the current and prior web pages increment, decrement, or remain the same.
5: Whether the values for the scaled width and height for the current and prior web pages increment, decrement, or remain the same.

For the "Zoom Out" animation, the current page is drawn first and always drawn at 100%. The prior web page is initialized also at 100%, but its X and Y origin coordinates are incremented and its scaled width and height values are decremented, by the appropriate values, for each animation iteration.

For the "Zoom to Upper Left", "Zoom to Lower Right", "Rotate to the Left", "Rotate to the Right", "Rotate Bottom to Top" and "Rotate Top to Bottom" animations, a common data initialization and data increment strategy is implemented.

1: The X and Y variables for page image one is set to zero.
2: The X and Y variables for page image two is set to the right and bottom edges of the browser window.
3: The scaled width and height variables for page image one is set to 100% of the browser window's resolution.
4: The scaled width and height variables for page image two is set to zero.
5: For each loop iteration, the scaled width and height variables for page image one are decremented by the X and Y animation increment values defined at 215.
6: For each loop iteration, the scaled width and height variables for page image two are incremented by the X and Y Animation increment values defined at 215.

For the "Zoom to Upper Left" animation, the prior web page is drawn first; with its X and Y origin coordinates always set to zero. (upper left corner of the browser window) Its scaled width and height values are always set to the current values for scaled width and height variables for page image one. The X and Y origin coordinates for the current web page can be calculated by subtracting the current values of image two's scaled width and height variables from the initial values of the X and Y variables for page image two. The scaled width and height values for the current web page can be set to the current values for the scaled width and height variables for page image two.

For the "Zoom to Lower Right" animation, the current web page is drawn first; with its X and Y origin coordinates always set to zero. Its scaled width and height values are always set to the current values for scaled width and height variables for page image two. The X and Y origin coordinates for the prior web page are set to current values of image two's scaled width and height variables. The scaled width and height values for the prior web page are set to the current values for the scaled width and height variables for page image one.

For the "Rotate to the Left" animation, the prior web page is drawn first; with its X and Y origin coordinates always set to zero. Its scaled width value is set to current value of image one's scaled width variable. Its scaled height value is always set to the bottom of the browser's window. The X origin coordinate for the current web page can be calculated by subtracting the current value for image two's scaled width variable from the initial value for image two's X origin coordinate. The Y origin coordinate for the current web page is always set to zero. Its scaled width value is set to current value of image two's scaled width variable. Its scaled height value is always set to the bottom of the browser's window.

For the "Rotate Bottom to Top" animation, the prior web page is drawn first; with its X and Y origin coordinates always set to zero. Its scaled width value is set to the width of the browser window. Its scaled height value is set to current value of image one's scaled height variable. The current web page's X origin coordinate is always set to zero. The Y origin coordinate is calculated by subtracting the current value of image two's scaled height variable from the initial value for image two's Y origin coordinate. Its scaled width value is always set to the right edge of the browser's window. Its scaled height value is set to current value of image two's scaled height variable.

For the "Rotate Top to Bottom" animation, the current web page is drawn first; with its X and Y origin coordinates always set to zero. Its scaled width value is set to the width of the browser window. Its scaled height value is set to current value of image two's scaled height variable. The prior web page's X origin coordinate is always set to zero. The Y origin coordinate is set to the current value of image two's scaled height. Its scaled width value is always set to the right edge of the browser's window. Its scaled height value is set to current value of image one's scaled height variable.

For the "Slide to the Left", "Slide to the Right", "Slide Bottom to Top" and "Slide Top to Bottom" transition animations, a common data initialization and data increment strategy is implemented. The strategy includes 1: The X and Y variables for page image one is set to zero.
2: The X and Y variables for page image two is set to the right and bottom edges of the browser window.
3: For each loop iteration, the X and Y variables for page image one are incremented by the X and Y animation increment values defined at 215.
4: For each loop iteration, the X and Y variables for page image two are decremented by the X and Y animation increment values defined at 215.
5: The scaled width and height values always remain at 100% of the browser windows width and height.

For the "Slide to the Left" animation, the prior web page is drawn first; with its X and Y origin coordinates always set to zero. The current web page's X origin coordinate is set to the current value of page image two's X variable. Its Y origin coordinate is always set to zero. For the "Slide to the Right" Animation, the current web page is drawn first, with its X and Y origin coordinates always set to zero. The prior web page's X origin coordinate is set to the current value of page image one's X variable. Its Y origin coordinate is always set to zero.

For the "Slide Bottom to Top" animation, the prior web page is drawn first; with its X and Y origin coordinates always set to zero. The current web page's Y origin coordinate is set to the current value of page image two's Y variable. Its X origin coordinate is always set to zero.

For the "Slide Top to Bottom" animation, the current web page is drawn first; with its X and Y origin coordinates always set to zero. The prior web page's Y origin coordinate is set to the current value of page image one's Y variable. Its X origin coordinate is always set to zero.

After the last animation cycle is completed for any of the transition animations at 218, the animation process is unlocked, and process step 206 shown in FIG. 31 is then executed.

Returning to FIG. 31, the main web page thread's run method then executes a text button and image object time line, transformation and animation loop at 206. This range loop is defined from the first object on the given web page to the high watermark for the number of those objects on a web page for this web site. A test is made on each object on whether an animation, transformation and/or time line has been assigned at 208.

If so, an "instance" of the time line class for that particular object type is created at 209. An "instance" of a class is a fundamental aspect of object oriented programming (OOP). Each time, the line class is implemented with a "runnable" interface, so that they can be executed as independent threads. Communication of data, between the "instance" of a class and the main run engine class can be accomplished in OOP using several different techniques. In one implementation, this construction, passed as an argument, is used to permit different objects to address each other's variables and databases. A thread is then created, utilizing a two-dimensional object internal database architecture (web page number by internal object number). This methodology is convenient for permitting all object time lines for a given web page to be managed and synchronized. The object's thread is then "started".

The result of this process at 209 is that an independent thread has been created for each appropriate object on a given web page, all executing simultaneously with each other and with the main run time engine web page thread, subject to the definitions of their independent time lines at 210. See FIG. 33 for a description of the time line technology. When the main web page thread has finished the text and image loop at 207, the draw system is activated; the run time engine can now respond to user interactions, and the main web page thread transitions into a "Join" loop at 211. See FIG. 35 for a description of this process.

FIG. 33 shows the time line technology used by the run time engine. The techniques and algorithms employed to create this technology permit each web page object to have an independent yet synchronized existence with each other, with the main web page thread, and with child objects that each main or parent object may spawn. Furthermore, each object and each of their child objects are capable of performing multiple animations and transformations, either serially or simultaneously. Database initialization is first accomplished for each object thread. This assures that the object thread's database is set to the correct initial values as required for that particular object, and that the references to the main web page thread's database are established.

A test is then made to determine if the object has a time line definition assigned to it at 219. If not, a test is made at 220 on certain two-dimensional object definition variables in order to determine which of the following four states have been defined for the object: animation without a transformation; transformation without animation; animation, with the transformation occurring simultaneously with the animation; and animation and transformations occurring in a serial manner.

If the test shows that the object has an animation defined, but no transformation, then certain two-dimensional status variables are set, and an "instance" of the "animation class" for that particular object type is created at 229. Each "animation class" is also implemented with a "runnable" interface. An object animation thread is then created, utilizing the two-dimensional object internal database architecture (See FIG. 8). This object animation thread is then "started". Communication between the object animation thread, the parent time line thread, and its parent, and the main web page thread, are accomplished as discussed in process 209. The object time line thread then executes a "Join" method. This puts the object time line thread in a "wait state". When the thread it is waiting for is completed, this child thread "joins" the parent object time line thread, and the object time line thread then continues its process. Other forms of synchronization between two independent threads could have been implemented as is known in the art.

The techniques employed at 229 to implement object animation vary by object type. In one implementation, for text button object animations, 26 different animations are supported including: Zoom In, Zoom Out, Grow NW, Grow NE, Grow SE, Grow SW, Shrink SE, Shrink SW, Shrink NW, Shrink NE, Enter N, Enter NE, Enter E, Enter SE, Enter S, Enter SW, Enter W, Enter NW, Exit N, Exit NE, Exit E, Exit SE, Exit S, Exit SW, Exit W and Exit NW. In one implementation, for image object animations, 29 different animations are supported including: Fade In, Fade out, Rotate, Zoom In, Zoom Out, Grow NW, Grow NE, Grow SE, Grow SW, Shrink SE, Shrink SW, Shrink NW, Shrink NE, Enter N, Enter NE, Enter E, Enter SE, Enter S, Enter SW, Enter W, Enter NW, Exit N, Exit NE, Exit E, Exit SE, Exit S, Exit SW, Exit W and Exit NW.

As discussed above with regard to FIG. 17 each animation type has a defined speed, resolution, and number of animation cycles. These settings are stored in the main web page class, and are passed to the particular animation thread through a two-dimensional object internal database architecture as discussed in process step 209 above during the animation thread's initialization process. The animation thread then executes, in its run method, a main animation loop that has the number of iterations set to the end number of animation cycles, as assigned to that particular text button object.

Text button animations are currently implemented in three logical groups. Group One includes "Zoom In", "Grow NW", "Grow NE", "Grow SE", and "Grow SW". Group Two includes "Zoom Out", "Shrink SF", "Shrink SW", "Shrink NW", and "Shrink NE". Group Three includes "Enter N", "Enter NE", "Enter E", "Enter SE", "Enter SW", "Enter W", "Enter NW", "Exit N", "Exit NE", "Exit E", "Exit SE", "Exit S", "Exit SW", "Exit W" and "Exit NW".

For Group One text button animations, the animation font size is initialized at a very small value, and in one implementation is set at 4 Points. The animation point size increment can be derived by dividing the resolution (number of animation frames) into the font size for that text button object. The run method then executes a secondary animation loop, which will terminate when the animation font size equals the text button object point size. For each secondary animation loop, the length of the current animated text string is calculated, a new font object is created for the current animation point size, and the font metrics for that new font are created. If the text button object has a vertical orientation, the animated text button object's width is calculated to be the width of an "m" space, in the current animated font. The animated text button object's height is calculated to be current animated font height times the number of characters in the text string. If the text had a horizontal orientation, the animated text button object's width is calculated to be the width of the text string in the current animated font. The animated text button object's height can be calculated to be the font height of the current animated font. The calculations for X and Y coordinates for the animated text button object depend upon which animation was defined within the Group One-text button animations. The X and Y animation increments can be calculated utilizing the height and width, in pixels, of the text button object scaled to the current browser's window, utilizing the text button animation resolution, and considering whether the animating text button object is being centered during the animation ("Zoom Out") or not. These calculations are similar to those for the web page transition animations discussed with regard to FIG. 32.

The draw system is then called. Based on the values of the two-dimensional status variables that had been set initially, the draw system executes the appropriate animation draw routine utilizing, through the data communication techniques already discussed, the current animation font point size, and the current animation X and Y coordinates. If a text background is to be drawn, the same algorithm as defined in FIG. 31 is used. If a 3D Frame is assigned, the current animated string width and height are passed to the appropriate 3D frame generation method, and the frame is drawn with the same algorithm as defined in FIG. 31, but utilizing the current animation X and Y coordinates. The text button object's orientation is also handled by the draw system with the same algorithms as defined in FIG. 31.

The text button animation thread then executes a timer delay, whose value had been defined in FIG. 17. When the timer reactivates the text button animation thread after the appropriate delay, an animation cycle completion test is made to see if the text button object's point size minus the animation point size is less than the animation point size increment. This type of testing methodology permits the invention to utilize integer values, as opposed to floating point values, for the text button animation. This improves the execution of the animation considerably.

If the above test is true, the animation point size is set equal to the object point size and a final call is made to the draw system for that animation cycle. A test is then made to see if the current animation cycle equals the total number of animation cycles as defined in FIG. 17. If not, a new animation cycle is initiated, with the animation values reinitialized. If this was the last animation cycle the text button animation thread calls its "stop" method, which sets the required status variables as appropriate, then terminates itself This causes the parent text button time line thread to be reactivated through the "join" mechanism.

If the results of animation cycle completion test are false, the current animation point size is increased by the animation point size increment. A new font object is created for the now current animation point size, and new font metrics for that new font are created. If the text button object has a vertical orientation, the animated text button object's width is calculated to be the width of an "m" space, in the now current animated font. The animated text button object's height is calculated to be the now current animated font height times the number of characters in the text string. If the text has a horizontal orientation, the animated text button object's width is calculated to be the width of the text string in the now current animated font. The animated text button object's height is calculated to be the font height of the now current animated font. The calculations for the new X and Y coordinates for the animated text button object are then completed, as appropriate, and the draw system is called again.

The algorithms for Group Two text button animations are very similar to those of Group One. The differences are just in what are the initial animation values, and whether the animation point size increments and the animation X and Y coordinate increments are added or subtracted from the then current animation point size and the then current X and Y coordinates for the animating text button object.

For Group Three text button animations, the distance that the text button animation will move is calculated, in pixels, from its initial location to its final location in the current browser window. The X and Y animation increments are calculated by dividing that distance by the resolution of the text button animation. All the other algorithms for Group Three text button animations are generally a subset of those for Group One, and similar to the web page slide transition animations defined with reference to FIG. 31.

Referring again to FIG. 33, image animations at process step 229 can currently be grouped into five logical classes. As with text button animations, Group One includes "Zoom In", "Grow NW", "Grow NE", "Grow SE", and "Grow SW". Group Two includes "Zoom Out", "Shrink SE", "Shrink SW", "Shrink NW", and "Shrink NE". Group Three includes "Enter N", "Enter NE", "Enter E", "Enter SE", "Enter S", "Enter SW", "Enter W", "Enter NW", "Exit N", "Exit NE", "Exit E", "Exit SE", "Exit S", "Exit SW", "Exit W" and "Exit NW". In addition, image animations have a Group Four, which includes "Fade In" and "Fade Out". Group 5 image animations include the "Rotate" Animation.

For Group One mage animations, the animation width and height increments are calculated by dividing the image object's width and height by the resolution (number of animation frames) as set in FIG. 17. The initial animation width and animation height values are set to a very small number, currently equal to the animation width and height increment values just calculated. The calculations for X and Y coordinates for the animated image object depends upon which animation was defined within the Group One text button animations. The X and Y animation increments are calculated utilizing the height and width, in pixels, of the image object scaled to the current browser's window, utilizing the image animation resolution, and considering whether the animating image object is being centered during the animation ("Zoom Out") or not. These calculations are similar to those for the web page Transition Animations discussed above with regard to FIG. 32.

The run method then executes a secondary animation loop, which will terminate when the animation width equals the image object's width. The algorithms employed by the invention to change the animating object's height, width, X coordinate, and Y coordinate are very similar to those employed for Group One text button animations, and will not be repeated here. The techniques to utilize the draw system for drawing the image animation, the time delay technique, and the post draw logic tests and actions are also very similar.

The algorithms for Group Two image animations are very similar to those of Group One. The differences are just in what are the initial animation values, and whether the animation width and height increments and the animation X and Y coordinate increments are added or subtracted from the then current animation width and height and the then current X and Y coordinates for the animating image object.

For Group Three image animations, the algorithms are identical to those of Group Three text button animations. For Group Four image animations, the "alpha" value of a given image object is utilized in order to implement "Fade In" and "fade Out" animations. The alpha value can range from 0 to 255, depending upon the image strength desired. The value for an alpha animation increment variable can be calculated by dividing the resolution of the animation into 255, after making the necessary adjustments to keep the data in integer form, without losing resolution due to integer rounding errors. For a "Fade In" animation the value of an alpha animation variable is set to zero. The run method then executes a secondary animation loop, which will not terminate until 255 minus the then current value of the alpha animation variable is less than the value alpha animation increment variable. A "Fade In" image filter can be created for each iteration of the animation loop, using the current setting of the alpha animation variable. An image producer can also be created with pointers to the last image bitmap produced for the image object in the last animation loop and to the image filter that has just been created. The image producer, under the control of a media tracker then creates a new image bitmap. The animation thread then "waits" for the completion of this image-processing event using the media tracker. Upon completion, the draw system is called which draws the then current state of the image object. The image animation thread goes into a timer delay of some preset value (in one implementation 500 milliseconds), to permit a smooth visual animation effect. The value for the alpha animation increment is added to alpha animation variable and the loop is then repeated until the loop condition is met. Then the "stop" method is called, certain status variables are set, and the image animation thread terminates itself This causes the parent image time line thread to be reactivated through the "Join" mechanism.

The "Fade Out" animation employs very similar technology, except that:

1: the alpha animation variable is set to zero,
 2: the value for the alpha animation increment is subtracted, and
 3: the loop termination test is when the value for the alpha animation variable is less than the value for the alpha animation increment.

For the Group Five image rotate animation, a different bitmap for the image object is created for each animation frame through the use of a progression of standard geometrical transformations on the original image bitmap. A secondary animation loop is then executed as defined by the number of animation frames. In each loop iteration, an image object is created from an appropriate image bitmap selected from among the set just created, the necessary two-dimensional variables are set to communicate with the draw system, and the draw system is then called. The image animation thread then executes a timer delay method based on the delay setting as defined above with reference to FIG 17. When the timer reactivates the image animation thread after the appropriate delay, the next iteration of the secondary animation loop is repeated until the loop condition is met. Then the "stop" method is called, certain status variables are set, and the image animation thread terminates itself. This causes the parent image time line thread to be reactivated through the "join" mechanism.

Returning to process step 220 shown in FIG. 33, if the object had a transformation, but not an animation, then certain two-dimensional status variables are set, and an "instance" of the "transformation class" for that particular object type is created at 228. Each "transformation class" is also implemented with a "runnable" interface. An object transformation thread is then created, utilizing the invention's two-dimensional object internal database architecture. This object transformation thread is then "started". The inter-thread communication technology and the "join" technology employed for object transformations is the same as for object animations.

If the transformation is being applied to a text button object at 228, then a timer delay method is executed based on the delay setting as described in association with FIG. 18. When the timer reactivates the text button transformation thread after the appropriate delay, the appropriate two-dimensional status variables are set to inform the draw system which state of the current text button object to draw. The draw system is called and,-based on the settings for the above mentioned two-dimensional status variables, either the "normal", mouse over", mouse down" or "pop-up" states of the text button object's background, if any, the text button object's string, and the 3D frame, if any, are drawn. If additional transformations are defined (FIG. 18), the above process is repeated, based on the timer delay and object states defined for the subsequent transformations. When the last transformation is completed, the "stop" method is called, which sets the required status variables as appropriate. This causes the parent text button time line thread to be reactivated through the "join" mechanism.

If the transformation is being applied to an image object at 228, then a timer delay method is executed based on the delay setting (as defined in FIG. 18). When the timer reactivates the image transformation thread after the appropriate delay, image transformation technology is executed. In one implementation, the image transformation technology utilizes the "alpha" value of a given image object state in order to fade in and fade out images. The alpha value can range from 0 to 255, depending upon the image strength desired. The value for an alpha transformation increment variable is calculated by dividing the resolution of the transformation into 255, after making the necessary adjustments to keep the data in integer form, without losing resolution due to integer rounding errors. The value of an alpha transformation variable is set to zero. Depending upon the settings as defined in FIG. 18, the bitmap for one image object state is initialized to an alpha value of zero, while another is initialized to an alpha value of 255. The appropriate two-dimensional status variables are set for communication with the draw system.

A transformation loop is then executed, until 255 minus the then current value of the alpha transformation variable is less than the value alpha transformation increment variable. This methodology again keeps all calculations in the form of integers, as opposed to floating point, thus speeding up the transformation process.

Two "Fade In" image filters are created for each iteration of the transformation loop. The first uses an alpha value calculated at the current setting of the alpha transformation variable. The second uses an alpha value calculated at 255 minus the current setting of the alpha transformation variable. Two image producers are also created with pointers to the last image bitmap produced for each image object state in the last transformation loop and to the two image filters that had just been created. The two image producers under the control of two media trackers then create two new image bitmaps. The transformation thread then "waits" for the completion of these two image processing events using the media trackers. Upon completion, the draw system is called which draws the then current state of the two image object states, in the correct order, and in the correct location. The image transformation thread goes into a timer delay of some preset value (500 milliseconds in one implementation), to permit a smooth visual transformation effect. The loop is then repeated until the loop condition is met. Then the "stop" method is called, certain status variables are set, and the image transformation thread terminates itself. This causes the parent image time line thread to be reactivated through the "join" mechanism.

Returning to process step 220 in FIG. 33, if the object was defined with an animation and transformation that would execute in a serial manner, then certain two-dimensional status variables are set, and an "instance" of the "transformation" class for that particular object type is created at 230. An object transformation thread is then created, utilizing the two-dimensional object internal database architecture. This object transformation thread is then "started" and the parent object time line thread "waits" to be "joined".

If a text button object, then a primary loop is executed, with the number of iterations set to the number of transformations. After the execution and return from a timer delay event, if any, an "instance" of the text button animation class is created, and then a text button animation thread is created and "started". The parent text button transformation thread then waits to be "joined". This causes the text button animation thread to be executed, in the manner described at 229. When the text button animation thread completes its execution, it calls its "stop" method, which sets the necessary status variables and then terminates itself. This causes the text button animation thread to "join" the parent text button animation thread, causing that thread to resume processing. The first text button transformation is then executed, in the manner described at 228. After the execution and return from another timer delay event, if any, another "instance" of the text button animation class is created, and then another text button animation thread is created and "started". The parent text button transformation thread again waits to be "joined". This causes the text button animation thread to be executed again with the animation being executed, based on the definition set at FIG. 18, on a different text button object state. The loop is then repeated until the last text button transformation is completed. Then the text button transformation thread calls its "stop" method, certain status variables are set, and the text button transformation thread terminates itself This causes the parent text button time line thread to be reactivated through the "join" mechanism.

If an image object, the mechanism of the image transformation thread spawns image animation threads, before each transformation, and is the same as that of a text button object. The actual image transformation process is identical to that described at 228. When completed the "stop" method is called, certain status variables are set, and the image transformation thread terminates itself. This causes the parent image time line thread to be reactivated through the "join" mechanism.

Returning to process step 220 in FIG. 33, if the object was defined with a simultaneous animation and transformation, then certain two-dimensional status variables are set, and an "instance" of the "super transformation class" for that particular object type is created at 231. In one implementation, the animation, transformation, and super transformation classes are integrated into one structure in order to reduce code size and increase execution speed. Each "super transformation class" is also implemented with a "runnable" interface. An object super transformation thread is then created, utilizing the two-dimensional object internal database architecture. This object super transformation thread is then "started". The inter-thread communication technology and the "join" technology employed for object super transformations is the same as for object transformations.

If a text button object, a calculation is made in order to prorate the text button animation process across the defined text button transformation process. The calculation is driven by the number of text button animation frames, and prorates from that total the number of frames that should be assigned to each transformation state. This can be done by dividing the sum of all the transformation times by each individual transformation time, and multiplying that result by the number of frames, making necessary adjustments to prevent integer rounding error. After these calculations are completed, the text button animation is executed in a similar manner as was defined at 229. However, when the appropriate number of animation frames had been drawn, certain two-dimensional status variables are set prior to calling the draw system for the next animation frame, so that the correct text button object state is drawn, in the correct size and with the correct coordinates, by the draw system. When the super transformation process is completed the "stop" method is called, certain status variables are set, and the text button super transformation thread terminates itself. This causes the parent text button time line thread to be reactivated through the "join" mechanism.

If an image object, a calculation is made in order to prorate the image animation process across the defined image transformation process. The calculation is driven by the number of image transformation events that would occur (where each one can be set at approximately 500 milliseconds) over the entire animation event. A calculation is performed in order to calculate how many image transformation events should be assigned to each transformation state. This is done by dividing the sum of all the transformation times by each individual transformation time, and multiplying that result by the total number of transformation events, making necessary adjustments to prevent integer rounding error. A calculation is then made to allocate the number of animation frames to each image transformation event. After these calculations are completed, the image animation is executed in a similar manner as was defined at 229. However, when the appropriate number of animation frames had been drawn, the image transformation technology is called to perform the next transformation event. The alpha transformation increment can be defined by dividing 255 by the number of transformation events assigned to that transformation. The draw system is then called. When the number of image transformation events assigned to a given image transformation is reached, then certain two-dimensional status variables are set prior to calling the draw system for the next animation frame, so that the correct image states, in the correct size and with the correct coordinates, are utilized by the draw system. This entire animation/transformation process will be repeated by the number of image animation cycles. When the super transformation process is completed the "stop" method is called, certain status variables are set, and the text button super transformation thread terminates itself. This causes the parent text button time line thread to be reactivated through the "join" mechanism.

Returning to process step 219 in FIG. 33, if the object had a time line, then a test is made at 221 on whether an appearance delay had been defined in FIG. 19. If so, a timer event is set at 222. When the timer reactivates the object time line thread after the appropriate delay, a test is made on whether an entry animation/transformation has been defined for this object time line at 224, as described FIG. 19. If so, based which animation/transformation process was defined, it is created and executed at 228, 229, 230, or 231. In one implementation, 13 entry animations are supported for both text button and image objects, and an additional "Fade In" entry animation is supported for image objects. The 13 common entry animations supported include Zoom In, Grow NW, Grow NE, Grow SE, Grow SW, Enter N, Enter NE, Enter E, Enter SE, Enter S, Enter SW, Enter W and Enter NW.

If no entry animation/transformation is defined, or when the entry animation/transformation has "joined" the object time line thread, a test is made to determine if any child time lines have been defined at 225, as described in FIG. 19, for this parent object time line. If so, an "instance" of the "child time line class" for that particular object type is created at 226. Each "child time line class" is also implemented with a "runnable" interface. An object child time line thread is then created, utilizing the two-dimensional object internal database architecture. This object child time line thread is then "started". The inter-thread communication technology and the "join" technology employed for object child time lines is the same as for object time lines. Either a text button child time line thread or an image child time line thread, or both, can be spawned at this time. Simultaneous with the execution of any spawned text button child time line threads, the parent object thread then executes the defined main animation and or transformation. As with non-time line object threads, a test is made on certain two-dimensional object definition variables in order to determine which of the following four states have been defined for the object at 227: animation without a transformation; transformation without animation; animation, with the transformation occurring simultaneously with the animation; and, animation and transformations occurring in a serial manner.

Based on the results of this test, an appropriate "instance" of an appropriate animation, transformation, or super transformation class is created, and an appropriate animation, transformation, or super transformation thread is created and "started". This results in the execution of process steps 228, 229, 230, or 231, as defined above.

The parent object time line thread then executes a "join" method. This again puts the object time line thread in a "wait state". When the thread it is waiting for is completed, the child thread "joins" the parent object time line thread, and the object time line thread then continues its process. The object time line thread then checks to see if there is a departure delay defined at 232. If so, it sets a timer event at 233. When the timer reactivates the object time line thread after the appropriate delay, a test is made at 234 on whether an exit animation/transformation has been defined for this object time line, as described in FIG. 19. If so, it is created at 235, and performed as discussed with reference to processes 228, 229, 230, or 231. In one implementation, 13 exit animations supported for both text button and image objects, and an additional "Fade Out" exit animation is supported for image objects. The 13 common exit animations include: Zoom Out, Shrink NW, Shrink NE, Shrink SE, Shrink SW, Exit N, Exit NE, Exit E, Exit SE, Exit S, Exit SW, Exit W and Exit NW.

If no exit animation/transformation is defined, or when the exit animation/transformation has "joined" the object time line thread, the parent object time line thread then executes a "join" method if it had spawned any child time lines. This again puts the object time line thread in a "wait state". Finally, when then the child time line threads, if any, "join" the parent object time line, the "stop" method for the parent time line is called. Certain status variables are set, and the parent object time line thread terminates itself This causes the main web page time line that had been in a "join" loop at 211 of FIG. 31, since the invocation of the object time lines, to be "joined" by this particular object time line thread.

Figure 34:
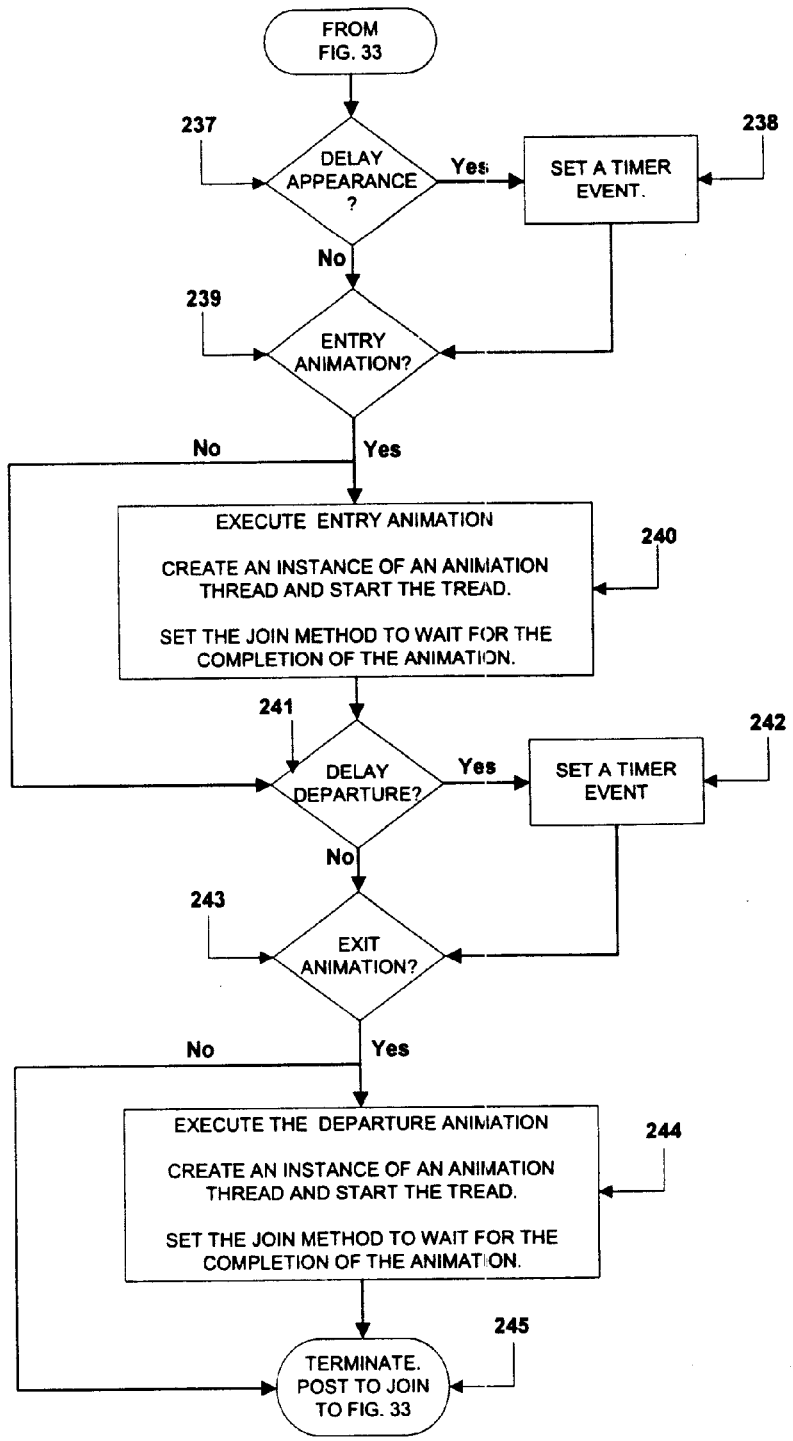
FIG. 34 is a schematic diagram that shows a detailed view of the child object time line architecture in accordance with one implementation of the present invention.

FIG. 34 shows the technology employed by the run time engine for implementing child time lines for text button and image objects. Child text button object time lines and child image object time lines are subsets of their parent object time lines. First a test is made at 237 on whether an appearance delay had been defined (See FIG. 19). If so, a timer event is set at 238. When the timer reactivates the child object time line thread after the appropriate delay, a test is made on whether an entry animation has been defined for this child object time line at 239 (as described FIG. 19). If so, it is created and executed at 240 in a manner identical to that described at process step 229 in FIG. 33. The same 13 entry animations supported for parent object time lines are also supported for both child text button and image objects, and the additional "Fade In" entry animation is supported for child image objects. The "join" mechanism described in FIG. 33 is employed in an identical manner at 240 to synchronize the child time line thread with its entry animation thread.

After being "joined" and reactivated, the child object time line performs a test at 241 on whether an exit delay had been defined (See FIG. 19). If so, a timer event is set at 242. When the timer reactivates the child object time line thread after the appropriate delay, a test is made on whether an exit animation has been defined for this child object time line at 243, as described in association with FIG. 19. If so, it is created and executed at 244 in a manner identical to that described above at process step 229 in FIG. 33. The same 13 exit animations supported for parent object time lines are also supported for both child text button and image objects, and the additional "Fade Out" exit animation is supported for child image objects. The "join" mechanism described above in association with FIG. 33 is employed in an identical manner at 245 to synchronize the child time line thread with its parent object time line thread. As discussed at process step 236 in FIG. 35, the parent object time lines "wait" until all their child time lines have terminated, before they in turn terminate and "join" the main web page time line at FIG. 35.

Figure 35:
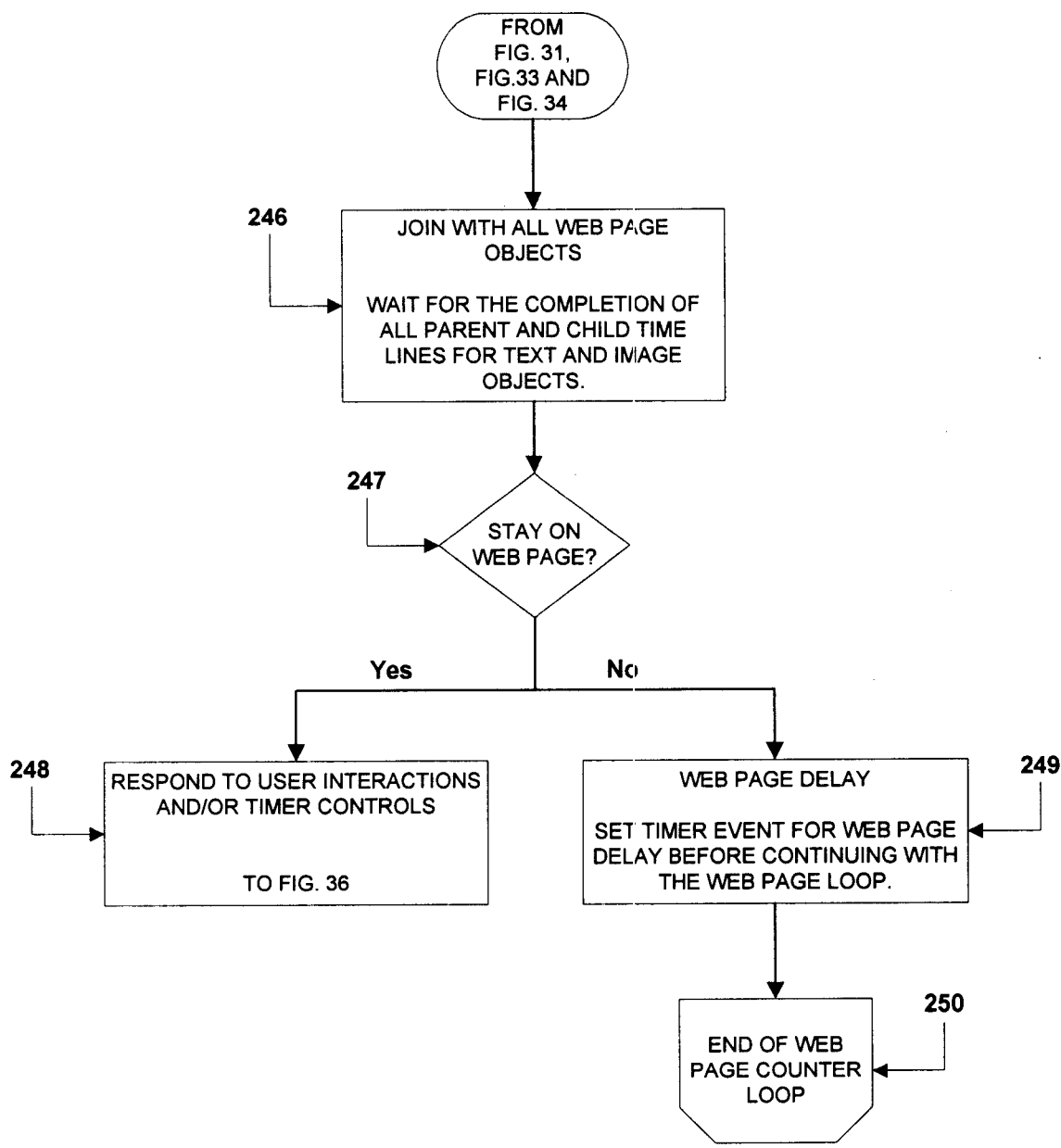
FIG. 35 completes the flow chart begun at FIG. 31.

FIG. 35 describes technology employed by the run time engine for the web page and object thread loop. As noted in FIG. 31 at process step 211, after all the text button and image time line threads for the current web page had been launched, the main web page thread executed a "join" loop, waiting for the completion of all the parent object time line threads. Because each parent object time line thread waited for their child object time line threads to be "joined", as well as any other spawned animation threads, transformation threads, and/or super transformation threads, the effect of this "join" loop at 246 is that the web page thread will not resume processing until all parent time line threads have completed and that of all of their spawned threads.

Upon resuming its processing after the "join" process at 246 has been completed, the main web page thread checks at 247 to see whether the current web page has an automatic termination, based on a timer delay, or whether the web page will wait for a user interaction before terminating. If the web page has a time delay based termination setting, then a timer method is called at 249, and the web page goes to "sleep" awaiting the completion of the timer event.

When the timer event occurs, the web page thread resumes processing by incrementing the web page counter by one, and the entire web page process, which began at process step 200 in FIG. 31, is repeated. If the current web page termination setting was to set to wait until user interaction, then web page thread is placed in a "pause" state, and the run time engine waits to respond to any mouse, keyboard or other user initiated event.

Figure 36:
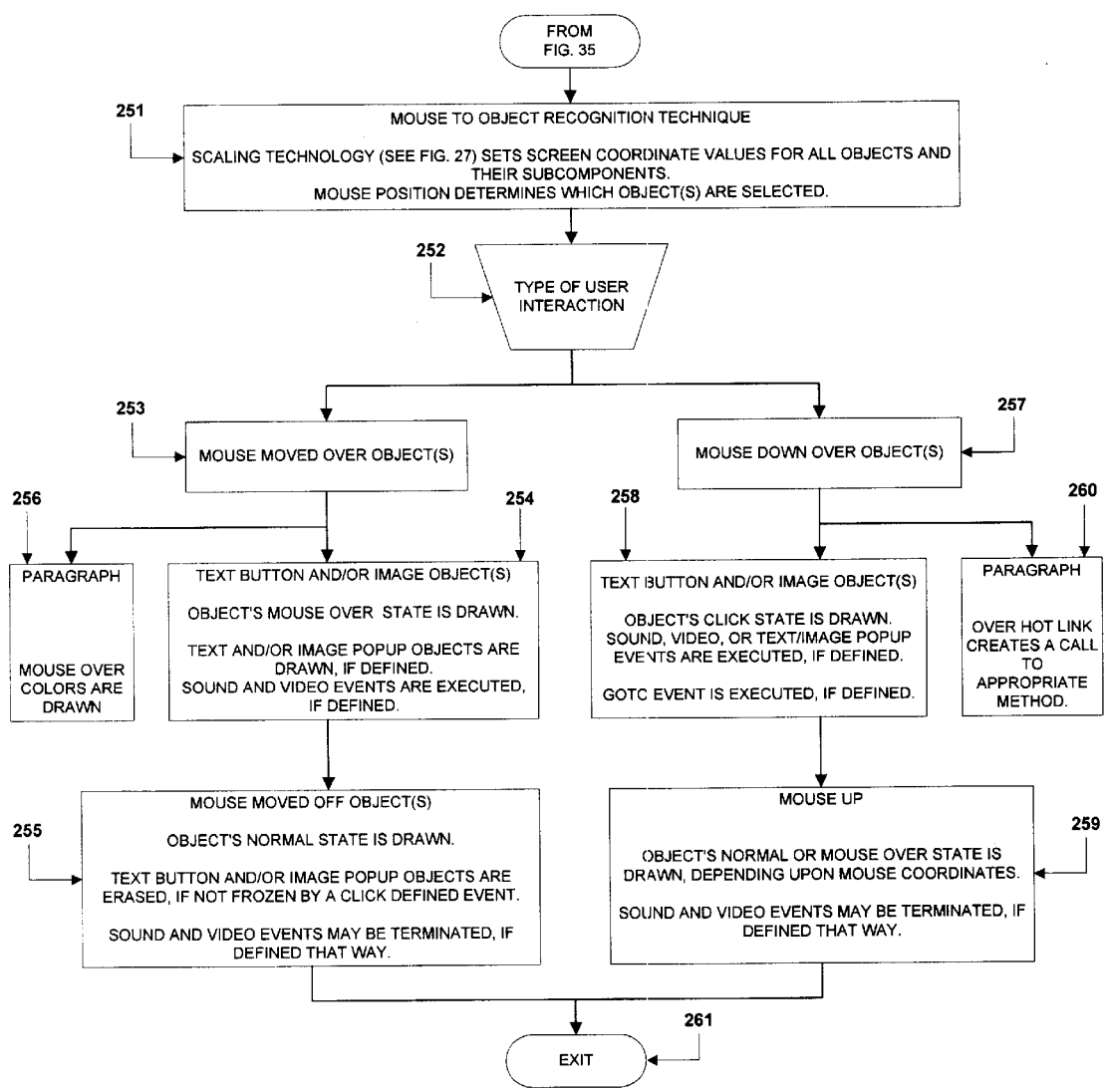
FIG. 36 is a flow chart showing a detailed view of the methods for responding to user interactions in accordance with one implementation of the present invention.

FIG. 36 describes the technology employed by the run time engine for responding to user interactions. As mentioned in association with process step 204 of FIG. 31, as soon as the draw system has been activated, the run time engine will respond to any user interactions that have been defined (See FIG. 16). This is also true during any object time line events, as with respect to process step 207 of FIG. 31. The run time engine currently responds to "mouse over" and "mouse down" events for text button, image, and paragraph objects. For form objects, the run time engine will also respond to keyboard events. As the full-featured programming languages supported by browsers evolve, the run time engine may be configured to respond to other user interactions, including but not limited to single and double clicks from both the left and right mouse button, voice commands, eye focusing technologies, touch screen technologies, and push technologies originating from a server.

The run time engine invokes a "dynamic mouse to object recognition" technology at 251 in order to be responsive to the following elements:

1: The location of objects will vary based on the viewer's screen resolution and browser window size as discussed above with regard to FIG. 27.

2: Objects may move or resize themselves based on time lines and animations.

3: Objects may have different sizes based on the state they are being displayed in based on time lines and transformations.

4: More than one object can occupy the same screen location, and which objects occupy that location may change over time based on time lines, animations, and transformations.

The run time engine maintains, in its internal database, the object's current X and Y origin coordinates, and the object's current width and height, in pixels, based on the current viewer's screen and browser window size. This can be accomplished by first converting all coordinates and sizes to the current viewer environment with the scaling technology as discussed above with regard to FIG. 27. Every time line, animation, and transformation thread updates, in real time, the run time engine's internal database positional and size variables of the objects they define, utilizing the data communication techniques described above with reference to FIG. 33.

The run time engine employs mouseEnter, mouseMove, mouseDown, mouseDrag, mouseUp, and mouseExit methods to constantly monitor the state of the mouse at all times. The onClick method (to detect a single click) and a specialized method to detect a double click event are also employed. The onKeyDown method, with processing the returned scan code, permits the run time engine to process all keyboard events. The mouseEnter, mouseMove, mouseDown, mouseDrag, mouseUp, and mouseExit methods return to the run time engine the exact X and Y coordinates of the mouse cursor at the instant that particular mouse event occurred. Thus for each supported mouse based user interaction technique supported by the run time engine, a two-dimensional loop exists (web page number by object number) in which the current bounding rectangle for every object on a given web page is being compared to the current mouse cursor location at all times. The bounding rectangle is simply the current X and Y origin coordinates of an object, extended by its current width and height. In this way, the run time engine is informed if the current mouse cursor location falls within one or more bounding rectangles. Parenthetically, the run time engine also knows when the current mouse cursor falls outside the bounding rectangle of a given object.

Based on the type of mouse user interaction at 252, the run time engine employs different techniques and executes different methods. If the viewer moves the mouse at 253, the mouseMove method informs the run time engine immediately of this event and the current mouse cursor coordinates.

If this user mouse move action caused the mouse to move into one or more bounding rectangles of any text button or image object(s) at 254, or out of one or more bounding rectangles of any text button or image object(s) at 255, then appropriate two-dimensional status variables are set and the draw system is called. The draw system interprets the relevant two-dimensional variables for the existing text button and image object(s) on the current web page in its draw loop as described above with reference to FIG. 16, and draws the correct backgrounds, text strings, images, and 3D frames based on the state of each object, as just set by the "mouseMove" computational two-dimensional loop. If the mouse has entered into or out of the bounding rectangles of any image and/or text button object that has a defined text button, image and/or video pop-up object (See FIG. 16), then the draw system paints or effectively erases the appropriate background, text string, images and/or 3D frame for these pop-up objects. If the location of any of these text button and image objects or child pop-up objects is changing over time because of time line, animation, or transformation threads, the draw system, as described in association with FIG. 33 and FIG. 34, is aware of these dynamics, and redraws the screen as these real time events occur. If any sound or video events were defined (See FIG. 16) for any text button or image objects, then the run time engine plays those sound and/or video files or channels as defined. As multiple objects can be defined that each have associated sound (and even video) files, and these objects can be overlaid on each other, either completely or partially, very interesting synchronized multiple sound tracks can be constructed, in which certain designated sounds are played, or stopped, based purely on user mouse movement.

If the viewer moves the mouse into or out of the bounding rectangle for a paragraph hot link at 256, then appropriate four-dimensional status variables (web page by paragraph number, by paragraph line number by paragraph line segment number) are set or reset and the draw system is called. The draw system paints the background color behind the hot link text string, and the color for the hot link text string in the hot link "mouse over" or the hot link normal colors. The text string may be underlined or in a bold font, depending on the settings.

If the viewer presses a mouse button at 257, the mouse-down method informs the run time engine immediately of this event and the current mouse cursor coordinates. If the viewer releases the mouse at 259, the mouse-up method informs the run time engine immediately of this event. Either way, if the original "mouse down" event had occurred inside one or more bounding rectangles of any text button or image object(s) at 258, then appropriate two-dimensional status variables are set and the draw system is called. The "mouse up" event will cause the run time engine to reset those appropriate two-dimensional status variables, and then call the draw system. If the mouse was inside of the bounding rectangles of any image and/or text button object that had a defined text button, image and/or video pop-up object (See FIG. 16) with the freeze attribute, the appropriate two-dimensional status variables are set so that the draw system will not erase these pop-up objects when the mouse moves outside the bounding rectangle(s) of the parent text button or image objects. The draw system interprets the relevant two-dimensional variables for the existing text button and image object(s) on the current web page in its draw loop described above with reference to FIG. 16, and draws the correct backgrounds, text strings, images, and 3D frames based on the state of each object, as just set by the "mouseDown" computational two-dimensional loop.

If the 3D frame had been previously defined (See FIG. 16) to have the "live" setting, then the 3D effect is changed from a "raised" effect to a "depressed" effect. If the location of any of these text button and image objects or child pop-up objects is changing over time because of time line, animation, or transformation threads, the draw system, as described in association with FIG. 33 and FIG. 34, is aware of these dynamics, and redraws the screen as these real time events occur, but does not recognize any new "mouse down" or "mouse up" Events. In one implementation, only "mouse over" events are recognized dynamically by the draw system.

If any sound or video events were defined (See FIG. 16) for any text button or image objects, then the run time engine plays those sound and/or video files or channels as defined. As multiple objects can be defined that each have associated sound (and even video) files, and these objects can be overlaid on each other, either completely or partially, very interesting synchronized multiple sound tracks can be constructed, in which certain designated sounds are played, or stopped, based purely on the user pressing a mouse button.

If a mouse down event as described previously in association with FIG. 16 was defined for one or more effected text button or image objects, only the object that was drawn last will have its event processed. If the event was to go to a different internal web page, then the run time engine sets the web page counter described in association with FIG. 31 for the "current" page to be one less than that of the desired web page. The current web page's object time lines, if any, complete normally, and the desired web page is then executed. If the "mouse down" event was to go to an external web page in a different window, then the run time engine creates a new browser window. In JAVA this can be accomplished with the "getAppletContext( ).showDocument(theURL, "_blank")" method, where "theURL" is the URL address for the external web page. The run time engine, however, continues executing.

If the mouse down event was to go to an external web page in the same browser window, then the run time engine terminates by turning control over to the designated external web page. In JAVA this can be accomplished with the "getAppletContext( ).showDocument(theURL)" method, where "theURL" is the URL address for the external web page.

If the viewer presses a mouse button while inside the bounding rectangle for a paragraph hot link at 260, then appropriate four-dimensional status variables (web page by paragraph number, by paragraph line number, by paragraph line segment number) are set. If the hot link setting at FIG. 16 was to go to a different internal web page, then the run time engine sets the web page counter described previously in association with FIG. 31 for the "current" page to be one less than that of the desired web page. The current web page's object time lines, if any, complete normally, and the desired web page is then executed. If the hot link setting was to go to an external web page in a different window, then the run time engine creates a new browser window and loads the external web page. The run time engine, however, continues executing. If the hot link setting was to go to an external web page in the same browser window, then the run time engine terminates by turning control over to the designated external web page. This completes the detailed description of the run time process at 261.

As is obvious from the descriptions of the various features and processes described above, it will be apparent to one skilled in the art that variations in form and detail may be made in the preferred implementation and methods without varying from the spirit and scope of the invention as defined in the claims or as interpreted under the doctrine of equivalents. It should also be clear that terms such as "browser", "mouse", "server", "web", etc., while adequate to describe the current state of interactive systems such as the World Wide Web, may evolve into new and more powerful entities. This evolution of terminology and technology is independent of the preferred implementation and methods of the invention as defined in the claims or as interpreted under the doctrine of equivalents. The preferred implementation and methods are thus provided for purposes of explanation and illustration, but not limitation.

I claim:

1. A method to allow users to produce Internet websites on and for computers having a browser and a virtual machine capable of generating displays, said method comprising:
   (a) presenting a viewable menu having a user selectable panel of settings describing elements on a website, said panel of settings being presented through a browser on a computer adapted to accept one or more of said selectable settings in said panel as inputs therefrom, and where at least one of said user selectable settings in said panel corresponds to commands to said virtual machine;
   (b) generating a display in accordance with one or more user selected settings substantially contemporaneously with the selection thereof;
   (c) storing information representative of said one or more user selected settings in a database;
   (d) generating a website at least in part by retrieving said information representative of said one or more user selected settings stored in said database; and
   (e) building one or more web pages to generate said website from at least a portion of said database and at least one run time file, where said at least one run time file utilizes information stored in said database to generate virtual machine commands for the display of at least a portion of said one or more web pages.

2. An apparatus for producing Internet websites on and for computers having a browser and a virtual machine capable of generating displays, said apparatus comprising:
   (a) an interface to present a viewable menu of a user selectable panel of settings to describe elements on a website, said panel of settings being presented through a browser on a computer adapted to accept one or more of said selectable settings in said panel as inputs therefrom, and where at least one of said user selectable settings in said panel corresponds to commands to said virtual machine;
   (b) a browser to generate a display in accordance with one or more user selected settings substantially contemporaneously with the selection thereof;
   (c) a database for storing information representative of said one or more user selected settings; and
   (d) a build tool having at least one run time file for generating one or more web pages, said run time file operating to utilize information stored in said database to generate commands to said virtual machine for generating the display of at least a portion of said one or more web pages.

3. The apparatus of claim 2, wherein said database is a multi-dimensional array structured database.

4. The apparatus of claim 3, wherein said representative information is Boolean data, numeric data, string data or multi-dimensional arrays of various multimedia objects.

5. The apparatus of claim 4, wherein said elements include multimedia objects selected from the group consisting of a color, a font, an image, an audio clip, a video clip, a text area and a URL.

6. The apparatus of claim 2, wherein said elements are selected from the group consisting of a button, an image, a paragraph, a frame, a table, a form and a vector object.

7. The apparatus of claim 2, wherein said one or more web pages of a website is two or more web pages of a website, wherein said elements include web pages, and wherein said description of elements is a transition or an animation between two of said two or more web pages.

8. The apparatus of claim 2, wherein said elements include one or more objects on a web page, and wherein said description of elements are a transition or an animation of at least one of said elements on a web page.

9. The apparatus of claim 2, wherein said elements include a button or an images, wherein said selectable settings includes the selection of an element style, and wherein said build engine includes means for storing information representative of selected style in said database.

10. The apparatus of claim 9, wherein said elements are described by multiple object states.

11. The apparatus of claim 9, wherein said elements are described by a transformation or a timelines of said selected styles.

12. The apparatus of claim 9, wherein at least one of said elements is a child element, and wherein said element style is a child element style.

13. The apparatus of claim 12, wherein at least one of said element is described by timelines of said child elements.

14. The apparatus of claim 2, wherein said elements include buttons or images, wherein said description of elements is a transition or a timeline which is selected according to input from a mouse, and wherein said build engine includes means for storing information representative of said selected description of elements in said database.

15. The apparatus of claim 14, wherein at least one of said description of elements is a timeline or an animation.

16. The apparatus of claim 2, wherein said elements include one or more objects on two or more web page, wherein at least one of said description of elements is a transition or a timeline, and wherein said build engine includes means to synchronize said description of said one or more objects on one web page between said two or more web pages.

17. The apparatus of claim 2, wherein one or more of said elements is a button or an image, wherein said description of elements is a transition, an animation or a timeline, and wherein said build engine includes means to synchronize said description of said one or more elements.

18. The apparatus of claim 2, wherein at least one of said elements is an object elements selected from the group consisting of a button and an image, and web pages as elements of a website, wherein said description of said object elements is a transition, an animation or a timeline, wherein said description of said web pages is a transition or a timeline, and wherein said build engine includes means to synchronize said description of said object elements and said description of said web pages.

19. The apparatus of claim 2, wherein said elements include an object and a child object, wherein said description of said elements is a timeline or an animation, and wherein said build engine activates said description of said elements according to input from a mouse.

20. The apparatus of claim 2, wherein at least one of said elements is a child button or a child object, wherein said description of said elements is a timeline, a transition or an animation, and wherein said build engine includes means for defining said description of said element.

21. The apparatus of claim 17, wherein said elements further includes at least two child object elements, and said means to synchronize includes means for synchronizing said description of at least two of said at least two child object elements.

22. The apparatus of claim 18, wherein said elements further includes a child object element, and said means to synchronize includes means for synchronizing said description of said child elements.

23. The apparatus of claim 19, wherein said description of elements is a transition or a timeline which is selected according to input from a mouse, and wherein said build engine includes means for storing information representative of said selected description in said database.

24. The apparatus of claim 2, wherein said run time files include one compressed website specific, customized run time engine program file and one compressed website specific, customized run time engine library file.

25. The apparatus of claim 24, wherein said run time files include a dynamic web page scaling mechanism, whereby each of said one or more generated web pages is scaled for viewing on said display.

26. The apparatus of claim 2, wherein said run time files includes one compressed website specific, customized run time engine program file and one compressed website specific, customized run time engine library file, wherein said run time files include a dynamic web page scaling mechanism, and wherein the build engine generates an HTML shell file for each set of one or more run time files which instructs said browser to display a background in said browser window identical to that which the run time engine will draw, invokes said dynamic web page scaling mechanism, and invokes said run time engine.

27. The apparatus of claim 2, wherein said run time files include a multi-level program animation model that presents multiple user interactions and time sensitive operations simultaneously.

28. The apparatus of claim 2, wherein at least one of said elements includes individual ones of multiple audio tracks, and wherein said build engine includes means for associating at least one of said individual audio tracks with a web page or an object on a web page and means for synchronizing multiple audio tracks.

29. The apparatus of claim 2, further including file size reduction means for reducing the total size of said run time files to less than approximately 50K and for reducing the total size of said the run time file of the first web page of said website to less than 25K.

30. The apparatus of claim 29, wherein said total size of said run time files is from approximately 12K to approximately 50K.

31. The apparatus of claim 29, wherein said elements include a web page, an object, a paragraph, or combinations thereof, and wherein said file size reduction means includes means for tracking multiple high water marks for said elements to minimize the size of said at least a portion of said database generated by said build tool.

32. The apparatus of claim 29, wherein said file size reduction means includes means for identify website specific run time files.

33. The apparatus of claim 2, wherein said website has a first web page, wherein said run time files includes a main run time file and main database information corresponding to said first web page, and further includes a run time routine for simultaneously obtaining from the Internet and displaying said first web page and processing said database corresponding to others of said web pages.

34. The apparatus of claim 33, wherein at least one of said elements includes one or more images, and wherein the run time files includes an image observer operable to permit said one or more images of said website to be downloaded simultaneously with the execution of said run time files.

35. The apparatus of claim 2, wherein the build engine includes dynamic resizing means operable to redefine a size of a web page upon being display.

36. The apparatus of claim 35, wherein the dynamic resizing apparatus can be invoked in real time during the build process when a new web site file is opened, when the web page size of the existing web site is changed, or when the web page is zoomed to a different size.

37. An apparatus for producing Internet websites having one or more web pages on and for a computer having a browser and a virtual machine capable of generating a display, said apparatus comprising:
(a) an interface configured for building a website through control of website elements, said interface being operable through the browser on the computer to:
present a viewable menu of a user selectable panel of settings, accept a plurality of settings from said user selectable panel of settings to form an assembly of settings, and
generate the display in accordance with said assembly of settings contemporaneously with the acceptance thereof, at least one of said user selectable settings of said panel of settings being operable to generate said display through commands to said virtual machine;
(b) an internal database associated with said interface for storing information representative of one or more of said assembly of settings for controlling elements of the website; and
(c) a build tool to construct one or more web pages of said website having:
an external database containing data corresponding to said information stored in said internal database, and
one or more run time files, where said run time files utilize information stored in said external database to generate virtual machine commands for the display of at least a portion of said one or more web pages.

38. The apparatus of claim 37, wherein said user selectable panel of settings arc selected from the group consisting of construction, manipulation, animation and transition of elements.

39. An apparatus to allow users to produce Internet websites on and for computers having a browser and a virtual machine capable of generating displays, said apparatus comprising:

(a) means for presenting a viewable menu of a user selectable panel of settings to describe elements on a website, said panel of settings being presented through a browser on a computer adapted to accept one or more of said selectable settings in said panel as inputs therefrom, and where at least one of said user selectable settings in said panel corresponds to commands to said virtual machine;

(b) means for generating a display in accordance with one or more user selected settings substantially contemporaneously with the selection thereof;

(c) means for storing information in a database, said information being representative of a plurality of said one or more user selected settings; and (d) means for building one or more web pages for generating said website from at least a portion of said database and at least one run time file, where said at least one run time file utilizes information stored in said database to generate virtual machine commands for the display of at least a portion of said one or more web pages.

* * * * *